United States Patent
Xia et al.

(10) Patent No.: US 12,412,587 B2
(45) Date of Patent: Sep. 9, 2025

(54) ENCODING METHOD AND APPARATUS, DECODING METHOD AND APPARATUS, DEVICE, STORAGE MEDIUM, AND COMPUTER PROGRAM

(71) Applicant: HUAWEI TECHNOLOGIES CO., LTD., Guangdong (CN)

(72) Inventors: Bingyin Xia, Beijing (CN); Jiawei Li, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 18/515,612

(22) Filed: Nov. 21, 2023

(65) Prior Publication Data

US 2024/0087585 A1 Mar. 14, 2024

Related U.S. Application Data

(63) Continuation of application No. PCT/CN2022/092385, filed on May 12, 2022.

(30) Foreign Application Priority Data

May 21, 2021 (CN) .......... 202110559102.7

(51) Int. Cl.
*G10L 19/24* (2013.01)
*G10L 19/16* (2013.01)
(Continued)

(52) U.S. Cl.
CPC ............ *G10L 19/24* (2013.01); *G10L 19/167* (2013.01); *G10L 25/30* (2013.01); *H04N 19/184* (2014.11); *H04N 19/91* (2014.11); *G10L 19/173* (2013.01)

(58) Field of Classification Search
CPC ............... G10L 19/0017; G10L 19/002; G10L 19/0212; G10L 19/032; G10L 19/167; G10L 19/173; G10L 19/24; G10L 25/30
(Continued)

(56) References Cited

U.S. PATENT DOCUMENTS 5,828,993 A 10/1998 Kawauchi

FOREIGN PATENT DOCUMENTS

| JP | 2016508327 A | | 3/2016 |
|---|---|---|---|
| KR | 20210033781 | * | 3/2021 |

(Continued)

OTHER PUBLICATIONS

Tong Chen et al:"End-to-End Learnt Image Compression via Non-Local Attention Optimization and Improved Context Modeling." Feb. 19, 2021, total 13 pages.

*Primary Examiner* — Leila Malek
(74) *Attorney, Agent, or Firm* — WOMBLE BOND DICKINSON (US) LLP

(57) ABSTRACT

This application disclose an encoding method and apparatus, a decoding method and apparatus, a device, a storage medium, and a computer program, and relate to the field of encoding and decoding technologies. In this method, a first latent variable is scaled based on a first variable scale factor, to obtain a second latent variable, and a quantity of coding bits of an entropy coding result of the second latent variable meets a preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing.

20 Claims, 15 Drawing Sheets

(51) Int. Cl.
*G10L 25/30* (2013.01)
*H04N 19/184* (2014.01)
*H04N 19/91* (2014.01)

(58) Field of Classification Search
USPC .......................................................... 375/240
See application file for complete search history.

(56) References Cited

FOREIGN PATENT DOCUMENTS

| WO | WO-2019086104 A1 | * | 5/2019 | ............... G06N 3/08 |
| WO | 2023165946 A1 | | 9/2023 | |

* cited by examiner

ENCODING METHOD AND APPARATUS, DECODING METHOD AND APPARATUS, DEVICE, STORAGE MEDIUM, AND COMPUTER PROGRAM

CROSS-REFERENCE TO RELATED APPLICATIONS

This application is a continuation of International Application No. PCT/CN2022/092385, filed on May 12, 2022, which claims priority to Chinese Patent Application No. 202110559102.7, filed on May 21, 2021. The disclosures of the aforementioned applications are hereby incorporated by reference in their entireties.

TECHNICAL FIELD

Embodiments of this application relate to the field of encoding and decoding technologies, and in particular, to an encoding method and apparatus, a decoding method and apparatus, a device, a storage medium, and a computer program.

BACKGROUND

An encoding and decoding technology is indispensable in media applications such as media communication and media broadcasting. Therefore, how to perform encoding and decoding becomes one of the concerns in the industry.

A related technology proposes a method for encoding and decoding an audio signal. In the method, when an audio signal is encoded, modified discrete cosine transform (MDCT) processing is performed on a time-domain audio signal, to obtain a frequency-domain audio signal. The frequency-domain audio signal is processed by using an encoding neural network model, to obtain a latent variable. The latent variable indicates a feature of the frequency-domain audio signal. Quantization processing is performed on the latent variable, to obtain a quantized latent variable, entropy coding is performed on the quantized latent variable, and an entropy coding result is written into a bitstream. When the audio signal is decoded, the quantized latent variable is determined based on the bitstream, and dequantization processing is performed on the quantized latent variable, to obtain the latent variable. The latent variable is processed by using a decoding neural network model, to obtain the frequency-domain audio signal, and inverse modified discrete cosine transform (IMDCT) processing is performed on the frequency-domain audio signal, to obtain a reconstructed time-domain audio signal.

However, entropy coding is to encode elements with different probabilities by using different quantities of bits. Therefore, for two adjacent frames of audio signals, probabilities of occurrence of elements in latent variables corresponding to the two frames of audio signals may be different. As a result, quantities of coding bits of the latent variables of the two frames of audio signals are different, and a requirement for a stable encoding rate cannot be met.

SUMMARY

Embodiments of this application provide an encoding method and apparatus, a decoding method and apparatus, a device, a storage medium, and a computer program, to meet a requirement of an encoder for a stable encoding rate. The technical solutions are as follows.

According to a first embodiment, an encoding method is provided. The method may be applied to a codec that does not include a context model, or may be applied to a codec that includes a context model. Moreover, not only a latent variable generated by using to-be-encoded media data may be scaled based on a scale factor, but also a latent variable determined by using a context model may be scaled based on a scale factor. Therefore, the following explains and describes the method in detail in a plurality of cases.

In a first case, the method includes the following operations: processing to-be-encoded media data by using a first encoding neural network model, to obtain a first latent variable, where the first latent variable indicates a feature of the to-be-encoded media data; determining a first variable scale factor based on the first latent variable, where the first variable scale factor is used to enable a quantity of coding bits of an entropy coding result of a second latent variable to meet a preset encoding rate condition, and the second latent variable is obtained by scaling the first latent variable based on the first variable scale factor; obtaining the entropy coding result of the second latent variable; and writing the entropy coding result of the second latent variable and an encoding result of the first variable scale factor into a bitstream.

The quantity of coding bits of the entropy coding result of the second latent variable meets the preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

The to-be-encoded media data is an audio signal, a video signal, an image, or the like. In addition, the to-be-encoded media data may be in any form. This is not limited in this embodiment of this application.

An implementation process of processing the to-be-encoded media data by using the first encoding neural network model is as follows: inputting the to-be-encoded media data into the first encoding neural network model, to obtain the first latent variable output by the first encoding neural network model; or preprocessing the to-be-encoded media data, and inputting preprocessed media data into the first encoding neural network model, to obtain the first latent variable output by the first encoding neural network model.

In other words, the to-be-encoded media data may be used as an input of the first encoding neural network model to determine the first latent variable, or the to-be-encoded media data may be preprocessed and then used as an input of the first encoding neural network model to determine the first latent variable.

In some embodiments, when the to-be-encoded media data is encoded at a constant bit rate, the meeting a preset encoding rate condition includes that the quantity of coding bits is less than or equal to a target quantity of coding bits; the meeting a preset encoding rate condition includes that the quantity of coding bits is less than or equal to a target quantity of coding bits, and a difference between the quantity of coding bits and the target quantity of coding bits is less than a bit quantity threshold; or the meeting a preset encoding rate condition includes that the quantity of coding bits is less than or equal to a maximum quantity of coding bits of a target quantity of coding bits.

In some embodiments, when the to-be-encoded media data is encoded at a variable bit rate, the meeting a preset encoding rate condition includes that an absolute value of a difference between the quantity of coding bits and a target quantity of coding bits is less than a bit quantity threshold. In other words, the meeting a preset encoding rate condition includes that the quantity of coding bits is less than or equal to the target quantity of coding bits, and a difference between the target quantity of coding bits and the quantity of coding bits is less than the bit quantity threshold, or, the meeting a preset encoding rate condition includes that the quantity of coding bits is greater than or equal to the target quantity of coding bits, and the difference between the quantity of coding bits and the target quantity of coding bits is less than the bit quantity threshold.

The target quantity of coding bits may be preset. Certainly, the target quantity of coding bits may also be determined based on an encoding rate, and different encoding rates correspond to different target quantities of coding bits.

In this embodiment of this application, the to-be-encoded media data may be encoded at the constant bit rate, or the to-be-encoded media data may be encoded at the variable bit rate.

When the to-be-encoded media data is encoded at the constant bit rate, a quantity of bits of the to-be-encoded media data of a current frame may be determined based on the constant bit rate, and then a quantity of used bits of the current frame is subtracted, to obtain a target quantity of coding bits of the current frame. The quantity of used bits may be a quantity of bits for encoding the side information or the like. In addition, generally, side information of each frame of media data is different. Therefore, a target quantity of coding bits of each frame of media data is usually different.

When the to-be-encoded media data is encoded at the variable bit rate, a bit rate is usually specified, and an actual bit rate fluctuates around the specified bit rate. In this case, a quantity of bits of the to-be-encoded media data of a current frame may be determined based on the specified bit rate, and then a quantity of used bits of the current frame is subtracted, to obtain a target quantity of coding bits of the current frame. The quantity of used bits may be a quantity of bits for encoding the side information or the like. In some cases, side information of different frames of media data may be different. Therefore, target quantities of coding bits of different frames of media data are usually different.

An initial quantity of coding bits may be determined based on the first latent variable, and the first variable scale factor may be determined based on the initial quantity of coding bits and the target quantity of coding bits.

The initial quantity of coding bits is a quantity of coding bits of an entropy coding result of the first latent variable; or the initial quantity of coding bits is a quantity of coding bits of an entropy coding result of a first latent variable scaled based on a first initial scale factor. The first initial scale factor may be a first preset scale factor.

An implementation process of scaling the first latent variable based on the first initial scale factor is as follows: multiplying each element in the first latent variable by a corresponding element in the first initial scale factor, to obtain the scaled first latent variable.

It should be noted that the foregoing implementation process is merely an example, and during actual application, another method may be used for scaling. For example, each element in the first latent variable may be divided by a corresponding element in the first initial scale factor, to obtain the scaled first latent variable. A scaling method is not limited in this embodiment of this application.

There may be a plurality of implementations of determining the first variable scale factor based on the initial quantity of coding bits and the target quantity of coding bits. The following describes three of the implementations.

In a first implementation, when the initial quantity of coding bits is equal to the target quantity of coding bits, the first initial scale factor is determined as the first variable scale factor. When the initial quantity of coding bits is not equal to the target quantity of coding bits, the first variable scale factor is determined in a first cyclic manner based on the initial quantity of coding bits and the target quantity of coding bits.

$i^{th}$ cyclic processing of the first cyclic manner includes the following operations: determining a scale factor of the $i^{th}$ cyclic processing, where i is a positive integer; scaling the first latent variable based on the scale factor of the $i^{th}$ cyclic processing, to obtain an $i^{th}$-scaled first latent variable; determining a quantity of coding bits of an entropy coding result of the $i^{th}$-scaled first latent variable, to obtain an $i^{th}$ quantity of coding bits; and when the $i^{th}$ quantity of coding bits meets a continuing scaling condition, performing $(i+1)^{th}$ cyclic processing of the first cyclic manner; or when the $i^{th}$ quantity of coding bits does not meet a continuing scaling condition, terminating execution of the first cyclic manner, and determining the first variable scale factor based on the scale factor of the $i^{th}$ cyclic processing.

An implementation process of determining the scale factor of the $i^{th}$ cyclic processing is as follows: determining the scale factor of the $i^{th}$ cyclic processing based on a scale factor of $(i-1)^{th}$ cyclic processing of the first cyclic manner, an $(i-1)^{th}$ quantity of coding bits, and the target quantity of coding bits. When i=1, the scale factor of the $(i-1)^{th}$ cyclic processing is the first initial scale factor, and the $(i-1)^{th}$ quantity of coding bits is the initial quantity of coding bits.

In this case, the continuing scaling condition includes that both the $(i-1)^{th}$ quantity of coding bits and the $i^{th}$ quantity of coding bits are less than the target quantity of coding bits, or the continuing scaling condition includes that both the $(i-1)^{th}$ quantity of coding bits and the $i^{th}$ quantity of coding bits are greater than the target quantity of coding bits.

In other words, the continuing scaling condition includes that the $i^{th}$ quantity of coding bits does not exceed the target quantity of coding bits. Herein, "does not exceed" means that a quantity of coding bits at the first (i−1) times is always less than the target quantity of coding bits, and the $i^{th}$ quantity of coding bits is still less than the target quantity of coding bits. Alternatively, a quantity of coding bits at the first (i−1) times is always greater than the target quantity of coding bits, and the $i^{th}$ quantity of coding bits is still greater than the target quantity of coding bits. Conversely, "exceeds" means that a quantity of coding bits at the first (i−1) times is always less than the target quantity of coding bits, and the $i^{th}$ quantity of coding bits is greater than the target quantity of coding bits. Alternatively, a quantity of coding bits at the first (i−1) times is always greater than the target quantity of coding bits, and the $i^{th}$ quantity of coding bits is less than the target quantity of coding bits.

An implementation process of determining the first variable scale factor based on the scale factor of the $i^{th}$ cyclic processing includes: when the $i^{th}$ quantity of coding bits is equal to the target quantity of coding bits, determining the scale factor of the $i^{th}$ cyclic processing as the first variable scale factor; or when the $i^{th}$ quantity of coding bits is not equal to the target quantity of coding bits, determining the first variable scale factor based on the scale factor of the $i^{th}$ cyclic processing and a scale factor of $(i-1)^{th}$ cyclic processing of the first cyclic manner.

In other words, the scale factor of the $i^{th}$ cyclic processing is a scale factor obtained for the last time in the first cyclic manner, and the $i^{th}$ quantity of coding bits is a quantity of coding bits obtained for the last time. When the quantity of coding bits obtained for the last time is equal to the target quantity of coding bits, the scale factor obtained for last time is determined as the first variable scale factor. When the quantity of coding bits obtained for the last time is not equal to the target quantity of coding bits, the first variable scale factor is determined based on scale factors obtained for the last two times.

An implementation process of determining the first variable scale factor based on the scale factor of the $i^{th}$ cyclic processing and the scale factor of the $(i-1)^{th}$ cyclic processing of the first cyclic manner includes: determining an average value of the scale factor of the $i^{th}$ cyclic processing and the scale factor of the $(i-1)^{th}$ cyclic processing, and determining the first variable scale factor based on the average value.

The average value may be directly determined as the first variable scale factor, or the average value may be multiplied by a preset constant to obtain the first variable scale factor. In some embodiments, the constant may be less than 1.

Certainly, the implementation process of determining the first variable scale factor based on the scale factor of the $i^{th}$ cyclic processing and the scale factor of the $(i-1)^{th}$ cyclic processing of the first cyclic manner may further be as follows: determining the first variable scale factor in a second cyclic manner based on the scale factor of the $i^{th}$ cyclic processing and the scale factor of the $(i-1)^{th}$ cyclic processing.

In an example, $j^{th}$ cyclic processing of the second cyclic manner includes the following operations: determining a third scale factor of the $j^{th}$ cyclic processing based on a first scale factor of the $j^{th}$ cyclic processing and a second scale factor of the $j^{th}$ cyclic processing, where when j is equal to 1, the first scale factor of the $j^{th}$ cyclic processing is one of the scale factor of the $i^{th}$ cyclic processing and the scale factor of the $(i-1)^{th}$ cyclic processing, the second scale factor of the $j^{th}$ cyclic processing is the other one of the scale factor of the $i^{th}$ cyclic processing and the scale factor of the $(i-1)^{th}$ cyclic processing, the first scale factor of the $j^{th}$ cyclic processing corresponds to a $j^{th}$ first quantity of coding bits, the second scale factor of the $j^{th}$ cyclic processing corresponds to a $j^{th}$ second quantity of coding bits, the $j^{th}$ first quantity of coding bits is a quantity of coding bits of an entropy coding result of a first latent variable scaled based on the first scale factor of the $j^{th}$ cyclic processing, the $j^{th}$ second quantity of coding bits is a quantity of coding bits of an entropy coding result of a first latent variable scaled based on the second scale factor of the $j^{th}$ cyclic processing, and the $j^{th}$ first quantity of coding bits is less than the $j^{th}$ second quantity of coding bits; obtaining a $j^{th}$ third quantity of coding bits, where the $j^{th}$ third quantity of coding bits is a quantity of coding bits of an entropy coding result of a first latent variable scaled based on the third scale factor of the $j^{th}$ cyclic processing; and if the $j^{th}$ third quantity of coding bits does not meet a continuing cycle condition, terminating execution of the second cyclic manner, and determining the third scale factor of the $j^{th}$ cyclic processing as the first variable scale factor; if the $j^{th}$ third quantity of coding bits meets a continuing cycle condition, and is greater than the target quantity of coding bits and less than the $j^{th}$ second quantity of coding bits, performing $(j+1)^{th}$ cyclic processing of the second cyclic manner by using the third scale factor of the $j^{th}$ cyclic processing as a second scale factor of the $(j+1)^{th}$ cyclic processing and using the first scale factor of the $j^{th}$ cyclic processing as a first scale factor of the $(j+1)^{th}$ cyclic processing; or if the $j^{th}$ third quantity of coding bits meets a continuing cycle condition, and is less than the target quantity of coding bits and greater than the $j^{th}$ first quantity of coding bits, performing $(j+1)^{th}$ cyclic processing of the second cyclic manner by using the third scale factor of the $j^{th}$ cyclic processing as a first scale factor of the $(j+1)^{th}$ cyclic processing and using the second scale factor of the $j^{th}$ cyclic processing as a second scale factor of the $(j+1)^{th}$ cyclic processing.

In another example, $j^{th}$ cyclic processing of the second cyclic manner includes the following operations: determining a third scale factor of the $j^{th}$ cyclic processing based on a first scale factor of the $j^{th}$ cyclic processing and a second scale factor of the $j^{th}$ cyclic processing, where when j is equal to 1, the first scale factor of the $j^{th}$ cyclic processing is one of the scale factor of the $i^{th}$ cyclic processing and the scale factor of the $(i-1)^{th}$ cyclic processing, the second scale factor of the $j^{th}$ cyclic processing is the other one of the scale factor of the $i^{th}$ cyclic processing and the scale factor of the $(i-1)^{th}$ cyclic processing, the first scale factor of the $j^{th}$ cyclic processing corresponds to a $j^{th}$ first quantity of coding bits, the second scale factor of the $j^{th}$ cyclic processing corresponds to a $j^{th}$ second quantity of coding bits, the $j^{th}$ first quantity of coding bits is less than the $j^{th}$ second quantity of coding bits, and j is a positive integer; obtaining a $j^{th}$ third quantity of coding bits, where the $j^{th}$ third quantity of coding bits is a quantity of coding bits of an entropy coding result of a first latent variable scaled based on the third scale factor of the $j^{th}$ cyclic processing; and if the $j^{th}$ third quantity of coding bits does not meet a continuing cycle condition, terminating execution of the second cyclic manner, and determining the third scale factor of the $j^{th}$ cyclic processing as the first variable scale factor; if j reaches a maximum quantity of cycles and the $j^{th}$ third quantity of coding bits meets a continuing cycle condition, terminating execution of the second cyclic manner, and determining the first variable scale factor based on the first scale factor of the $j^{th}$ cyclic processing; if j does not reach a maximum quantity of cycles, and the $j^{th}$ third quantity of coding bits meets a continuing cycle condition, and is greater than the target quantity of coding bits and less than the $j^{th}$ second quantity of coding bits, performing $(j+1)^{th}$ cyclic processing of the second cyclic manner by using the third scale factor of the $j^{th}$ cyclic processing as a second scale factor of the $(j+1)^{th}$ cyclic processing and using the first scale factor of the $j^{th}$ cyclic processing as a first scale factor of the $(j+1)^{th}$ cyclic processing; or if j does not reach a maximum quantity of cycles, and the $j^{th}$ third quantity of coding bits meets a continuing cycle condition, and is less than the target quantity of coding bits and greater than the j first quantity of coding bits, performing $(j+1)^{th}$ cyclic processing of the second cyclic manner by using the third scale factor of the $j^{th}$ cyclic processing as a first scale factor of the $(j+1)^{th}$ cyclic processing and using the second scale factor of the $j^{th}$ cyclic processing as a second scale factor of the $(j+1)^{th}$ cyclic processing.

An implementation process of determining the third scale factor of the $j^{th}$ cyclic processing based on the first scale factor of the $j^{th}$ cyclic processing and the second scale factor of the $j^{th}$ cyclic processing includes: determining an average value of the first scale factor of the $j^{th}$ cyclic processing and the second scale factor of the $j^{th}$ cyclic processing, and determining the third scale factor of the $j^{th}$ cyclic processing based on the average value. In an example, the average value may be directly determined as the third scale factor of the $j^{th}$ cyclic processing, or the average value may be multiplied by a preset constant to obtain the third scale factor of the $j^{th}$ cyclic processing. In some embodiments, the constant may be less than 1.

In addition, an implementation process of obtaining the $j^{th}$ third quantity of coding bits includes: scaling the first latent variable based on the third scale factor of the $j^{th}$ cyclic processing to obtain a scaled first latent variable, and performing quantization processing on the scaled first latent variable to obtain a quantized first latent variable; and performing entropy coding on the quantized first latent variable, and counting a quantity of coding bits of an entropy coding result, to obtain the $j^{th}$ third quantity of coding bits.

When the to-be-encoded media data is encoded at a constant bit rate, an implementation process of determining the first variable scale factor based on the first scale factor of the $j^{th}$ cyclic processing includes: determining the first scale factor of the $j^{th}$ cyclic processing as the first variable scale factor. When the to-be-encoded media data is encoded at a variable bit rate, an implementation process of determining the first variable scale factor based on the first scale factor of the $j^{th}$ cyclic processing includes: determining a first difference between the target quantity of coding bits and the $j^{th}$ first quantity of coding bits, and determining a second difference between the $j^{th}$ second quantity of coding bits and the target quantity of coding bits; and if the first difference is less than the second difference, determining the first scale factor of the $j^{th}$ cyclic processing as the first variable scale factor; if the second difference is less than the first difference, determining the second scale factor of the $j^{th}$ cyclic processing as the first variable scale factor; or if the first difference is equal to the second difference, determining the first scale factor of the $j^{th}$ cyclic processing as the first variable scale factor, or determining the second scale factor of the $j^{th}$ cyclic processing as the first variable scale factor.

When the to-be-encoded media data is encoded at a constant bit rate, the continuing cycle condition includes that the $j^{th}$ third quantity of coding bits is greater than the target quantity of coding bits, or the continuing cycle condition includes that the $j^{th}$ third quantity of coding bits is less than the target quantity of coding bits, and a difference between the target quantity of coding bits and the $j^{th}$ third quantity of coding bits is greater than a bit quantity threshold. When the to-be-encoded media data is encoded at a variable bit rate, the continuing cycle condition includes that an absolute value of a difference between the target quantity of coding bits and the $j^{th}$ third quantity of coding bits is greater than a bit quantity threshold. In other words, the continuing cycle condition includes that the $j^{th}$ third quantity of coding bits is greater than the target quantity of coding bits, and a difference between the $j^{th}$ third quantity of coding bits and the target quantity of coding bits is greater than the bit quantity threshold, or the continuing cycle condition includes that the $j^{th}$ third quantity of coding bits is less than the target quantity of coding bits, and the difference between the target quantity of coding bits and the $j^{th}$ third quantity of coding bits is greater than the bit quantity threshold.

In a second implementation, when the initial quantity of coding bits is equal to the target quantity of coding bits, a first initial scale factor is determined as the first variable scale factor. When the initial quantity of coding bits is not equal to the target quantity of coding bits, the first variable scale factor is determined according to the foregoing first implementation. However, a difference from the foregoing first implementation lies in that, when the initial quantity of coding bits is less than the target quantity of coding bits, a scale factor of $(i-1)^{th}$ cyclic processing of the first cyclic manner is scaled based on a first operation, to obtain the scale factor of the $i^{th}$ cyclic processing. In this case, the continuing scaling condition includes that the $i^{th}$ quantity of coding bits is less than the target quantity of coding bits. When the initial quantity of coding bits is greater than the target quantity of coding bits, a scale factor of $(i-1)^{th}$ cyclic processing of the first cyclic manner is scaled based on a second operation, to obtain the scale factor of the $i^{th}$ cyclic processing. In this case, the continuing scaling condition includes that the $i^{th}$ quantity of coding bits is greater than the target quantity of coding bits.

That a scale factor of $(i-1)^{th}$ cyclic processing of the first cyclic manner is scaled based on a first operation may refer to increasing the scale factor of the $(i-1)^{th}$ cyclic processing based on the first operation, and that a scale factor of $(i-1)^{th}$ cyclic processing of the first cyclic manner is scaled based on a second operation may refer to decreasing the scale factor of the $(i-1)^{th}$ cyclic processing based on the second operation.

The increasing processing and the decreasing processing may be linear or non-linear. For example, a sum of the scale factor of the $(i-1)^{th}$ cyclic processing and the first operation may be determined as the scale factor of the $i^{th}$ cyclic processing, or a difference between the scale factor of the $(i-1)^{th}$ cyclic processing and the second operation may be determined as the scale factor of the $i^{th}$ cyclic processing.

It should be noted that the first operation and the second operation may be preset, and the first operation and the second operation may be adjusted based on different requirements. In addition, the first operation may be equal to or unequal to the second operation.

In a third implementation, when the initial quantity of coding bits is less than or equal to the target quantity of coding bits, a first initial scale factor is determined as the first variable scale factor. When the initial quantity of coding bits is greater than the target quantity of coding bits, the first variable scale factor may be determined according to the foregoing first implementation. Alternatively, the first variable scale factor may be determined when the initial quantity of coding bits is greater than the target quantity of coding bits in the foregoing second implementation.

In a second case, on the basis of the first case, the method further includes the following operations: obtaining an entropy coding result of a third latent variable, where the third latent variable is determined based on the second latent variable by using a context model, and the third latent variable indicates a probability distribution of the second latent variable; and writing the entropy coding result of the third latent variable into the bitstream. A total quantity of coding bits of the entropy coding result of the second latent variable and coding bits of the entropy coding result of the third latent variable meets the preset encoding rate condition.

The determining a first variable scale factor based on the first latent variable includes: determining an initial quantity of coding bits based on the first latent variable; and determining the first variable scale factor based on the initial quantity of coding bits and a target quantity of coding bits.

There may be two manners of determining the initial quantity of coding bits based on the first latent variable. The following separately describes the manners.

In a first implementation, a corresponding initial quantity of context coding bits and an initial entropy coding model parameter are determined based on the first latent variable by using a context model, a quantity of coding bits of an entropy coding result of the first latent variable is determined based on the initial entropy coding model parameter, to obtain a basic initial quantity of coding bits, and the initial quantity of coding bits is determined based on the initial quantity of context coding bits and the basic initial quantity of coding bits.

The context model includes a context encoding neural network model and a context decoding neural network model. An implementation process of determining, based on the first latent variable by using the context model, the corresponding initial quantity of context coding bits and the initial entropy coding model parameter includes: processing the first latent variable by using the context encoding neural network model, to obtain a fifth latent variable, where the fifth latent variable indicates a probability distribution of the first latent variable; determining an entropy coding result of the fifth latent variable, and using a quantity of coding bits of the entropy coding result of the fifth latent variable as the initial quantity of context coding bits; and reconstructing the fifth latent variable based on the entropy coding result of the fifth latent variable, and processing, by using the context decoding neural network model, the fifth latent variable obtained through reconstruction, to obtain the initial entropy coding model parameter.

In a second implementation, the first preset scale factor is used as the first initial scale factor, the first latent variable is scaled based on the first initial scale factor, a corresponding initial quantity of context coding bits and an initial entropy coding model parameter are determined based on a scaled first latent variable by using a context model, and a quantity of coding bits of an entropy coding result of the scaled first latent variable is determined based on the initial entropy coding model parameter, to obtain a basic initial quantity of coding bits; and the initial quantity of coding bits is determined based on the initial quantity of context coding bits and the basic initial quantity of coding bits.

The context model includes a context encoding neural network model and a context decoding neural network model. An implementation process of determining, based on the scaled first latent variable by using the context model, the corresponding initial quantity of context coding bits and the initial entropy coding model parameter includes: processing the scaled first latent variable by using the context encoding neural network model, to obtain a sixth latent variable, where the sixth latent variable indicates a probability distribution of the scaled first latent variable; determining an entropy coding result of the sixth latent variable, and using a quantity of coding bits of the entropy coding result of the sixth latent variable as the initial quantity of context coding bits; and reconstructing the sixth latent variable based on the entropy coding result of the sixth latent variable, and processing, by using the context decoding neural network model, the sixth latent variable obtained through reconstruction, to obtain the initial entropy coding model parameter.

There may be a plurality of implementations of determining the first variable scale factor based on the initial quantity of coding bits and the target quantity of coding bits. The following describes three of the implementations.

In a first implementation, when the initial quantity of coding bits is equal to the target quantity of coding bits, a first initial scale factor is determined as the first variable scale factor. When the initial quantity of coding bits is not equal to the target quantity of coding bits, the first variable scale factor is determined in a first cyclic manner based on the initial quantity of coding bits and the target quantity of coding bits.

$i^{th}$ cyclic processing of the first cyclic manner includes the following operations: determining a scale factor of the $i^{th}$ cyclic processing, where i is a positive integer; scaling the first latent variable based on the scale factor of the $i^{th}$ cyclic processing, to obtain an $i^{th}$-scaled first latent variable; determining, based on the $i^{th}$-scaled first latent variable by using the context model, a corresponding $i^{th}$ quantity of context coding bits and an $i^{th}$ entropy coding model parameter, determining a quantity of coding bits of an entropy coding result of the $i^{th}$-scaled first latent variable based on the $i^{th}$ entropy coding model parameter, to obtain an $i^{th}$ basic quantity of coding bits, and determining an $i^{th}$ quantity of coding bits based on the $i^{th}$ quantity of context coding bits and the $i^{th}$ basic quantity of coding bits; and when the $i^{th}$ quantity of coding bits meets a continuing scaling condition, performing $(i+1)^{th}$ cyclic processing of the first cyclic manner; or when the $i^{th}$ quantity of coding bits does not meet a continuing scaling condition, terminating execution of the first cyclic manner, and determining the first variable scale factor based on the scale factor of the $i^{th}$ cyclic processing.

In a second implementation, when the initial quantity of coding bits is equal to the target quantity of coding bits, a first initial scale factor is determined as the first variable scale factor. When the initial quantity of coding bits is not equal to the target quantity of coding bits, the first variable scale factor is determined according to the foregoing first implementation. However, a difference from the foregoing first implementation lies in that, when the initial quantity of coding bits is less than the target quantity of coding bits, a scale factor of $(i-1)^{th}$ cyclic processing of the first cyclic manner is scaled based on a first operation, to obtain the scale factor of the $i^{th}$ cyclic processing. In this case, the continuing scaling condition includes that the $i^{th}$ quantity of coding bits is less than the target quantity of coding bits. When the initial quantity of coding bits is greater than the target quantity of coding bits, a scale factor of $(i-1)^{th}$ cyclic processing of the first cyclic manner is scaled based on a second operation, to obtain the scale factor of the $i^{th}$ cyclic processing. In this case, the continuing scaling condition includes that the $i^{th}$ quantity of coding bits is greater than the target quantity of coding bits.

That a scale factor of $(i-1)^{th}$ cyclic processing of the first cyclic manner is scaled based on a first operation may refer to increasing the scale factor of the $(i-1)^{th}$ cyclic processing based on the first operation, and that a scale factor of $(i-1)^{th}$ cyclic processing of the first cyclic manner is scaled based on a second operation may refer to decreasing the scale factor of the $(i-1)^{th}$ cyclic processing based on the second operation.

The increasing processing and the decreasing processing may be linear or non-linear. For example, a sum of the scale factor of the $(i-1)^{th}$ cyclic processing and the first operation may be determined as the scale factor of the $i^{th}$ cyclic processing, or a difference between the scale factor of the $(i-1)^{th}$ cyclic processing and the second operation may be determined as the scale factor of the $i^{th}$ cyclic processing.

It should be noted that the first operation and the second operation may be preset, and the first operation and the second operation may be adjusted based on different requirements. In addition, the first operation may be equal to or unequal to the second operation.

In a third implementation, when the initial quantity of coding bits is less than or equal to the target quantity of coding bits, a first initial scale factor is determined as the first variable scale factor. When the initial quantity of coding bits is greater than the target quantity of coding bits, the first variable scale factor may be determined according to the foregoing first implementation. Alternatively, the first variable scale factor may be determined when the initial quantity of coding bits is greater than the target quantity of coding bits in the foregoing second implementation.

In a third case, on the basis of the first case, the method further includes the following operations: determining a second variable scale factor based on the first latent variable; obtaining an entropy coding result of a fourth latent variable, where the fourth latent variable is obtained by scaling a third latent variable based on the second variable scale factor, and the third latent variable is determined based on the second latent variable by using a context model, and the third latent variable indicates a probability distribution of the second latent variable; and writing the entropy coding result of the fourth latent variable and an encoding result of the second variable scale factor into the bitstream. A total quantity of coding bits of the entropy coding result of the second latent variable and coding bits of the entropy coding result of the fourth latent variable meets the preset encoding rate condition.

There may be two manners of determining the first variable scale factor and the second variable scale factor based on the first latent variable. The manners are respectively as follows.

In a first implementation, a corresponding initial quantity of context coding bits and an initial entropy coding model parameter are determined based on the first latent variable by using the context model; a quantity of coding bits of an entropy coding result of the first latent variable is determined based on the initial entropy coding model parameter, to obtain a basic initial quantity of coding bits; and the first variable scale factor and the second variable scale factor are determined based on the initial quantity of context coding bits, the basic initial quantity of coding bits, and the target quantity of coding bits.

In a second implementation, the first preset scale factor is used as the first initial scale factor, and a second preset scale factor is used as a second initial scale factor. The first latent variable is scaled based on the first initial scale factor, a corresponding initial quantity of context coding bits and an initial entropy coding model parameter are determined based on a scaled first latent variable and the second initial scale factor by using a context model, and a quantity of coding bits of an entropy coding result of the first latent variable is determined based on the initial entropy coding model parameter, to obtain a basic initial quantity of coding bits. The first variable scale factor and the second variable scale factor are determined based on the initial quantity of context coding bits, the basic initial quantity of coding bits, and a target quantity of coding bits.

The context model includes a context encoding neural network model and a context decoding neural network model. An implementation process of determining, based on the scaled first latent variable and the second initial scale factor by using the context model, the corresponding initial quantity of context coding bits and the initial entropy coding model parameter includes: processing the scaled first latent variable by using the context encoding neural network model, to obtain a sixth latent variable, where the sixth latent variable indicates a probability distribution of the scaled first latent variable; scaling the sixth latent variable based on the second initial scale factor, to obtain a seventh latent variable; determining an entropy coding result of the seventh latent variable, and using a quantity of coding bits of the entropy coding result of the seventh latent variable as the initial quantity of context coding bits; and reconstructing the seventh latent variable based on the entropy coding result of the seventh latent variable, and processing, by using the context decoding neural network model, the seventh latent variable obtained through reconstruction, to obtain the initial entropy coding model parameter.

An implementation process of scaling the sixth latent variable based on the second initial scale factor is as follows: multiplying each element in the sixth latent variable by a corresponding element in the second initial scale factor, to obtain the seventh latent variable.

It should be noted that the foregoing implementation process is merely an example, and during actual application, another method may be used for scaling. For example, each element in the sixth latent variable may be divided by a corresponding element in the second initial scale factor, to obtain the seventh latent variable. A scaling method is not limited in this embodiment of this application.

There may be two implementation processes of determining the first variable scale factor and the second variable scale factor based on the initial quantity of context coding bits, the basic initial quantity of coding bits, and the target quantity of coding bits. The following separately describes the implementation processes.

In a first implementation, the second variable scale factor is set to the second initial scale factor, and a basic target quantity of coding bits is determined based on the target quantity of coding bits and at least one of the basic initial quantity of coding bits and the initial quantity of context coding bits. The first variable scale factor and a basic actual quantity of coding bits are determined based on the second initial scale factor, the basic target quantity of coding bits, and the basic initial quantity of coding bits, where the basic actual quantity of coding bits is a quantity of coding bits of an entropy coding result of a first latent variable scaled based on the first variable scale factor. A target quantity of context coding bits is determined based on the target quantity of coding bits and the basic actual quantity of coding bits. The second variable scale factor is determined based on the target quantity of context coding bits and the initial quantity of context coding bits.

An implementation process of determining the basic target quantity of coding bits based on the target quantity of coding bits and at least one of the basic initial quantity of coding bits and the initial quantity of context coding bits includes: subtracting the initial quantity of context coding bits from the target quantity of coding bits, to obtain the basic target quantity of coding bits; determining a ratio of the basic initial quantity of coding bits to the initial quantity of context coding bits, and determining the basic target quantity of coding bits based on the ratio and the target quantity of coding bits; or determining the basic target quantity of coding bits based on a ratio of the target quantity of coding bits to the basic initial quantity of coding bits. Certainly, it may be further determined by using another implementation process.

There are also three implementations of determining the first variable scale factor based on the second initial scale factor, the basic target quantity of coding bits, and the basic initial quantity of coding bits. The following separately describes the implementations.

Manner 11: When the basic initial quantity of coding bits is equal to the basic target quantity of coding bits, the first initial scale factor is determined as the first variable scale factor. When the basic initial quantity of coding bits is not equal to the basic target quantity of coding bits, the first variable scale factor is determined in a first cyclic manner based on the basic initial quantity of coding bits and the basic target quantity of coding bits.

$i^{th}$ cyclic processing of the first cyclic manner includes the following operations: determining a scale factor of the $i^{th}$ cyclic processing, where i is a positive integer; scaling the first latent variable based on the scale factor of the $i^{th}$ cyclic processing, to obtain an $i^{th}$-scaled first latent variable; determining, based on the $i^{th}$-scaled first latent variable and the second initial scale factor by using the context model, an $i^{th}$ quantity of context coding bits and an $i^{th}$ entropy coding model parameter, determining a quantity of coding bits of an entropy coding result of the $i^{th}$-scaled first latent variable based on the $i^{th}$ entropy coding model parameter, to obtain an $i^{th}$ basic quantity of coding bits, and determining an $i^{th}$ quantity of coding bits based on the $i^{th}$ quantity of context coding bits and the $i^{th}$ basic quantity of coding bits; and when the $i^{th}$ quantity of coding bits meets a continuing scaling condition, performing $(i+1)^{th}$ cyclic processing of the first cyclic manner; or when the $i^{th}$ quantity of coding bits does not meet a continuing scaling condition, terminating execution of the first cyclic manner, and determining the first variable scale factor based on the scale factor of the $i^{th}$ cyclic processing.

Manner 12: When the basic initial quantity of coding bits is equal to the basic target quantity of coding bits, the first initial scale factor is determined as the first variable scale factor. When the basic initial quantity of coding bits is not equal to the basic target quantity of coding bits, the first variable scale factor is determined in the foregoing manner 11. However, a difference from the foregoing manner 11 lies in that, when the basic initial quantity of coding bits is less than the basic target quantity of coding bits, a scale factor of $(i-1)^{th}$ cyclic processing of the first cyclic manner is scaled based on a first operation, to obtain the scale factor of the $i^{th}$ cyclic processing. In this case, the continuing scaling condition includes that the $i^{th}$ quantity of coding bits is less than the basic target quantity of coding bits. When the basic initial quantity of coding bits is greater than the basic target quantity of coding bits, a scale factor of $(i-1)^{th}$ cyclic processing of the first cyclic manner is scaled based on a second operation, to obtain the scale factor of the $i^{th}$ cyclic processing. In this case, the continuing scaling condition includes that the $i^{th}$ quantity of coding bits is greater than the basic target quantity of coding bits.

Manner 13: When the basic initial quantity of coding bits is less than or equal to the basic target quantity of coding bits, the first initial scale factor is determined as the first variable scale factor. When the basic initial quantity of coding bits is greater than the basic target quantity of coding bits, the first variable scale factor may be determined in the foregoing manner 11. Alternatively, the first variable scale factor may be determined when the basic initial quantity of coding bits is greater than the basic target quantity of coding bits in the foregoing manner 12.

An implementation process of determining the second variable scale factor based on the target quantity of context coding bits and the initial quantity of context coding bits is similar to the implementation process of determining the first variable scale factor based on the basic initial quantity of coding bits and the basic target quantity of coding bits. The following separately describes three manners.

Manner 21: When the initial quantity of context coding bits is equal to the target quantity of context coding bits, the second initial scale factor is determined as the second variable scale factor. When the initial quantity of context coding bits is not equal to the target quantity of context coding bits, the first latent variable is scaled based on the first variable scale factor, to obtain the second latent variable. The second variable scale factor is determined in a first cyclic manner based on the initial quantity of context coding bits, the target quantity of context coding bits, and the second latent variable.

$i^{th}$ cyclic processing of the first cyclic manner includes the following operations: determining a scale factor of the $i^{th}$ cyclic processing, where i is a positive integer; determining, based on the second latent variable and the scale factor of the $i^{th}$ cyclic processing by using the context model, an $i^{th}$ quantity of context coding bits and an $i^{th}$ entropy coding model parameter; determining a quantity of coding bits of an entropy coding result of the second latent variable based on the $i^{th}$ entropy coding model parameter, to obtain an $i^{th}$ basic quantity of coding bits; and determining an $i^{th}$ quantity of coding bits based on the $i^{th}$ quantity of context coding bits and the $i^{th}$ basic quantity of coding bits; and when the $i^{th}$ quantity of coding bits meets a continuing scaling condition, performing $(i+1)^{th}$ cyclic processing of the first cyclic manner; or when the $i^{th}$ quantity of coding bits does not meet a continuing scaling condition, terminating execution of the first cyclic manner, and determining the second variable scale factor based on the scale factor of the $i^{th}$ cyclic processing.

An implementation process of determining, based on the second latent variable and the scale factor of the $i^{th}$ cyclic processing by using the context model, the $i^{th}$ quantity of context coding bits and the $i^{th}$ entropy coding model parameter includes: processing the second latent variable by using the context encoding neural network model, to obtain a third latent variable, where the third latent variable indicates a probability distribution of the second latent variable; scaling the third latent variable based on the scale factor of the $i^{th}$ cyclic processing, to obtain an $i^{th}$-scaled third latent variable; determining an entropy coding result of the $i^{th}$-scaled third latent variable, and using a quantity of coding bits of the entropy coding result of the $i^{th}$-scaled third latent variable as the $i^{th}$ quantity of context coding bits; reconstructing the $i^{th}$-scaled third latent variable based on the entropy coding result of the $i^{th}$-scaled third latent variable; scaling a reconstructed $i^{th}$-scaled third latent variable based on the scale factor of the $i^{th}$ cyclic processing, to obtain a reconstructed third latent variable; and processing the reconstructed third latent variable by using the context decoding neural network model, to obtain the $i^{th}$ entropy coding model parameter.

Manner 22: When the initial quantity of context coding bits is equal to the target quantity of context coding bits, the second initial scale factor is determined as the second variable scale factor. When the initial quantity of context coding bits is not equal to the target quantity of context coding bits, the second variable scale factor is determined in the foregoing manner 21. However, a difference from the foregoing manner 21 lies in that, when the initial quantity of context coding bits is less than the target quantity of context coding bits, a scale factor of $(i-1)^{th}$ cyclic processing of the first cyclic manner is scaled based on a first operation, to obtain the scale factor of the $i^{th}$ cyclic processing. In this case, the continuing scaling condition includes that the $i^{th}$ quantity of coding bits is less than the target quantity of context coding bits. When the initial quantity of context coding bits is greater than the target quantity of context coding bits, a scale factor of $(i-1)^{th}$ cyclic processing of the first cyclic manner is scaled based on a second operation, to obtain the scale factor of the $i^{th}$ cyclic processing. In this case, the continuing scaling condition includes that the $i^{th}$ quantity of coding bits is greater than the target quantity of context coding bits.

Manner 23: When the initial quantity of context coding bits is less than or equal to the target quantity of context coding bits, the second initial scale factor is determined as the second variable scale factor. When the initial quantity of context coding bits is greater than the target quantity of context coding bits, the second variable scale factor may be determined in the foregoing manner 21. Alternatively, the second variable scale factor may be determined when the initial quantity of context coding bits is greater than the target quantity of context coding bits in the foregoing manner 22.

In a second implementation, the target quantity of coding bits is divided into a basic target quantity of coding bits and a target quantity of context coding bits, and the first variable scale factor is determined based on the basic target quantity of coding bits and the basic initial quantity of coding bits. The second variable scale factor is determined based on the target quantity of context coding bits and the initial quantity of context coding bits.

According to a second embodiment, a decoding method is provided. The method is also described in a plurality of cases.

In a first case, the method includes the following operations: determining a reconstructed second latent variable and a reconstructed first variable scale factor based on a bitstream; scaling the reconstructed second latent variable based on the reconstructed first variable scale factor, to obtain a reconstructed first latent variable, where the reconstructed first latent variable indicates a feature of to-be-decoded media data; and processing the reconstructed first latent variable by using a first decoding neural network model, to obtain reconstructed media data.

In a second case, the method includes the following operations: determining a reconstructed third latent variable and a reconstructed first variable scale factor based on a bitstream; determining a reconstructed second latent variable based on the bitstream and the reconstructed third latent variable; scaling the reconstructed second latent variable based on the reconstructed first variable scale factor, to obtain a reconstructed first latent variable, where the reconstructed first latent variable indicates a feature of to-be-decoded media data; and processing the reconstructed first latent variable by using a first decoding neural network model, to obtain reconstructed media data.

The determining a reconstructed second latent variable based on the bitstream and the reconstructed third latent variable includes: processing the reconstructed third latent variable by using a context decoding neural network model, to obtain a reconstructed first entropy coding model parameter; and determining the reconstructed second latent variable based on the bitstream and the reconstructed first entropy coding model parameter.

In a third case, the method includes the following operations: determining a reconstructed fourth latent variable, a reconstructed second variable scale factor, and a reconstructed first variable scale factor based on a bitstream; determining a reconstructed second latent variable based on the bitstream, the reconstructed fourth latent variable, and the reconstructed second variable scale factor; determining the reconstructed second latent variable based on the bitstream and a reconstructed third latent variable; scaling the reconstructed second latent variable based on the reconstructed first variable scale factor, to obtain a reconstructed first latent variable, where the reconstructed first latent variable indicates a feature of to-be-decoded media data; and processing the reconstructed first latent variable by using a first decoding neural network model, to obtain reconstructed media data.

The determining a reconstructed second latent variable based on the bitstream, the reconstructed fourth latent variable, and the reconstructed second variable scale factor includes: scaling the reconstructed fourth latent variable based on the reconstructed second variable scale factor, to obtain a reconstructed third latent variable; processing the reconstructed third latent variable by using the context decoding neural network model, to obtain a reconstructed second entropy coding model parameter; and determining the reconstructed second latent variable based on the bitstream and the reconstructed second entropy coding model parameter.

The media data is an audio signal, a video signal, or an image.

According to a third embodiment, an encoding apparatus is provided. The encoding apparatus has a function of implementing behavior of the encoding method according to the first embodiment. The encoding apparatus includes at least one module, and the at least one module is configured to implement the encoding method according to the first embodiment.

According to a fourth embodiment, a decoding apparatus is provided. The decoding apparatus has a function of implementing behavior of the decoding method according to the second embodiment. The decoding apparatus includes at least one module, and the at least one module is configured to implement the decoding method according to the second embodiment.

According to a fifth embodiment, an encoder side device is provided. The encoder side device includes a processor and a memory. The memory is configured to store a program for performing the encoding method according to the first embodiment. The processor is configured to execute the program stored in the memory, to implement the encoding method according to the first embodiment.

In some embodiments, the encoder side device may further include a communication bus, and the communication bus is configured to establish a connection between the processor and the memory.

According to a sixth embodiment, a decoder side device is provided. The decoder side device includes a processor and a memory. The memory is configured to store a program for performing the decoding method according to the second embodiment. The processor is configured to execute the program stored in the memory, to implement the decoding method according to the second embodiment.

In some embodiments, the decoder side device may further include a communication bus, and the communication bus is configured to establish a connection between the processor and the memory.

According to a seventh embodiment, a computer-readable storage medium is provided. The storage medium stores instructions. When the instructions are run on a computer, the computer is enabled to perform the operations of the encoding method according to the first embodiment or the operations of the decoding method according to the second embodiment.

According to an eighth embodiment, a computer program product including instructions is provided. When the instructions are run on a computer, the computer is enabled to perform the operations of the encoding method according to the first embodiment or the operations of the decoding method according to the second embodiment. Alternatively, a computer program is provided. When the computer program is executed, the operations of the encoding method according to the first embodiment or the operations of the decoding method according to the second embodiment are implemented.

According to a ninth embodiment, a computer-readable storage medium is provided. The computer-readable storage medium includes a bitstream obtained by using the encoding method according to the first embodiment.

Technical effects obtained in the third embodiment, the fourth embodiment, the fifth embodiment, the sixth embodiment, the seventh embodiment, the eighth embodiment, and the ninth embodiment are similar to the technical effects obtained through corresponding technical means in the first embodiment or the second embodiment. Details are not described herein again.

The technical solutions provided in embodiments of this application can achieve at least the following beneficial effects.

The first latent variable is scaled based on the first variable scale factor to obtain the second latent variable, and the quantity of coding bits of the entropy coding result of the second latent variable meets the preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

DESCRIPTION OF EMBODIMENTS

Figure 1:
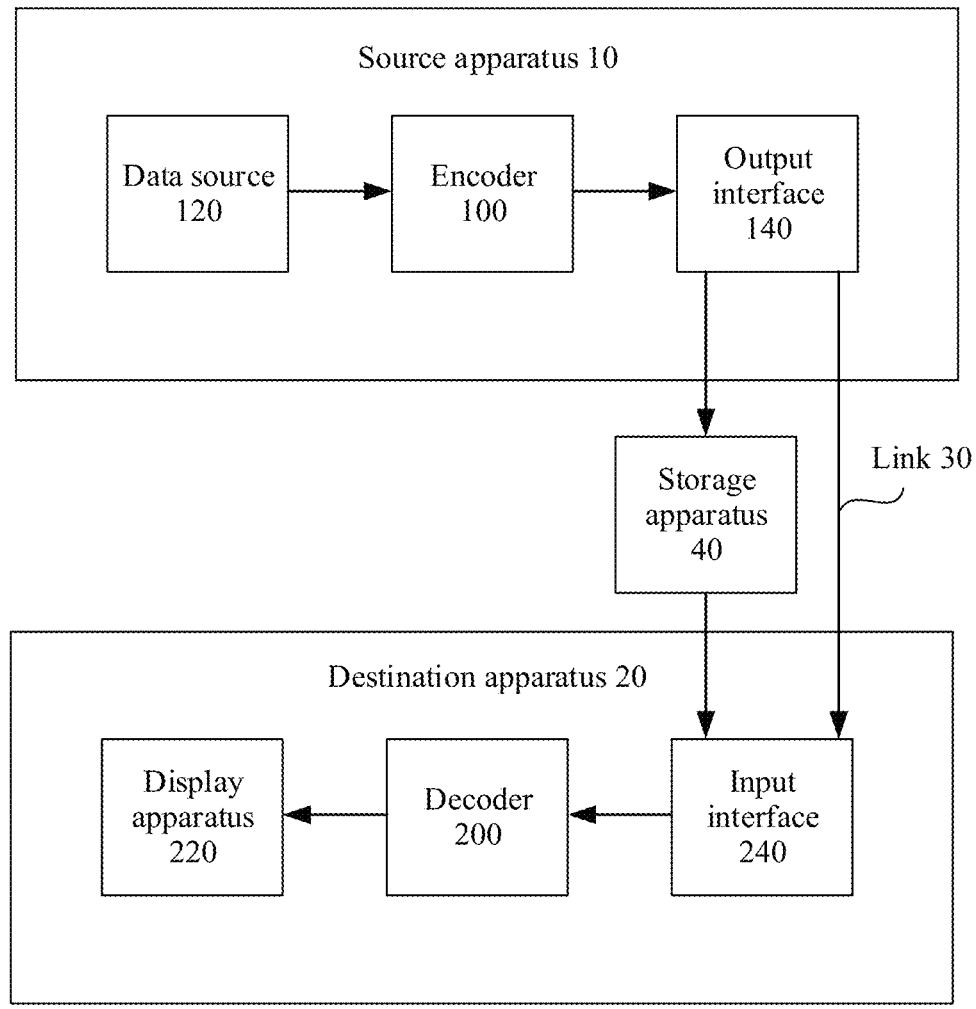
FIG. 1 is a schematic diagram of an implementation environment according to an embodiment of this application.

To make the objectives, technical solutions, and advantages of embodiments of this application clearer, the following further describes implementations of this application in detail with reference to the accompanying drawings.

Before the encoding and decoding method provided in embodiments of this application are explained and described in detail, terms and implementation environments in embodiments of this application are first described.

For ease of understanding, the terms in embodiments of this application are first explained.

Encoding is a processing process of compressing to-be-encoded media data into a bitstream. The to-be-encoded media data mainly includes an audio signal, a video signal, or an image. Encoding of an audio signal is a processing process of compressing an audio frame sequence included in a to-be-encoded audio signal into a bitstream, encoding of a video signal is a processing process of compressing an image sequence included in a to-be-encoded video into a bitstream, and encoding of an image is a processing process of compressing a to-be-encoded image into a bitstream.

It should be noted that after being compressed into the bitstream, the media data may be referred to as encoded media data or compressed media data. For example, for an audio signal, after the audio signal is compressed into the bitstream, the audio signal may be referred to as an encoded audio signal or a compressed audio signal; after the video signal is compressed into the bitstream, the video signal may also be referred to as an encoded video signal or a compressed video signal; and after the image is compressed into the bitstream, the image may also be referred to as an encoded image or a compressed image.

Decoding is a processing process of restoring an encoded bitstream to reconstructed media data according to a syntax rule and processing method. Decoding of an audio bitstream is a processing process of restoring the audio bitstream to a reconstructed audio signal, decoding of a video bitstream is a processing process of restoring the video bitstream to a reconstructed video signal, and decoding of an image bitstream is a processing process of restoring the image bitstream to a reconstructed image.

Entropy coding is coding in which no information is lost according to an entropy principle during coding. In other words, it is a lossless data compression method. Entropy coding is performed based on an occurrence probability of an element, that is, for a same element, when occurrence probabilities of the element are different, quantities of coding bits of entropy coding results of the element are different. Entropy coding usually includes arithmetic coding, range coding (RC), Huffman coding, and the like.

A constant bit rate (CBR) means that an encoding bit rate is a constant value. For example, the constant value is a target encoding bit rate.

A variable bit rate (VBR) means that an encoding rate may exceed a target encoding bit rate, or may be less than a target encoding bit rate, but a difference between the encoding rate and the target encoding bit rate is small.

The following describes the implementation environments in embodiments of this application.

FIG. 1 is a schematic diagram of an implementation environment according to an embodiment of this application. The implementation environment includes a source apparatus 10, a destination apparatus 20, a link 30, and a storage apparatus 40. The source apparatus 10 may generate encoded media data. Therefore, the source apparatus 10 may also be referred to as a media data encoding apparatus. The destination apparatus 20 may decode the encoded media data generated by the source apparatus 10. Therefore, the destination apparatus 20 may also be referred to as a media data decoding apparatus. The link 30 may receive the encoded media data generated by the source apparatus 10, and may transmit the encoded media data to the destination apparatus 20. The storage apparatus 40 may receive the encoded media data generated by the source apparatus 10, and may store the encoded media data. In this case, the destination apparatus 20 may directly obtain the encoded media data from the storage apparatus 40. Alternatively, the storage apparatus 40 may correspond to a file server or another intermediate storage apparatus that can store the encoded media data generated by the source apparatus 10. In this case, the destination apparatus 20 may perform streaming transmission or download the encoded media data stored in the storage apparatus 40.

Both the source apparatus 10 and the destination apparatus 20 may include one or more processors and a memory coupled to the one or more processors. The memory may include a random access memory (RAM), a read-only memory (ROM), an electrically erasable programmable read-only memory (EEPROM), a flash memory, any other medium that may be used to store required program code in a form of instructions or a data structure accessible by a computer, or the like. For example, both the source apparatus 10 and the destination apparatus 20 may include a desktop computer, a mobile computing apparatus, a notebook (for example, a laptop) computer, a tablet computer, a set-top box, a telephone handset such as a so-called "smart" phone, a television set, a camera, a display apparatus, a digital media player, a video game console, an in-vehicle computer, or the like.

The link 30 may include one or more media or apparatuses that can transmit the encoded media data from the source apparatus 10 to the destination apparatus 20. In a possible implementation, the link 30 may include one or more communication media that can enable the source apparatus 10 to directly send the encoded media data to the destination apparatus 20 in real time. In this embodiment of this application, the source apparatus 10 may modulate the encoded media data based on a communication standard. The communication standard may be a wireless communication protocol or the like, and may send modulated media data to the destination apparatus 20. The one or more communication media may include a wireless and/or wired communication media. For example, the one or more communication media may include a radio frequency (RF) frequency spectrum or one or more physical transmission lines. The one or more communication media may form a part of a packet-based network, and the packet-based network may be a local area network, a wide area network, a global network (for example, the Internet), or the like. The one or more communication media may include a router, a switch, a base station, another device that facilitates communication from the source apparatus 10 to the destination apparatus 20, or the like. This is not limited in this embodiment of this application.

In a possible implementation, the storage apparatus 40 may store the received encoded media data sent by the source apparatus 10, and the destination apparatus 20 may directly obtain the encoded media data from the storage apparatus 40. In such a condition, the storage apparatus 40 may include any one of a plurality of distributed or locally accessed data storage media. For example, any one of the plurality of distributed or locally accessed data storage media may be a hard disk drive, a Blu-ray disc, a digital versatile disc (DVD), a CD-ROM, a flash memory, a volatile or non-volatile memory, or any other suitable digital storage medium used to store the encoded media data.

In a possible implementation, the storage apparatus 40 may correspond to a file server or another intermediate storage apparatus that can store the encoded media data generated by the source apparatus 10, and the destination apparatus 20 may perform streaming transmission or download the media data stored in the storage apparatus 40. The file server may be any type of server that can store the encoded media data and send the encoded media data to the destination apparatus 20. In a possible implementation, the file server may include a network server, a file transfer protocol (FTP) server, a network attached storage (NAS) apparatus, a local disk drive, or the like. The destination apparatus 20 may obtain the encoded media data through any standard data connection (including an Internet connection). Any standard data connection may include a wireless channel (for example, a Wi-Fi connection), a wired connection (for example, a digital subscriber line (DSL) or a cable modem), or a combination of the wireless channel and the wired connection suitable for obtaining the encoded media data stored on the file server. Transmission of the encoded media data from the storage apparatus 40 may be streaming transmission, download transmission, or a combination thereof.

The implementation environment shown in FIG. 1 is merely a possible implementation. In addition, the technology in this embodiment of this application is not only applicable to the source apparatus 10 that can encode media data and the destination apparatus 20 that can decode the encoded media data shown in FIG. 1, but also applicable to another apparatus that can encode the media data and decode the encoded media data. This is not limited in this embodiment of this application.

In the implementation environment shown in FIG. 1, the source apparatus 10 includes a data source 120, an encoder 100, and an output interface 140. In some embodiments, the output interface 140 may include a modulator/demodulator (modem) and/or a sender. The sender may also be referred to as a transmitter. The data source 120 may include an image capture apparatus (for example, a camera), an archive containing previously captured media data, a feed-in interface for receiving media data from a media data content provider, and/or a computer graphics system for generating media data, or a combination of these sources of media data.

The data source 120 may send media data to the encoder 100. The encoder 100 may encode the received media data sent by the data source 120, to obtain encoded media data. The encoder may send the encoded media data to the output interface. In some embodiments, the source apparatus 10 directly sends the encoded media data to the destination apparatus 20 through the output interface 140. In another embodiment, the encoded media data may be further stored on the storage apparatus 40, so that the destination apparatus 20 subsequently obtains the encoded media data and uses the encoded media data for decoding and/or display.

In the implementation environment shown in FIG. 1, the destination apparatus 20 includes an input interface 240, a decoder 200, and a display apparatus 220. In some embodiments, the input interface 240 includes a receiver and/or a modem. The input interface 240 may receive the encoded media data through the link 30 and/or from the storage apparatus 40, and then send the encoded media data to the decoder 200. The decoder 200 may decode the received encoded media data to obtain decoded media data. The decoder may send the decoded media data to the display apparatus 220. The display apparatus 220 may be integrated with the destination apparatus 20 or may be disposed outside the destination apparatus 20. Generally, the display apparatus 220 displays the decoded media data. The display apparatus 220 may be a display apparatus of any one of a plurality of types. For example, the display apparatus 220 may be a liquid crystal display (LCD), a plasma display, an organic light-emitting diode (OLED) display, or another type of display apparatus.

Although not shown in FIG. 1, in some embodiments, the encoder 100 and the decoder 200 may be respectively integrated with an encoder and a decoder, and may include an appropriate multiplexer-demultiplexer (MUX-DEMUX) unit or other hardware and software for encoding both audio and videos in a shared data stream or separate data streams. In some embodiments, if applicable, the MUX-DEMUX unit may comply with the ITU H.223 multiplexer protocol or another protocol such as a user datagram protocol (UDP).

The encoder 100 and the decoder 200 each may be any one of the following circuits: one or more microprocessors, a digital signal processor (DSP), an application-specific integrated circuit (ASIC), a field-programmable gate array (FPGA), discrete logic, hardware, or any combination thereof. If the technology in this embodiment of this application is implemented partially in software, the apparatus may store, in an appropriate non-volatile computer-readable storage medium, instructions used for the software, and may use one or more processors to execute the instructions in hardware, to implement the technology in this embodiment of this application. Any one of the foregoing content (including hardware, software, a combination of hardware and software, and the like) may be considered as one or more processors. The encoder 100 and the decoder 200 each may be included in one or more encoders or decoders. Any one of the encoders or the decoders may be integrated as a part of a combined encoder/decoder (codec) in a corresponding apparatus.

In this embodiment of this application, the encoder 100 may be generally referred to as "signaling" or "sending" some information to another apparatus, for example, the decoder 200. The term "signaling" or "sending" may generally refer to transmission of syntax elements and/or other data used to decode compressed media data. Such transmission may occur in real time or almost in real time. Alternatively, the communication may occur after a period of time, for example, may occur when a syntax element is stored in a computer-readable storage medium in an encoded bitstream during encoding, and the decoding apparatus may then retrieve the syntax element at any time after the syntax element is stored in the medium.

The encoding and decoding method provided in embodiments of this application may be applied to a plurality of scenes. The following separately describes several scenes by using an example in which to-be-encoded media data is an audio signal.

Figure 2:
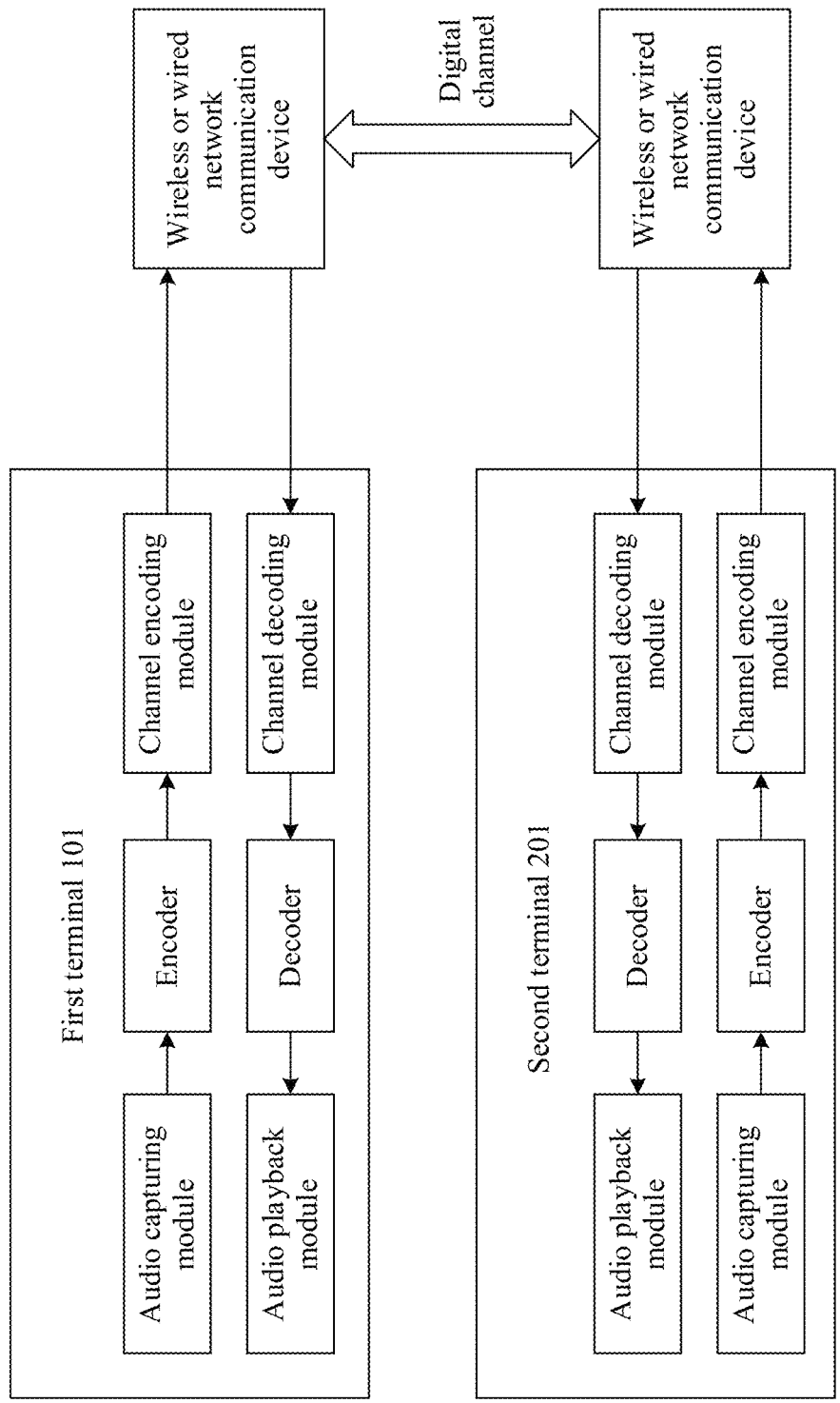
FIG. 2 is a schematic diagram of an implementation environment of a terminal scene according to an embodiment of this application.

FIG. 2 is a schematic diagram of an implementation environment in which an encoding and decoding method is applied to a terminal scene according to an embodiment of this application. The implementation environment includes a first terminal 101 and a second terminal 201, and the first terminal 101 and the second terminal 201 are in communication connection. The communication connection may be a wireless connection, or may be a wired connection. This is not limited in this embodiment of this application.

The first terminal 101 may be a transmit end device, or may be a receive end device. Similarly, the second terminal 201 may be a receive end device, or may be a transmit end device. If the first terminal 101 is a transmit end device, the second terminal 201 is a receive end device. If the first terminal 101 is a receive end device, the second terminal 201 is a transmit end device.

The following provides descriptions by using an example in which the first terminal 101 is a transmit end device and the second terminal 201 is a receive end device.

The first terminal 101 may be the source apparatus 10 in the implementation environment shown in FIG. 1. The second terminal 201 may be the destination apparatus 20 in the implementation environment shown in FIG. 1. Both the first terminal 101 and the second terminal 201 include an audio capturing module, an audio playback module, an encoder, a decoder, a channel encoding module, and a channel decoding module.

The audio capturing module in the first terminal 101 captures an audio signal and transmits the audio signal to the encoder. The encoder encodes the audio signal by using the encoding method provided in this embodiment of this application. The encoding may be referred to as source encoding. Then, to transmit the audio signal on a channel, the channel encoding module further needs to perform channel encoding, and then transmit, on a digital channel by using a wireless or wired network communication device, a bitstream obtained through encoding.

The second terminal 201 receives, by using a wireless or wired network communication device, the bitstream transmitted on the digital channel. The channel decoding module performs channel decoding on the bitstream. Then, the decoder obtains the audio signal through decoding by using the decoding method provided in this embodiment of this application, and then plays the audio signal by using the audio playback module.

The first terminal 101 and the second terminal 201 may be any electronic product that can perform human-computer interaction with a user in one or more manners such as a keyboard, a touchpad, a touchscreen, a remote control, a voice interaction device, or a handwriting device, for example, a personal computer (PC), a mobile phone, a smartphone, a personal digital assistant (PDA), a wearable device, a pocket personal computer PPC (PPC), a tablet computer, a smart head unit, a smart television, or a smart speaker.

A person skilled in the art should understand that the foregoing terminal is merely an example. If another existing or future terminal is applicable to embodiments of this application, it should also fall within the protection scope of embodiments of this application, and is included herein by reference.

Figure 3:
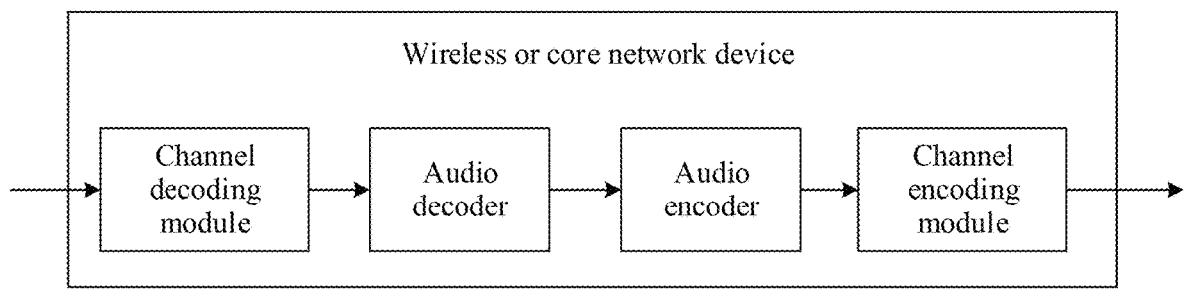
FIG. 3 is a schematic diagram of an implementation environment of a transcoding scene of a wireless or core network device according to an embodiment of this application.

FIG. 3 is a schematic diagram of an implementation environment in which an encoding and decoding method is applied to a transcoding scene of a wireless or core network device according to an embodiment of this application. The implementation environment includes a channel decoding module, an audio decoder, an audio encoder, and a channel encoding module.

The audio decoder may be a decoder that uses the decoding method provided in embodiments of this application, or may be a decoder that uses another decoding method. The audio encoder may be an encoder that uses the encoding method provided in embodiments of this application, or may be an encoder that uses another encoding method. When the audio decoder is the decoder that uses the decoding method provided in embodiments of this application, the audio encoder is the encoder that uses another encoding method. When the audio decoder is the decoder that uses the another decoding method, the audio encoder is an encoder that uses the encoding method provided in embodiments of this application.

In a first case, the audio decoder is the decoder that uses the decoding method provided in embodiments of this application, and the audio encoder is the encoder that uses the another encoding method.

In this case, the channel decoding module is configured to perform channel decoding on a received bitstream. The audio decoder is configured to perform source decoding by using the decoding method provided in embodiments of this application. Then, the audio encoder performs encoding by using the another encoding method. Conversion from one format to another format, namely, transcoding, is implemented. Then, the data is sent after channel encoding.

In a second case, the audio decoder is the decoder that uses the another decoding method, and the audio encoder is the encoder that uses the encoding method provided in embodiments of this application.

In this case, the channel decoding module is configured to perform channel decoding on a received bitstream. The audio decoder is configured to perform source decoding by using the another decoding method. Then, the audio encoder performs encoding by using the encoding method provided in embodiments of this application. Conversion from one format to another format, namely, transcoding, is implemented. Then, the data is sent after channel encoding.

The wireless device may be a wireless access point, a wireless router, a wireless connector, or the like. The core network device may be a mobility management entity, a gateway, or the like.

A person skilled in the art should understand that the foregoing wireless device or core network device is merely an example. If another existing or future wireless or core network device is applicable to embodiments of this application, it should also fall within the protection scope of embodiments of this application, and is included herein by reference.

Figure 4:
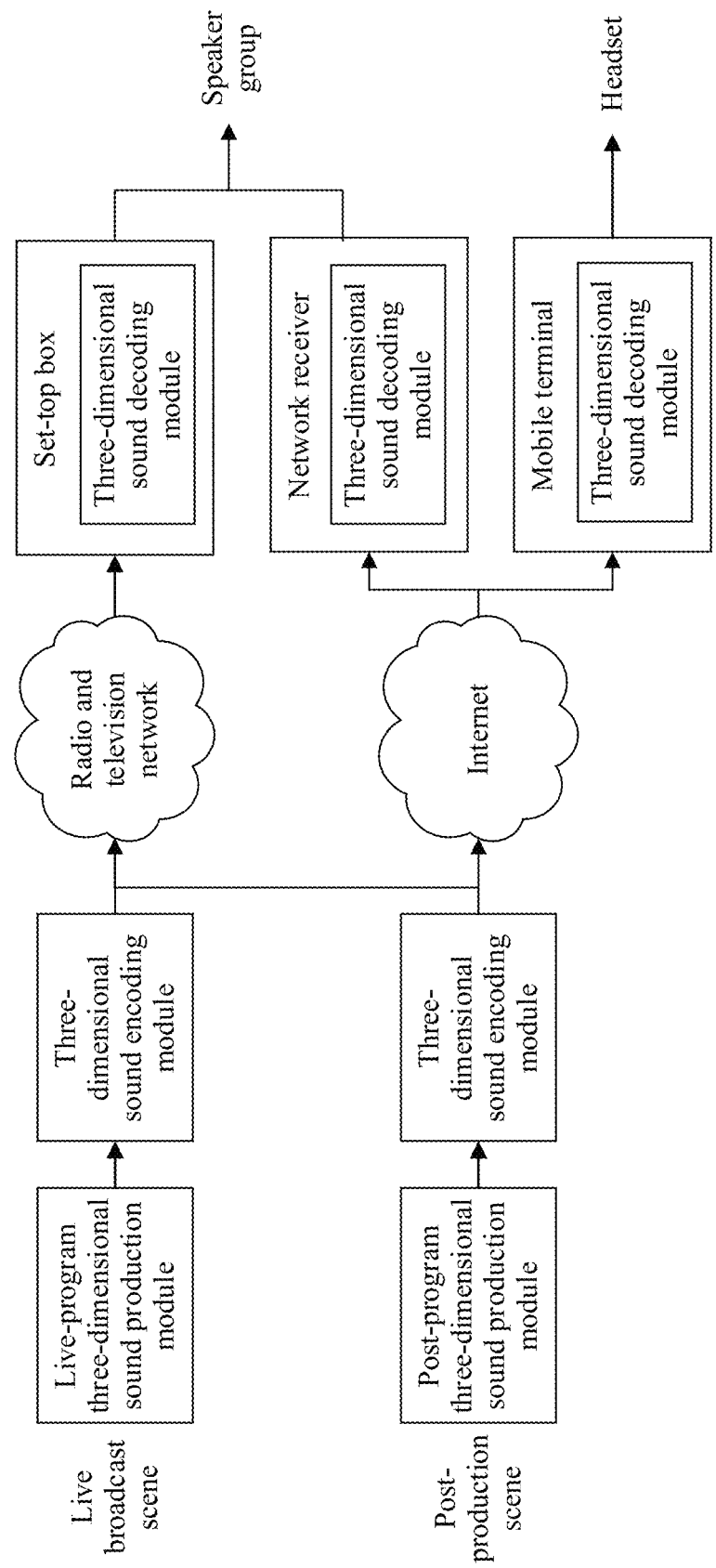
FIG. 4 is a schematic diagram of an implementation environment of a radio and television scene according to an embodiment of this application.

FIG. 4 is a schematic diagram of an implementation environment in which an encoding and decoding method is applied to a radio and television scene according to an embodiment of this application. The radio and television scene includes a live broadcast scene and a post-production scene. For the live broadcast scene, the implementation environment includes a live-program three-dimensional sound production module, a three-dimensional sound encoding module, a set-top box, and a speaker group. The set-top box includes a three-dimensional sound decoding module. For the post-production scene, the implementation environment includes a post-program three-dimensional sound production module, a three-dimensional sound encoding module, a network receiver, a mobile terminal, a headset, and the like.

In the live broadcast scene, the live-program three-dimensional sound production module produces a three-dimensional sound signal. The three-dimensional sound signal is encoded by using the encoding method in embodiments of this application to obtain a bitstream. The bitstream is transmitted to a user side through a radio and television network. A three-dimensional sound decoder in the set-top box decodes the bitstream by using the decoding method provided in embodiments of this application, to reconstruct the three-dimensional sound signal. The speaker group plays back a reconstructed three-dimensional sound signal. Alternatively, the bitstream is transmitted to a user side through the Internet. A three-dimensional sound decoder in a network receiver decodes the bitstream by using the decoding method provided in embodiments of this application, to reconstruct the three-dimensional sound signal. The speaker group plays back a reconstructed three-dimensional sound signal. Alternatively, the bitstream is transmitted to a user side through the Internet. A three-dimensional sound decoder in a mobile terminal decodes the bitstream by using the decoding method provided in embodiments of this application, to reconstruct the three-dimensional sound signal. The headset plays back a reconstructed three-dimensional sound signal.

In the post-production scene, the post-program three-dimensional sound production module produces a three-dimensional sound signal. The three-dimensional sound signal is encoded by using the encoding method in embodiments of this application to obtain a bitstream. The bitstream is transmitted to a user side through a radio and television network. A three-dimensional sound decoder in a set-top box decodes the bitstream by using the decoding method provided in embodiments of this application, to reconstruct the three-dimensional sound signal. The speaker group plays back a reconstructed three-dimensional sound signal. Alternatively, the bitstream is transmitted to a user side through the Internet. A three-dimensional sound decoder in the network receiver decodes the bitstream by using the decoding method provided in embodiments of this application, to reconstruct the three-dimensional sound signal. The speaker group plays back a reconstructed three-dimensional sound signal. Alternatively, the bitstream is transmitted to a user side through the Internet. A three-dimensional sound decoder in the mobile terminal decodes the bitstream by using the decoding method provided in embodiments of this application, to reconstruct the three-dimensional sound signal. The headset plays back a reconstructed three-dimensional sound signal.

Figure 5:
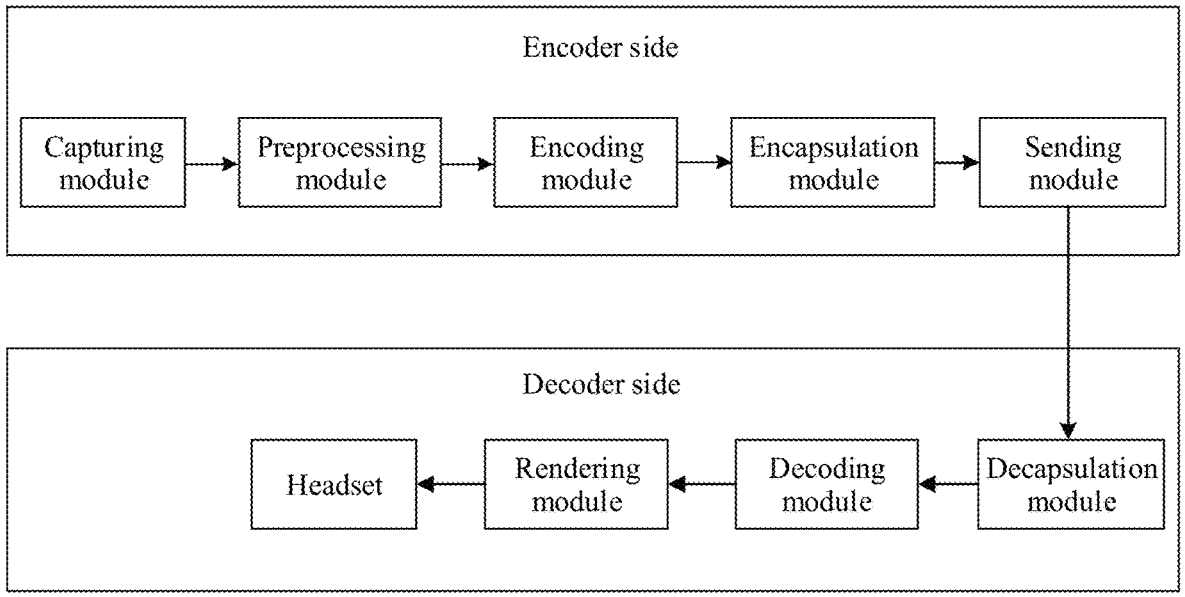
FIG. 5 is a schematic diagram of an implementation environment of a virtual reality streaming scene according to an embodiment of this application.

FIG. 5 is a schematic diagram of an implementation environment in which an encoding and decoding method is applied to a virtual reality streaming scene according to an embodiment of this application. The implementation environment includes an encoder side and a decoder side. The encoder side includes a capturing module, a preprocessing module, an encoding module, an encapsulation module, and a sending module. The decoder side includes a decapsulation module, a decoding module, a rendering module, and a headset.

The capturing module captures an audio signal. Then, the preprocessing module performs a preprocessing operation. The preprocessing operation includes filtering out a low-frequency part from the signal usually with 20 Hz or 50 Hz being a boundary point, extracting orientation information from the signal, and the like. Then, the encoding module performs encoding processing by using the encoding method provided in embodiments of this application. After the encoding, the encapsulation module performs encapsulation. Then, the sending module sends an encapsulated signal to the decoder side.

The decapsulation module at the decoder side first performs decapsulation. The decoding module performs decoding by using the decoding method provided in embodiments of this application. Then, the rendering module performs binaural rendering processing on a decoded signal. A signal obtained through the rendering processing is mapped to a headset of a listener. The headset may be an independent headset, or may be a headset on a glasses device based on virtual reality.

The following explains and describes in detail the encoding and decoding method provided in embodiments of this application. It should be noted that, with reference to the implementation environment shown in FIG. 1, any one of the following encoding methods may be performed by the encoder 100 in the source apparatus 10. Any one of the following decoding methods may be performed by the decoder 200 in the destination apparatus 20.

It should be noted that embodiments of this application may be applied to a codec that does not include a context model, or may be applied to a codec that includes a context model. In addition, in embodiments of this application, not only a latent variable generated by using to-be-encoded media data may be scaled based on a scale factor, but also a latent variable determined by using a context model may be scaled based on a scale factor. Therefore, the following explains and describes in detail the encoding and decoding method provided in embodiments of this application in a plurality of embodiments. In addition, the scale factor and a variable scale factor in embodiments of this application may be unquantized values, or may be quantized values. This is not limited in embodiments of this application.

Figure 6:
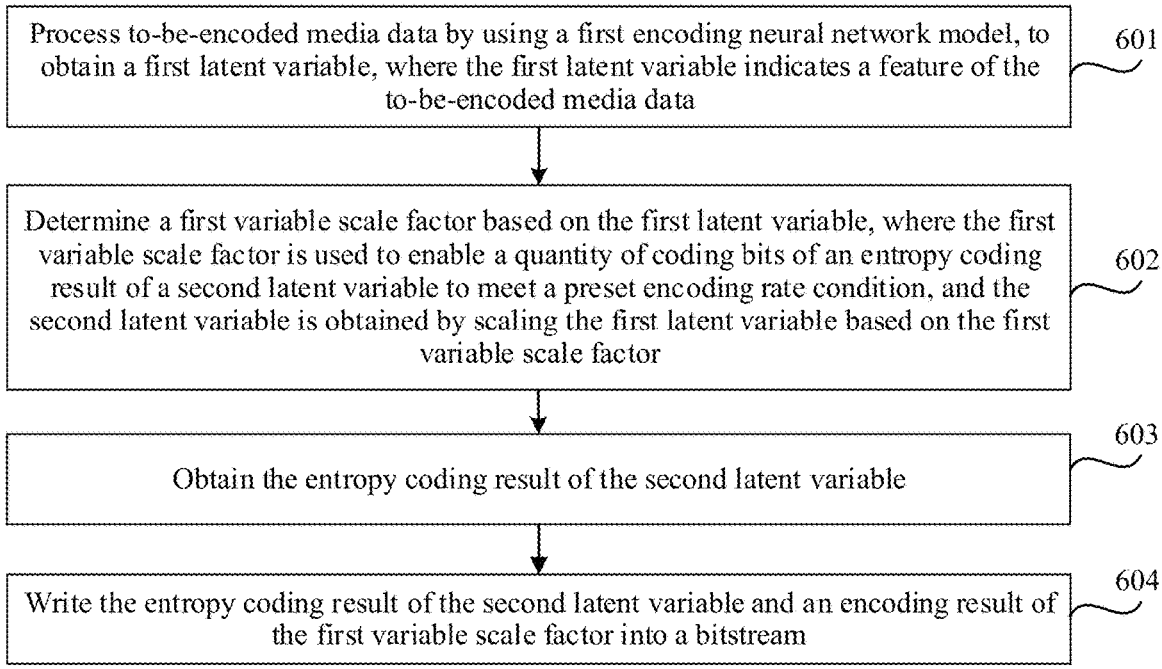
FIG. 6 is a flowchart of a first encoding method according to an embodiment of this application.

FIG. 6 is a flowchart of a first encoding method according to an embodiment of this application. The method does not include a context model, and only a latent variable generated by using to-be-encoded media data is scaled based on a scale factor. The encoding method is applied to an encoder side device, and includes the following operations.

Operation 601: Process the to-be-encoded media data by using a first encoding neural network model, to obtain a first latent variable, where the first latent variable indicates a feature of the to-be-encoded media data.

The to-be-encoded media data is an audio signal, a video signal, an image, or the like. In addition, the to-be-encoded media data may be in any form. This is not limited in this embodiment of this application.

For example, the to-be-encoded media data may be time-domain media data, or may be frequency-domain media data obtained through performing time-frequency transform on the time-domain media data, for example, may be frequency-domain media data obtained through performing MDCT on the time-domain media data, or may be frequency-domain media data obtained through performing fast Fourier transform (FFT) on the time-domain media data. Alternatively, the to-be-encoded media data may be complex-frequency-domain media data obtained through filtering time-domain media data by a quadrature mirror filter (QMF), the to-be-encoded media data is a feature signal extracted from time-domain media data, for example, a Mel-Frequency Cepstral Coefficient, or the to-be-encoded media data may be a residual signal, for example, another encoded residual signal or a residual signal obtained through linear predictive coding (LPC) filtering.

An implementation process of processing the to-be-encoded media data by using the first encoding neural network model is as follows: inputting the to-be-encoded media data into the first encoding neural network model, to obtain the first latent variable output by the first encoding neural network model; or preprocessing the to-be-encoded media data, and inputting preprocessed media data into the first encoding neural network model, to obtain the first latent variable output by the first encoding neural network model.

In other words, the to-be-encoded media data may be used as an input of the first encoding neural network model to determine the first latent variable, or the to-be-encoded media data may be preprocessed and then used as an input of the first encoding neural network model to determine the first latent variable.

The preprocessing operation may be temporal noise shaping (TNS) processing, frequency-domain noise shaping (FDNS) processing, channel downmixing processing, or the like.

The first encoding neural network model is trained in advance. A network structure and a training method of the first encoding neural network model are not limited in this embodiment of this application. For example, the network structure of the first encoding neural network model may be a fully connected network or a convolutional neural network (CNN) network. In addition, a quantity of layers included in the network structure of the first encoding neural network model and a quantity of nodes at each layer are not limited in this embodiment of this application either.

Figure 7:
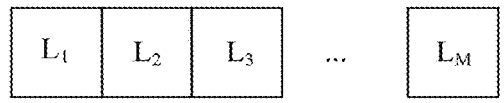
FIG. 7 is a schematic diagram of a form of a first latent variable according to an embodiment of this application.
Figure 8:
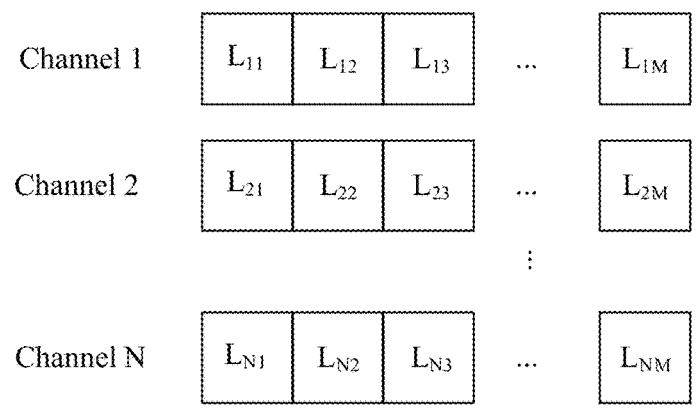
FIG. 8 is a schematic diagram of a form of a second latent variable according to an embodiment of this application.

Forms of latent variables output by encoding neural network models of different network structures may be different. For example, when the network structure of the first encoding neural network model is the fully connected network, the first latent variable is a vector, and a quantity M of dimensions of the vector is a size of the latent variable (latent size), as shown in FIG. 7. When the network structure of the first encoding neural network model is the CNN network, the first latent variable is an N*M-dimensional matrix, where N is a quantity of channels of the CNN network, and M is a size of a latent variable (latent size) of each channel of the CNN network, as shown in FIG. 8. It should be noted that FIG. 7 and FIG. 8 provide only a schematic diagram of the latent variable of the fully connected network and a schematic diagram of the latent variable of the CNN network. A channel sequence number may start from 1 or may start from 0, and element sequence numbers of latent variables in all channels are the same.

Operation 602: Determine a first variable scale factor based on the first latent variable, where the first variable scale factor is used to enable a quantity of coding bits of an entropy coding result of a second latent variable to meet a preset encoding rate condition, and the second latent variable is obtained by scaling the first latent variable based on the first variable scale factor.

In some embodiments, an initial quantity of coding bits may be determined based on the first latent variable, and the first variable scale factor may be determined based on the initial quantity of coding bits and a target quantity of coding bits.

The target quantity of coding bits may be preset. Certainly, the target quantity of coding bits may also be determined based on an encoding rate, and different encoding rates correspond to different target quantities of coding bits.

In this embodiment of this application, the to-be-encoded media data may be encoded at a constant bit rate, or the to-be-encoded media data may be encoded at a variable bit rate.

When the to-be-encoded media data is encoded at the constant bit rate, a quantity of bits of the to-be-encoded media data of a current frame may be determined based on the constant bit rate, and then a quantity of used bits of the current frame is subtracted, to obtain a target quantity of coding bits of the current frame. The quantity of used bits may be a quantity of bits for encoding side information or the like. In addition, generally, side information of each frame of media data is different. Therefore, a target quantity of coding bits of each frame of media data is usually different.

When the to-be-encoded media data is encoded at the variable bit rate, a bit rate is usually specified, and an actual bit rate fluctuates around the specified bit rate. In this case, a quantity of bits of the to-be-encoded media data of a current frame may be determined based on the specified bit rate, and then a quantity of used bits of the current frame is subtracted, to obtain a target quantity of coding bits of the current frame. The quantity of used bits may be a quantity of bits for encoding side information or the like. In some cases, side information of different frames of media data may be different. Therefore, target quantities of coding bits of different frames of media data are usually different.

The following separately explains and describes in detail processes of determining the initial quantity of coding bits and the first variable scale factor.

Determine the Initial Quantity of Coding Bits

There may be two manners of determining the initial quantity of coding bits based on the first latent variable. The following separately describes the manners.

In a first implementation, a quantity of coding bits of an entropy coding result of the first latent variable is determined, to obtain the initial quantity of coding bits. In other words, the initial quantity of coding bits is the quantity of coding bits of the entropy coding result of the first latent variable.

In an example, quantization processing is performed on the first latent variable, to obtain a quantized first latent variable. Entropy coding is performed on the quantized first latent variable, to obtain an initial encoding result of the first latent variable. A quantity of coding bits of the initial encoding result of the first latent variable is counted, to obtain the initial quantity of coding bits.

There may be a plurality of manners of performing quantization processing on the first latent variable. For example, scalar quantization is performed on each element in the first latent variable. A quantization operation of scalar quantization may be determined based on different encoding rates. In other words, a correspondence between an encoding rate and a quantization operation is stored in advance, and a corresponding quantization operation may be obtained from the correspondence based on an encoding rate used in this embodiment of this application. In addition, scalar quantization may further have an offset, that is, after offset processing is performed on the first latent variable based on the offset, scalar quantization is performed based on the quantization operation.

When entropy coding is performed on the quantized first latent variable, entropy coding may be performed based on a scalable entropy coding model, or entropy coding may be performed by using an entropy coding model with a preset probability distribution. This is not limited in this embodiment of this application. Entropy coding may use one of arithmetic coding, range coding (RC), or Huffman coding. This is not limited in this embodiment of this application.

It should be noted that the following quantization processing manner and entropy coding manner are similar to those herein. For the following quantization processing manner and entropy coding manner, refer to the manners herein. Details are not described in the following in this embodiment of this application.

In a second implementation, the first latent variable is scaled based on a first initial scale factor, and a quantity of coding bits of an entropy coding result of a scaled first latent variable is determined, to obtain the initial quantity of coding bits. In other words, the initial quantity of coding bits is the quantity of coding bits of the entropy coding result of the first latent variable scaled based on the first initial scale factor. The first initial scale factor may be a first preset scale factor.

In an example, the first latent variable is scaled based on the first initial scale factor to obtain the scaled first latent variable, and quantization processing is performed on the scaled first latent variable, to obtain a quantized first latent variable. Entropy coding is performed on the quantized first latent variable, to obtain an initial encoding result of the first latent variable. A quantity of coding bits of the initial encoding result of the first latent variable is counted, to obtain the initial quantity of coding bits.

An implementation process of scaling the first latent variable based on the first initial scale factor is as follows: multiplying each element in the first latent variable by a corresponding element in the first initial scale factor, to obtain the scaled first latent variable.

It should be noted that the foregoing implementation process is merely an example, and during actual application, another method may be used for scaling. For example, each element in the first latent variable may be divided by a corresponding element in the first initial scale factor, to obtain the scaled first latent variable. A scaling method is not limited in this embodiment of this application.

It should be noted that, in this embodiment of this application, an initial value of a scale factor is set for the first latent variable, and the initial value of the scale factor is usually equal to 1. The first preset scale factor may be greater than or equal to the initial value of the scale factor, or may be less than the initial value of the scale factor. For example, the first preset scale factor is a constant such as 1 or 2. When the initial quantity of coding bits is determined in the first implementation, the first initial scale factor is the initial value of the scale factor. When the initial quantity of coding bits is determined in the second implementation, the first initial scale factor is the first preset scale factor.

In addition, the first initial scale factor may be a scalar or a vector. For example, it is assumed that the network structure of the first encoding neural network model is the fully connected network, the first latent variable output by the first encoding neural network model is a vector, and a quantity M of dimensions of the vector is a size of the first latent variable (latent size). If the first initial scale factor is a scalar, scale factor values corresponding to all elements in the first latent variable whose quantity of dimensions is M and that is a vector are the same, that is, the first initial scale factor includes one element. If the first initial scale factor is a vector, scale factor values corresponding to all elements in the first latent variable vector whose quantity of dimensions is M and that is a vector are not the same, and a plurality of elements may share one scale factor value, that is, the first initial scale factor includes a plurality of elements, and each element corresponds to one or more elements in the first latent variable.

Similarly, it is assumed that the network structure of the first encoding neural network model is the CNN network, the first latent variable output by the first encoding neural network model is an N*M-dimensional matrix, where N is a quantity of channels of the CNN network, and M is a size of a latent variable (latent size) of each channel of the CNN network. If the first initial scale factor is a scalar, scale factor values corresponding to all elements in the N*M-dimensional first latent variable matrix are the same, that is, the first initial scale factor includes one element. If the first initial scale factor is a vector, scale factor values corresponding to all elements in the N*M-dimensional first latent variable matrix are not the same, and elements of latent variables falling within a same channel may correspond to a same scale factor value, that is, the first initial scale factor includes N elements, and each element corresponds to M elements with a same channel sequence number in the first latent variable.

Determine the First Variable Scale Factor

The first variable scale factor is a final value of a scale factor of the first latent variable. A second latent variable is obtained by scaling the first latent variable based on the first variable scale factor, and the quantity of coding bits of the entropy coding result of the second latent variable meets the preset encoding rate condition. When the to-be-encoded media data is encoded at the constant bit rate, the meeting a preset encoding rate condition includes that the quantity of coding bits is less than or equal to a target quantity of coding bits. Alternatively, the meeting a preset encoding rate condition includes that the quantity of coding bits is less than or equal to the target quantity of coding bits, and a difference between the quantity of coding bits and the target quantity of coding bits is less than a bit quantity threshold. When the to-be-encoded media data is encoded at the variable bit rate, the meeting a preset encoding rate condition includes that an absolute value of a difference between the quantity of coding bits and a target quantity of coding bits is less than a bit quantity threshold. In other words, the meeting a preset encoding rate condition includes that the quantity of coding bits is less than or equal to the target quantity of coding bits, and a difference between the target quantity of coding bits and the quantity of coding bits is less than the bit quantity threshold. Alternatively, the meeting a preset encoding rate condition includes that the quantity of coding bits is greater than or equal to the target quantity of coding bits, and the difference between the quantity of coding bits and the target quantity of coding bits is less than the bit quantity threshold.

It should be noted that the bit quantity threshold may be preset, and the bit quantity threshold may be adjusted based on different requirements.

There may be a plurality of implementations of determining the first variable scale factor based on the initial quantity of coding bits and the target quantity of coding bits. The following describes three of the implementations.

In a first implementation, when the initial quantity of coding bits is equal to the target quantity of coding bits, the first initial scale factor is determined as the first variable scale factor. When the initial quantity of coding bits is not equal to the target quantity of coding bits, the first variable scale factor is determined in a first cyclic manner based on the initial quantity of coding bits and the target quantity of coding bits.

$i^{th}$ cyclic processing of the first cyclic manner includes the following operations: determining a scale factor of the $i^{th}$ cyclic processing, where i is a positive integer; scaling the first latent variable based on the scale factor of the $i^{th}$ cyclic processing, to obtain an $i^{th}$-scaled first latent variable; determining a quantity of coding bits of an entropy coding result of the $i^{th}$-scaled first latent variable, to obtain an $i^{th}$ quantity of coding bits; and when the $i^{th}$ quantity of coding bits meets a continuing scaling condition, performing $(i+1)^{th}$ cyclic processing of the first cyclic manner; or when the $i^{th}$ quantity of coding bits does not meet a continuing scaling condition, terminating execution of the first cyclic manner, and determining the first variable scale factor based on the scale factor of the $i^{th}$ cyclic processing.

An implementation process of determining the scale factor of the $i^{th}$ cyclic processing is as follows: determining the scale factor of the $i^{th}$ cyclic processing based on a scale factor of $(i-1)^{th}$ cyclic processing of the first cyclic manner, an $(i-1)^{th}$ quantity of coding bits, and the target quantity of coding bits. When i=1, the scale factor of the $(i-1)^{th}$ cyclic processing is the first initial scale factor, and the $(i-1)^{th}$ quantity of coding bits is the initial quantity of coding bits.

In this case, the continuing scaling condition includes that both the $(i-1)^{th}$ quantity of coding bits and the $i^{th}$ quantity of coding bits are less than the target quantity of coding bits, or the continuing scaling condition includes that both the $(i-1)^{th}$ quantity of coding bits and the $i^{th}$ quantity of coding bits are greater than the target quantity of coding bits.

In other words, the continuing scaling condition includes that the $i^{th}$ quantity of coding bits does not exceed the target quantity of coding bits. Herein, "does not exceed" means that a quantity of coding bits at the first (i−1) times is always less than the target quantity of coding bits, and the $i^{th}$ quantity of coding bits is still less than the target quantity of coding bits. Alternatively, a quantity of coding bits at the first (i−1) times is always greater than the target quantity of coding bits, and the $i^{th}$ quantity of coding bits is still greater than the target quantity of coding bits. Conversely, "exceeds" means that a quantity of coding bits at the first (i−1) times is always less than the target quantity of coding bits, and the $i^{th}$ quantity of coding bits is greater than the target quantity of coding bits. Alternatively, a quantity of coding bits at the first (i−1) times is always greater than the target quantity of coding bits, and the $i^{th}$ quantity of coding bits is less than the target quantity of coding bits.

In an example, when the scale factor is a quantized value, the scale factor of the $i^{th}$ cyclic processing may be determined based on the scale factor of the $(i-1)^{th}$ cyclic processing of the first cyclic manner, the $(i-1)^{th}$ quantity of coding bits, and the target quantity of coding bits according to the following formula (1).

$$\text{scale}(i) = Q\{\text{scale}(i-1) * [\text{target}/\text{curr}(i-1)]\} \quad (1)$$

In the foregoing formula (1), scale(i) is the scale factor of the $i^{th}$ cyclic processing, scale(i-1) is the scale factor of the $(i-1)^{th}$ cyclic processing, target is the target quantity of coding bits, and curr(i-1) is the $(i-1)^{th}$ quantity of coding bits. i is a positive integer greater than 0. $Q\{x\}$ is to obtain a quantized value of X.

It should be noted that, when the scale factor is an unquantized value, when the scale factor of the $i^{th}$ cyclic processing is determined according to the foregoing formula (1), on the right of the equation of the foregoing formula (1) may not be processed by using $Q\{x\}$.

An implementation process of determining the first variable scale factor based on the scale factor of the $i^{th}$ cyclic processing includes: when the $i^{th}$ quantity of coding bits is equal to the target quantity of coding bits, determining the scale factor of the $i^{th}$ cyclic processing as the first variable scale factor; or when the $i^{th}$ quantity of coding bits is not equal to the target quantity of coding bits, determining the first variable scale factor based on the scale factor of the $i^{th}$ cyclic processing and the scale factor of the $(i-1)^{th}$ cyclic processing.

In other words, the scale factor of the $i^{th}$ cyclic processing is a scale factor obtained for the last time in the first cyclic manner, and the $i^{th}$ quantity of coding bits is a quantity of coding bits obtained for the last time. When the quantity of coding bits obtained for the last time is equal to the target quantity of coding bits, the scale factor obtained for last time is determined as the first variable scale factor. When the quantity of coding bits obtained for the last time is not equal to the target quantity of coding bits, the first variable scale factor is determined based on scale factors obtained for the last two times.

In some embodiments, an implementation process of determining the first variable scale factor based on the scale factor of the $i^{th}$ cyclic processing and the scale factor of the $(i-1)^{th}$ cyclic processing includes: determining an average value of the scale factor of the $i^{th}$ cyclic processing and the scale factor of the $(i-1)^{th}$ cyclic processing, and determining the first variable scale factor based on the average value.

In an example, the average value may be directly determined as the first variable scale factor, or the average value may be multiplied by a preset constant to obtain the first variable scale factor. In some embodiments, the constant may be less than 1.

In some other embodiments, an implementation process of determining the first variable scale factor based on the scale factor of the $i^{th}$ cyclic processing and the scale factor of the $(i-1)^{th}$ cyclic processing includes: determining the first variable scale factor in a second cyclic manner based on the scale factor of the $i^{th}$ cyclic processing and the scale factor of the $(i-1)^{th}$ cyclic processing.

In an example, $j^{th}$ cyclic processing of the second cyclic manner includes the following operations: determining a third scale factor of the $j^{th}$ cyclic processing based on a first scale factor of the $j^{th}$ cyclic processing and a second scale factor of the $j^{th}$ cyclic processing, where when j is equal to 1, the first scale factor of the $j^{th}$ cyclic processing is one of the scale factor of the $i^{th}$ cyclic processing and the scale factor of the $(i-1)^{th}$ cyclic processing, the second scale factor of the $j^{th}$ cyclic processing is the other one of the scale factor of the $i^{th}$ cyclic processing and the scale factor of the $(i-1)^{th}$ cyclic processing, the first scale factor of the $j^{th}$ cyclic processing corresponds to a $j^{th}$ first quantity of coding bits, the second scale factor of the $j^{th}$ cyclic processing corresponds to a $j^{th}$ second quantity of coding bits, the $j^{th}$ first quantity of coding bits is a quantity of coding bits of an entropy coding result of a first latent variable scaled based on the first scale factor of the $j^{th}$ cyclic processing, the $j^{th}$ second quantity of coding bits is a quantity of coding bits of an entropy coding result of a first latent variable scaled based on the second scale factor of the $j^{th}$ cyclic processing, and the $j^{th}$ first quantity of coding bits is less than the $j^{th}$ second quantity of coding bits; obtaining a $j^{th}$ third quantity of coding bits, where the $j^{th}$ third quantity of coding bits is a quantity of coding bits of an entropy coding result of a first latent variable scaled based on the third scale factor of the $j^{th}$ cyclic processing; and if the $j^{th}$ third quantity of coding bits does not meet a continuing cycle condition, terminating execution of the second cyclic manner, and determining the third scale factor of the $j^{th}$ cyclic processing as the first variable scale factor; if the $j^{th}$ third quantity of coding bits meets a continuing cycle condition, and is greater than the target quantity of coding bits and less than the $j^{th}$ second quantity of coding bits, performing $(j+1)^{th}$ cyclic processing of the second cyclic manner by using the third scale factor of the $j^{th}$ cyclic processing as a second scale factor of the $(j+1)^{th}$ cyclic processing and using the first scale factor of the $j^{th}$ cyclic processing as a first scale factor of the $(j+1)^{th}$ cyclic processing; or if the $j^{th}$ third quantity of coding bits meets a continuing cycle condition, and is less than the target quantity of coding bits and greater than the $j^{th}$ first quantity of coding bits, performing $(j+1)^{th}$ cyclic processing of the second cyclic manner by using the third scale factor of the $j^{th}$ cyclic processing as a first scale factor of the $(j+1)^{th}$ cyclic processing and using the second scale factor of the $j^{th}$ cyclic processing as a second scale factor of the $(j+1)^{th}$ cyclic processing.

In another example, $j^{th}$ cyclic processing of the second cyclic manner includes the following operations: determining a third scale factor of the $j^{th}$ cyclic processing based on a first scale factor of the $j^{th}$ cyclic processing and a second scale factor of the $j^{th}$ cyclic processing, where when j is equal to 1, the first scale factor of the $j^{th}$ cyclic processing is one of the scale factor of the $i^{th}$ cyclic processing and the scale factor of the $(i-1)^{th}$ cyclic processing, the second scale factor of the $j^{th}$ cyclic processing is the other one of the scale factor of the $i^{th}$ cyclic processing and the scale factor of the $(i-1)^{th}$ cyclic processing, the first scale factor of the $j^{th}$ cyclic processing corresponds to a $j^{th}$ first quantity of coding bits, the second scale factor of the $j^{th}$ cyclic processing corresponds to a $j^{th}$ second quantity of coding bits, the $j^{th}$ first quantity of coding bits is less than the $j^{th}$ second quantity of coding bits, and j is a positive integer; obtaining a $j^{th}$ third quantity of coding bits, where the $j^{th}$ third quantity of coding bits is a quantity of coding bits of an entropy coding result of a first latent variable scaled based on the third scale factor of the $j^{th}$ cyclic processing; and if the $j^{th}$ third quantity of coding bits does not meet a continuing cycle condition, terminating execution of the second cyclic manner, and determining the third scale factor of the $j^{th}$ cyclic processing as the first variable scale factor; if j reaches a maximum quantity of cycles and the $j^{th}$ third quantity of coding bits meets a continuing cycle condition, terminating execution of the second cyclic manner, and determining the first variable scale factor based on the first scale factor of the $j^{th}$ cyclic processing; if j does not reach a maximum quantity of cycles, and the $j^{th}$ third quantity of coding bits meets a continuing cycle condition, and is greater than the target quantity of coding bits and less than the $j^{th}$ second quantity of coding bits, performing $(j+1)^{th}$ cyclic processing of the second cyclic manner by using the third scale factor of the $j^{th}$ cyclic processing as a second scale factor of the $(j+1)^{th}$ cyclic processing and using the first scale factor of the $j^{th}$ cyclic processing as a first scale factor of the $(j+1)^{th}$ cyclic processing; or if j does not reach a maximum quantity of cycles, and the $j^{th}$ third quantity of coding bits meets a continuing cycle condition, and is less than the target quantity of coding bits and greater than the $j^{th}$ first quantity of coding bits, performing $(j+1)^{th}$ cyclic processing of the second cyclic manner by using the third scale factor of the $j^{th}$ cyclic processing as a first scale factor of the $(j+1)^{th}$ cyclic processing and using the second scale factor of the $j^{th}$ cyclic processing as a second scale factor of the $(j+1)^{th}$ cyclic processing.

An implementation process of determining the third scale factor of the $j^{th}$ cyclic processing based on the first scale factor of the $j^{th}$ cyclic processing and the second scale factor of the $j^{th}$ cyclic processing includes: determining an average value of the first scale factor of the $j^{th}$ cyclic processing and the second scale factor of the $j^{th}$ cyclic processing, and determining the third scale factor of the $j^{th}$ cyclic processing based on the average value. In an example, the average value may be directly determined as the third scale factor of the $j^{th}$ cyclic processing, or the average value may be multiplied by a preset constant to obtain the third scale factor of the $j^{th}$ cyclic processing. In some embodiments, the constant may be less than 1.

In addition, an implementation process of obtaining the $j^{th}$ third quantity of coding bits includes: scaling the first latent variable based on the third scale factor of the $j^{th}$ cyclic processing to obtain a scaled first latent variable, and performing quantization processing on the scaled first latent variable to obtain a quantized first latent variable; and performing entropy coding on the quantized first latent variable, and counting a quantity of coding bits of an entropy coding result, to obtain the $j^{th}$ third quantity of coding bits.

When the to-be-encoded media data is encoded at a constant bit rate, an implementation process of determining the first variable scale factor based on the first scale factor of the $j^{th}$ cyclic processing includes: determining the first scale factor of the $j^{th}$ cyclic processing as the first variable scale factor. When the to-be-encoded media data is encoded at a variable bit rate, an implementation process of determining the first variable scale factor based on the first scale factor of the $j^{th}$ cyclic processing includes: determining a first difference between the target quantity of coding bits and the $j^{th}$ first quantity of coding bits, and determining a second difference between the $j^{th}$ second quantity of coding bits and the target quantity of coding bits; and if the first difference is less than the second difference, determining the first scale factor of the $j^{th}$ cyclic processing as the first variable scale factor; if the second difference is less than the first difference, determining the second scale factor of the $j^{th}$ cyclic processing as the first variable scale factor; or if the first difference is equal to the second difference, determining the first scale factor of the $j^{th}$ cyclic processing as the first variable scale factor, or determining the second scale factor of the $j^{th}$ cyclic processing as the first variable scale factor.

When the to-be-encoded media data is encoded at a constant bit rate, the continuing cycle condition includes that the $j^{th}$ third quantity of coding bits is greater than the target quantity of coding bits, or the continuing cycle condition includes that the $j^{th}$ third quantity of coding bits is less than the target quantity of coding bits, and a difference between the target quantity of coding bits and the $j^{th}$ third quantity of coding bits is greater than a bit quantity threshold. When the to-be-encoded media data is encoded at a variable bit rate, the continuing cycle condition includes that an absolute value of a difference between the target quantity of coding bits and the $j^{th}$ third quantity of coding bits is greater than a bit quantity threshold. In other words, the continuing cycle condition includes that the $j^{th}$ third quantity of coding bits is greater than the target quantity of coding bits, and a difference between the $j^{th}$ third quantity of coding bits and the target quantity of coding bits is greater than the bit quantity threshold, or the continuing cycle condition includes that the $j^{th}$ third quantity of coding bits is less than the target quantity of coding bits, and the difference between the target quantity of coding bits and the $j^{th}$ third quantity of coding bits is greater than the bit quantity threshold.

In other words, when the to-be-encoded media data is encoded at the constant bit rate, the continuing cycle condition includes: bits_curr>target||(bits_curr<target && (target-bits_curr)>TH), and when the to-be-encoded media data is encoded at the variable bit rate, the continuing cycle condition includes: bits_curr>target && (bits_curr-target)>TH||(bits_curr<target && (target-bits_curr)>TH). bits_curr is the $j^{th}$ third quantity of coding bits, target is the target quantity of coding bits, and TH is the bit quantity threshold.

The first scale factor of the $j^{th}$ cyclic processing may be denoted as scale_lower, the $j^{th}$ first quantity of coding bits may be denoted as bits_lower, the second scale factor of the $j^{th}$ cyclic processing may be denoted as scale upper, the $j^{th}$ second quantity of coding bits may be denoted as bits_upper, the third scale factor of the $j^{th}$ cyclic processing may be denoted as scale_curr, and pseudocode for using the third scale factor of the $j^{th}$ cyclic processing as the first scale factor of the $(j+1)^{th}$ cyclic processing or the second scale factor of the $(j+1)^{th}$ cyclic processing is as follows:

```
if bits_curr > target & bits_curr < bits_upper
    scale_upper = scale_curr
    bits_upper = bits_curr
else if bits_curr < target & bits_curr >bits_lower
    scale_lower = scale_curr
    bits_lower = bits_curr
```

In a second implementation, when the initial quantity of coding bits is equal to the target quantity of coding bits, the first initial scale factor is determined as the first variable scale factor. When the initial quantity of coding bits is not equal to the target quantity of coding bits, the first variable scale factor is determined according to the foregoing first implementation. However, a difference from the foregoing first implementation lies in that, when the initial quantity of coding bits is less than the target quantity of coding bits, a scale factor of $(i-1)^{th}$ cyclic processing is scaled based on a first operation, to obtain the scale factor of the $i^{th}$ cyclic processing. In this case, the continuing scaling condition includes that the $i^{th}$ quantity of coding bits is less than the target quantity of coding bits. When the initial quantity of coding bits is greater than the target quantity of coding bits, a scale factor of $(i-1)^{th}$ cyclic processing is scaled based on a second operation, to obtain the scale factor of the $i^{th}$ cyclic processing. In this case, the continuing scaling condition includes that the $i^{th}$ quantity of coding bits is greater than the target quantity of coding bits.

That a scale factor of $(i-1)^{th}$ cyclic processing is scaled based on a first operation may refer to increasing the scale factor of the $(i-1)^{th}$ cyclic processing based on the first operation, and that a scale factor of $(i-1)^{th}$ cyclic processing is scaled based on a second operation may refer to decreasing the scale factor of the $(i-1)^{th}$ cyclic processing based on the second operation.

The increasing processing and the decreasing processing may be linear or non-linear. For example, a sum of the scale factor of the $(i-1)^{th}$ cyclic processing and the first operation may be determined as the scale factor of the $i^{th}$ cyclic processing, or a difference between the scale factor of the $(i-1)^{th}$ cyclic processing and the second operation may be determined as the scale factor of the $i^{th}$ cyclic processing.

It should be noted that the first operation and the second operation may be preset, and the first operation and the second operation may be adjusted based on different requirements. In addition, the first operation may be equal to or unequal to the second operation.

In a third implementation, when the initial quantity of coding bits is less than or equal to the target quantity of coding bits, the first initial scale factor is determined as the first variable scale factor. When the initial quantity of coding bits is greater than the target quantity of coding bits, the first variable scale factor may be determined according to the foregoing first implementation. Alternatively, the first variable scale factor may be determined when the initial quantity of coding bits is greater than the target quantity of coding bits in the foregoing second implementation.

Operation 603: Obtain the entropy coding result of the second latent variable.

In the process of determining the first variable scale factor in the operation 602, the first variable scale factor may be the first initial scale factor, may be the scale factor of the $i^{th}$ cyclic processing, may be the third scale factor of the $j^{th}$ cyclic processing, or may be determined and obtained based on the first scale factor of the $j^{th}$ cyclic processing. In either case, a corresponding entropy coding result is determined in the foregoing cycle process. Therefore, an entropy coding result corresponding to the first variable scale factor, that is, the entropy coding result of the second latent variable, may be directly obtained from the entropy coding result determined in the foregoing cycle process.

Certainly, the processing may be performed again. In other words, the first latent variable is scaled directly based on the first variable scale factor, to obtain the second latent variable. Quantization processing is performed on the second latent variable, to obtain a quantized second latent variable. Entropy coding is performed on the quantized second latent variable, to obtain the entropy coding result of the second latent variable.

Based on the foregoing description, the first initial scale factor may be a scalar or a vector, and the first variable scale factor is determined based on the first initial scale factor. Therefore, the first variable scale factor may be a scalar or a vector.

In other words, the first variable scale factor includes one or more elements, and when the first variable scale factor includes a plurality of elements, one element in the first variable scale factor corresponds to one or more elements in the first latent variable.

Operation 604: Write the entropy coding result of the second latent variable and an encoding result of the first variable scale factor into a bitstream.

Based on the foregoing description, the first variable scale factor may be an unquantized value, or may be a quantized value. If the first variable scale factor is the unquantized value, an implementation process of determining the encoding result of the first variable scale factor includes: performing quantization and encoding processing on the first variable scale factor, to obtain the encoding result of the first variable scale factor. If the first variable scale factor is the quantized value, an implementation process of determining the encoding result of the first variable scale factor includes: encoding the first variable scale factor, to obtain the encoding result of the first variable scale factor.

The first variable scale factor may be encoded in any encoding manner. This is not limited in this embodiment of this application.

In addition, for some encoders, a quantization process and an encoding process are performed in one processing, that is, a quantization result and an encoding result can be obtained through one processing. Therefore, for the first variable scale factor, the encoding result of the first variable scale factor may also be obtained in the foregoing process of determining the first variable scale factor. Therefore, the encoding result of the first variable scale factor may be directly obtained. In other words, the encoding result of the first variable scale factor may also be directly obtained in the process of determining the first variable scale factor.

In some embodiments, if the first variable scale factor is the unquantized value, in this embodiment of this application, a quantization index corresponding to a quantization operation of the first variable scale factor may be further determined, to obtain a first quantization index. In some embodiments, in this embodiment of this application, a quantization index corresponding to a quantization operation of the second latent variable may be further determined, to obtain a second quantization index. The first quantization index and the second quantization index are encoded into the bitstream. The quantization index indicates a corresponding quantization operation, that is, the first quantization index indicates the quantization operation of the first variable scale factor, and the second quantization index indicates the quantization operation of the second latent variable.

In this embodiment of this application, the first latent variable is scaled based on the first variable scale factor to obtain the second latent variable, and the quantity of coding bits of the entropy coding result of the second latent variable meets the preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

Figure 9:
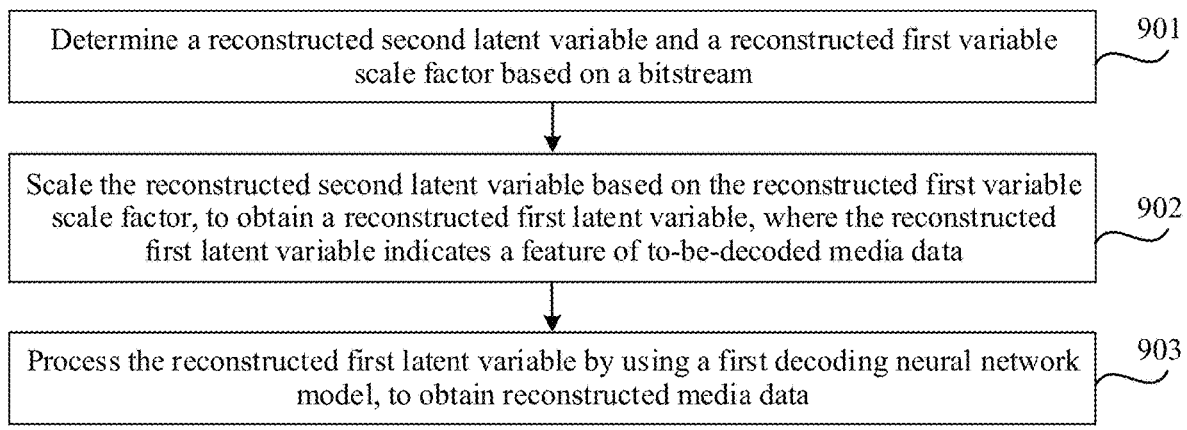
FIG. 9 is a flowchart of a first decoding method according to an embodiment of this application.

FIG. 9 is a flowchart of a first decoding method according to an embodiment of this application. The method is applied to a decoder side. The method corresponds to the encoding method shown in FIG. 6. The method includes the following operations.

Operation 901: Determine a reconstructed second latent variable and a reconstructed first variable scale factor based on a bitstream.

In some embodiments, entropy decoding may be performed on an entropy coding result of a second latent variable in the bitstream, and an encoding result of a first variable scale factor in the bitstream may be decoded, to obtain a quantized second latent variable and a quantized first variable scale factor. Dequantization processing is performed on the quantized second latent variable and the quantized first variable scale factor, to obtain the reconstructed second latent variable and the reconstructed first variable scale factor.

The decoding method in this operation corresponds to the encoding method at an encoder side, and the dequantization processing in this operation corresponds to the quantization processing at the encoder side. In other words, the decoding method is an inverse process of the encoding method, and the dequantization processing is an inverse process of the quantization processing.

For example, the bitstream may be parsed, to obtain a first quantization index and a second quantization index. The first quantization index indicates a quantization operation of the first variable scale factor, and the second quantization index indicates a quantization operation of the second latent variable. Dequantization processing is performed on the quantized first variable scale factor based on the quantization operation indicated by the first quantization index, to obtain the reconstructed first variable scale factor. Dequantization processing is performed on the quantized second latent variable based on the quantization operation indicated by the second quantization index, to obtain the reconstructed second latent variable.

Operation 902: Scale the reconstructed second latent variable based on the reconstructed first variable scale factor, to obtain a reconstructed first latent variable, where the reconstructed first latent variable indicates a feature of to-be-decoded media data.

Because the second latent variable is obtained by scaling a first latent variable based on the first variable scale factor, the reconstructed second latent variable may be scaled based on the reconstructed first variable scale factor, to obtain the reconstructed first latent variable.

A process of scaling the reconstructed second latent variable based on the reconstructed first variable scale factor is an inverse process of scaling the first latent variable by the encoder side. For example, when the encoder side multiplies each element in the first latent variable by a corresponding element in the first variable scale factor, each element in the reconstructed second latent variable may be divided by a corresponding element in the reconstructed first variable scale factor, to obtain the reconstructed first latent variable. When the encoder side divides each element in the first latent variable by a corresponding element in the first variable scale factor, each element in the reconstructed second latent variable may be multiplied by a corresponding element in the reconstructed first variable scale factor, to obtain the reconstructed first latent variable.

Based on the foregoing description, a first initial scale factor may be a scalar or a vector. Therefore, the finally obtained first variable scale factor may be a scalar or a vector. For example, it is assumed that a network structure of a first encoding neural network model is a fully connected network, the second latent variable is a vector, and a quantity M of dimensions of the vector is a size of the second latent variable (latent size). If the first variable scale factor is a scalar, scale factor values corresponding to all elements in the second latent variable whose quantity of dimensions is M and that is a vector are the same, that is, the first variable scale factor includes one element. If the first variable scale factor is a vector, scale factor values corresponding to all elements in the second latent variable vector whose quantity of dimensions is M and that is a vector are not the same, and a plurality of elements may share one scale factor value, that is, the first variable scale factor includes a plurality of elements, and each element corresponds to one or more elements in the second latent variable.

Similarly, it is assumed that a network structure of a first encoding neural network model is a CNN network, the second latent variable is an N*M-dimensional matrix, where N is a quantity of channels of the CNN network, and M is a size of a latent variable (latent size) of each channel of the CNN network. If the first variable scale factor is a scalar, scale factor values corresponding to all elements in the N*M-dimensional second latent variable matrix are the same, that is, the first variable scale factor includes one element. If the first variable scale factor is a vector, scale factor values corresponding to all elements in the N*M-dimensional second latent variable matrix are not the same, and elements of latent variables falling within a same channel may correspond to a same scale factor value, that is, the first variable scale factor includes N elements, and each element corresponds to M elements with a same channel sequence number in the second latent variable.

Operation 903: Process the reconstructed first latent variable by using a first decoding neural network model, to obtain reconstructed media data.

In some embodiments, the reconstructed first latent variable may be input into the first decoding neural network model, to obtain the reconstructed media data output by the first decoding neural network model. Alternatively, the reconstructed first latent variable is post-processed, and a post-processed first latent variable is input into the first decoding neural network model, to obtain the reconstructed media data output by the first decoding neural network model.

In other words, the reconstructed first latent variable may be used as an input of the first decoding neural network model to determine the reconstructed media data, or the reconstructed first latent variable may be post-processed and then used as an input of the first decoding neural network model to determine the reconstructed media data.

The first decoding neural network model corresponds to the first encoding neural network model, and both are pre-trained. A network structure and a training method of the first decoding neural network model are not limited in this embodiment of this application. For example, the network structure of the first decoding neural network model may be a fully connected network or a CNN network. In addition, a quantity of layers included in the network structure of the first decoding neural network model and a quantity of nodes at each layer are not limited in this embodiment of this application either.

When the media data is an audio signal and a video signal, an output of the first decoding neural network model may be reconstructed time-domain media data, or may be reconstructed frequency-domain media data. If the output is the frequency-domain media data, transformation from frequency domain to time domain needs to be performed to obtain the time-domain media data. Alternatively, an output of the first decoding neural network model may be a residual signal. In this case, other corresponding processing needs to be performed to obtain the audio signal or the video signal.

In this embodiment of this application, a quantity of coding bits of the entropy coding result of the second latent variable meets a preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

Figure 10:
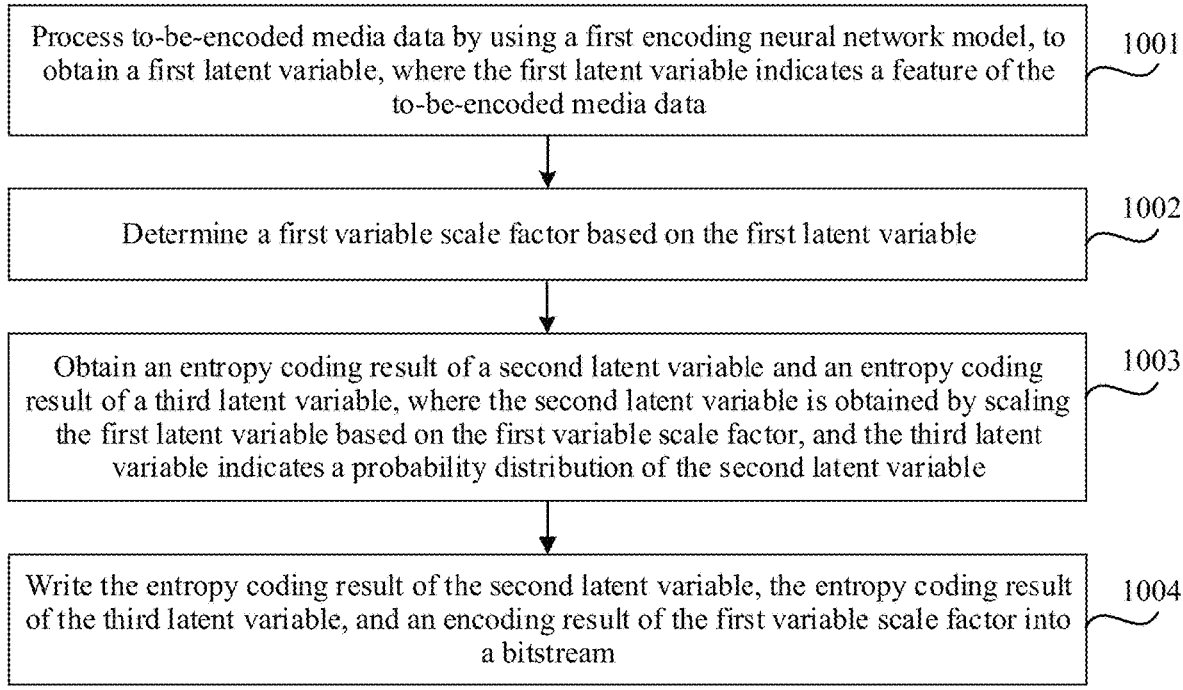
FIG. 10 is a flowchart of a second encoding method according to an embodiment of this application.

FIG. 10 is a flowchart of a second encoding method according to an embodiment of this application. The method includes a context model, but only a latent variable generated by using to-be-encoded media data is scaled based on a scale factor. The encoding method is applied to an encoder side device, and includes the following operations.

Operation 1001: Process the to-be-encoded media data by using a first encoding neural network model, to obtain a first latent variable, where the first latent variable indicates a feature of the to-be-encoded media data.

For an implementation process of the operation 1001, refer to the implementation process of the operation 601. Details are not described herein again.

Operation 1002: Determine a first variable scale factor based on the first latent variable.

In some embodiments, an initial quantity of coding bits may be determined based on the first latent variable, and the first variable scale factor may be determined based on the initial quantity of coding bits and a target quantity of coding bits. For a related description of the target quantity of coding bits, refer to the content in the operation 602. Details are not described herein again. The following separately explains and describes in detail processes of determining the initial quantity of coding bits and the first variable scale factor.

Determine the Initial Quantity of Coding Bits

There may be two manners of determining the initial quantity of coding bits based on the first latent variable. The following separately describes the manners.

In a first implementation, a corresponding initial quantity of context coding bits and an initial entropy coding model parameter are determined based on the first latent variable by using the context model, a quantity of coding bits of an entropy coding result of the first latent variable is determined based on the initial entropy coding model parameter, to obtain a basic initial quantity of coding bits, and the initial quantity of coding bits is determined based on the initial quantity of context coding bits and the basic initial quantity of coding bits.

The context model includes a context encoding neural network model and a context decoding neural network model. An implementation process of determining, based on the first latent variable by using the context model, the corresponding initial quantity of context coding bits and the initial entropy coding model parameter includes: processing the first latent variable by using the context encoding neural network model, to obtain a fifth latent variable, where the fifth latent variable indicates a probability distribution of the first latent variable; determining an entropy coding result of the fifth latent variable, and using a quantity of coding bits of the entropy coding result of the fifth latent variable as the initial quantity of context coding bits; and reconstructing the fifth latent variable based on the entropy coding result of the fifth latent variable, and processing, by using the context decoding neural network model, the fifth latent variable obtained through reconstruction, to obtain the initial entropy coding model parameter.

In an example, the first latent variable is processed by using the context encoding neural network model, to obtain a fifth latent variable. Quantization processing is performed on the fifth latent variable, to obtain a quantized fifth latent variable. Entropy coding is performed on the quantized fifth latent variable, and a quantity of coding bits of an entropy coding result is counted, to obtain the initial quantity of context coding bits. Then, entropy decoding is performed on the entropy coding result of the fifth latent variable to obtain the quantized fifth latent variable, and dequantization processing is performed on the quantized fifth latent variable to obtain a reconstructed fifth latent variable. The reconstructed fifth latent variable is input into the context decoding neural network model, to obtain the initial entropy coding model parameter output by the context decoding neural network model.

An implementation process of processing the first latent variable by using the context encoding neural network model is as follows: inputting the first latent variable into the context encoding neural network model, to obtain the fifth latent variable output by the context encoding neural network model; or obtaining an absolute value of each element in the first latent variable, and then inputting the absolute value of each element in the first latent variable into the context encoding neural network model, to obtain the fifth latent variable output by the context encoding neural network model.

An implementation process of determining the quantity of coding bits of the entropy coding result of the first latent variable based on the initial entropy coding model parameter, to obtain the basic initial quantity of coding bits is as follows: determining, from entropy coding models with scalable encoding model parameters, an entropy coding model corresponding to the initial entropy coding model parameter; performing quantization processing on the first latent variable, to obtain a quantized first latent variable; performing entropy coding on the quantized first latent variable based on the entropy coding model corresponding to the initial entropy coding model parameter, to obtain an initial encoding result of the first latent variable; and counting a quantity of coding bits of the initial encoding result of the first latent variable, to obtain the basic initial quantity of coding bits.

For a quantization processing manner and an entropy coding manner in the operation 1002, refer to the quantization processing manner and the entropy coding manner in the operation 602. Details are not described herein again.

An implementation process of determining the initial quantity of coding bits based on the initial quantity of context coding bits and the basic initial quantity of coding bits includes: determining a sum of the initial quantity of context coding bits and the basic initial quantity of coding bits as the initial quantity of coding bits. Certainly, it may be further determined in another implementation.

In a second implementation, the first latent variable is scaled based on a first initial scale factor, a corresponding initial quantity of context coding bits and an initial entropy coding model parameter are determined based on a scaled first latent variable by using the context model, and a quantity of coding bits of an entropy coding result of the scaled first latent variable is determined based on the initial entropy coding model parameter, to obtain a basic initial quantity of coding bits; and the initial quantity of coding bits is determined based on the initial quantity of context coding bits and the basic initial quantity of coding bits. The first initial scale factor may be a first preset scale factor.

The context model includes a context encoding neural network model and a context decoding neural network model. An implementation process of determining, based on the scaled first latent variable by using the context model, the corresponding initial quantity of context coding bits and the initial entropy coding model parameter includes: processing the scaled first latent variable by using the context encoding neural network model, to obtain a sixth latent variable, where the sixth latent variable indicates a probability distribution of the scaled first latent variable; determining an entropy coding result of the sixth latent variable, and using a quantity of coding bits of the entropy coding result of the sixth latent variable as the initial quantity of context coding bits; and reconstructing the sixth latent variable based on the entropy coding result of the sixth latent variable, and processing, by using the context decoding neural network model, the sixth latent variable obtained through reconstruction, to obtain the initial entropy coding model parameter.

In an example, the scaled first latent variable is processed by using the context encoding neural network model, to obtain a sixth latent variable. Quantization processing is performed on the sixth latent variable, to obtain a quantized sixth latent variable. Entropy coding is performed on the quantized sixth latent variable, and a quantity of coding bits of an entropy coding result is counted, to obtain the initial quantity of context coding bits. Then, entropy decoding is performed on the entropy coding result of the sixth latent variable to obtain the quantized sixth latent variable, and dequantization processing is performed on the quantized sixth latent variable to obtain a reconstructed sixth latent variable. The reconstructed sixth latent variable is input into the context decoding neural network model, to obtain the initial entropy coding model parameter output by the context decoding neural network model.

It should be noted that, for other content in the second implementation, refer to the foregoing descriptions of the corresponding operations. Details are not described herein again.

Determine the First Variable Scale Factor

The first variable scale factor is a final value of a scale factor of the first latent variable. A second latent variable is obtained by scaling the first latent variable based on the first variable scale factor, a third latent variable is obtained by processing the second latent variable by using the context encoding neural network model, and a total quantity of coding bits of an entropy coding result of the second latent variable and coding bits of an entropy coding result of the third latent variable meets a preset encoding rate condition. When the to-be-encoded media data is encoded at a constant bit rate, the meeting a preset encoding rate condition includes that the quantity of coding bits is less than or equal to a target quantity of coding bits. Alternatively, the meeting a preset encoding rate condition includes that the quantity of coding bits is less than or equal to the target quantity of coding bits, and a difference between the quantity of coding bits and the target quantity of coding bits is less than a bit quantity threshold. When the to-be-encoded media data is encoded at a variable bit rate, the meeting a preset encoding rate condition includes that an absolute value of a difference between the quantity of coding bits and a target quantity of coding bits is less than a bit quantity threshold. In other words, the meeting a preset encoding rate condition includes that the quantity of coding bits is less than or equal to the target quantity of coding bits, and a difference between the target quantity of coding bits and the quantity of coding bits is less than the bit quantity threshold. Alternatively, the meeting a preset encoding rate condition includes that the quantity of coding bits is greater than or equal to the target quantity of coding bits, and the difference between the quantity of coding bits and the target quantity of coding bits is less than the bit quantity threshold.

It should be noted that the bit quantity threshold may be preset, and the bit quantity threshold may be adjusted based on different requirements.

There may be a plurality of implementations of determining the first variable scale factor based on the initial quantity of coding bits and the target quantity of coding bits. The following describes three of the implementations.

In a first implementation, when the initial quantity of coding bits is equal to the target quantity of coding bits, the first initial scale factor is determined as the first variable scale factor. When the initial quantity of coding bits is not equal to the target quantity of coding bits, the first variable scale factor is determined in a first cyclic manner based on the initial quantity of coding bits and the target quantity of coding bits.

$i^{th}$ cyclic processing of the first cyclic manner includes the following operations: determining a scale factor of the $i^{th}$ cyclic processing, where i is a positive integer; scaling the first latent variable based on the scale factor of the $i^{th}$ cyclic processing, to obtain an $i^{th}$-scaled first latent variable; determining, based on the $i^{th}$-scaled first latent variable by using the context model, a corresponding $i^{th}$ quantity of context coding bits and an $i^{th}$ entropy coding model parameter, determining a quantity of coding bits of an entropy coding result of the $i^{th}$-scaled first latent variable based on the $i^{th}$ entropy coding model parameter, to obtain an $i^{th}$ basic quantity of coding bits, and determining an $i^{th}$ quantity of coding bits based on the $i^{th}$ quantity of context coding bits and the $i^{th}$ basic quantity of coding bits; and when the $i^{th}$ quantity of coding bits meets a continuing scaling condition, performing $(i+1)^{th}$ cyclic processing of the first cyclic manner; or when the $i^{th}$ quantity of coding bits does not meet a continuing scaling condition, terminating execution of the first cyclic manner, and determining the first variable scale factor based on the scale factor of the $i^{th}$ cyclic processing.

For an implementation process of determining the scale factor of the $i^{th}$ cyclic processing, refer to the related description in the operation 602. Details are not described herein again. For an implementation process of determining, based on the $i^{th}$-scaled first latent variable by using the context model, the $i^{th}$ quantity of context coding bits and the $i^{th}$ entropy coding model parameter, refer to the foregoing process of determining the initial quantity of context coding bits and the initial entropy coding model parameter. Details are not described herein again. For an implementation process of determining the quantity of coding bits of the entropy coding result of the $i^{th}$-scaled first latent variable based on the $i^{th}$ entropy coding model parameter, refer to the foregoing process of determining the basic initial quantity of coding bits based on the initial entropy coding model parameter. Details are not described herein again.

For an implementation process of determining the first variable scale factor based on the scale factor of the $i^{th}$ cyclic processing, refer to the description in the operation 602. Details are not described herein again.

In a second implementation, when the initial quantity of coding bits is equal to the target quantity of coding bits, the first initial scale factor is determined as the first variable scale factor. When the initial quantity of coding bits is not equal to the target quantity of coding bits, the first variable scale factor is determined according to the foregoing first implementation. However, a difference from the foregoing first implementation lies in that, when the initial quantity of coding bits is less than the target quantity of coding bits, a scale factor of $(i-1)^{th}$ cyclic processing of the first cyclic manner is scaled based on a first operation, to obtain the scale factor of the $i^{th}$ cyclic processing. In this case, the continuing scaling condition includes that the $i^{th}$ quantity of coding bits is less than the target quantity of coding bits. When the initial quantity of coding bits is greater than the target quantity of coding bits, a scale factor of $(i-1)^{th}$ cyclic processing of the first cyclic manner is scaled based on a second operation, to obtain the scale factor of the $i^{th}$ cyclic processing. In this case, the continuing scaling condition includes that the $i^{th}$ quantity of coding bits is greater than the target quantity of coding bits.

That a scale factor of $(i-1)^{th}$ cyclic processing is scaled based on a first operation may refer to increasing the scale factor of the $(i-1)^{th}$ cyclic processing based on the first operation, and that a scale factor of $(i-1)^{th}$ cyclic processing is scaled based on a second operation may refer to decreasing the scale factor of the $(i-1)^{th}$ cyclic processing based on the second operation.

The increasing processing and the decreasing processing may be linear or non-linear. For example, a sum of the scale factor of the $(i-1)^{th}$ cyclic processing and the first operation may be determined as the scale factor of the $i^{th}$ cyclic processing, or a difference between the scale factor of the $(i-1)^{th}$ cyclic processing and the second operation may be determined as the scale factor of the $i^{th}$ cyclic processing.

It should be noted that the first operation and the second operation may be preset, and the first operation and the second operation may be adjusted based on different requirements. In addition, the first operation may be equal to or unequal to the second operation.

In a third implementation, when the initial quantity of coding bits is less than or equal to the target quantity of coding bits, the first initial scale factor is determined as the first variable scale factor. When the initial quantity of coding bits is greater than the target quantity of coding bits, the first variable scale factor may be determined according to the foregoing first implementation. Alternatively, the first variable scale factor may be determined when the initial quantity of coding bits is greater than the target quantity of coding bits in the foregoing second implementation.

Operation 1003: Obtain the entropy coding result of the second latent variable and the entropy coding result of the third latent variable, where the second latent variable is obtained by scaling the first latent variable based on the first variable scale factor, the third latent variable indicates a probability distribution of the second latent variable, and the total quantity of coding bits of the entropy coding result of the second latent variable and coding bits of the entropy coding result of the third latent variable meets the preset encoding rate condition.

In the process of determining the first variable scale factor in the operation 1002, the first variable scale factor may be the first initial scale factor, may be the scale factor of the $i^{th}$ cyclic processing, may be the third scale factor of the $j^{th}$ cyclic processing, or may be determined based on the first scale factor of the $j^{th}$ cyclic processing. In either case, a corresponding entropy coding result is determined in the foregoing cycle process. Therefore, the entropy coding result of the second latent variable and the entropy coding result of the third latent variable may be directly obtained from the entropy coding result determined in the foregoing cycle process.

Certainly, the processing may be performed again. In other words, the first latent variable is scaled directly based on the first variable scale factor, to obtain the second latent variable. The entropy coding result of the third latent encoding and a first entropy coding model parameter are determined based on the second latent variable by using the context model. Quantization processing is performed on the second latent variable, to obtain a quantized second latent variable. An entropy coding result of the quantized second latent variable, namely, the entropy coding result of the second latent variable is determined based on the first entropy coding model parameter.

The context model includes a context encoding neural network model and a context decoding neural network model. An implementation process of determining, based on the second latent variable by using the context model, the entropy coding result of the third latent encoding and the first entropy coding model parameter includes: processing the second latent variable by using the context encoding neural network model, to obtain the third latent variable; performing quantization processing on the third latent variable, to obtain a quantized third latent variable; performing entropy coding on the quantized third latent variable, to obtain the entropy coding result of the third latent variable; performing entropy decoding on the entropy coding result of the third latent variable to obtain a quantized third latent variable, and performing dequantization processing on the quantized third latent variable to obtain a reconstructed third latent variable; and processing the reconstructed third latent variable by using the context decoding neural network model, to obtain the first entropy coding model parameter.

An implementation process of determining the entropy coding result of the quantized second latent variable based on the first entropy coding model parameter includes: determining, from entropy coding models with scalable encoding model parameters, an entropy coding model corresponding to the first entropy coding model parameter; and performing entropy coding on the quantized second latent variable based on the entropy coding model corresponding to the first entropy coding model parameter, to obtain the entropy coding result of the second latent variable.

Operation 1004: Write the entropy coding result of the second latent variable, the entropy coding result of the third latent variable, and an encoding result of the first variable scale factor into a bitstream.

For related content of the encoding result of the first variable scale factor, refer to the description in the operation 604. Details are not described herein again.

In some embodiments, if the first variable scale factor is an unquantized value, in this embodiment of this application, a quantization index corresponding to a quantization operation of the first variable scale factor may be further determined, to obtain a first quantization index. In some embodiments, in this embodiment of this application, a quantization index corresponding to a quantization operation of the second latent variable may be further determined, to obtain a second quantization index, and a quantization index corresponding to a quantization operation of the third latent variable may be further determined, to obtain a third quantization index. The first quantization index, the second quantization index, and the third quantization index are encoded into the bitstream. The quantization index indicates a corresponding quantization operation, that is, the first quantization index indicates the quantization operation of the first variable scale factor, the second quantization index indicates the quantization operation of the second latent variable, and the third quantization index indicates the quantization operation of the third latent variable.

In this embodiment of this application, the first latent variable is scaled based on the first variable scale factor to obtain the second latent variable, the second latent variable is processed by using the context encoding neural network model to obtain the third latent variable, and the total quantity of coding bits of the entropy coding result of the second latent variable and coding bits of the entropy coding result of the third latent variable meets the preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

Figure 11:
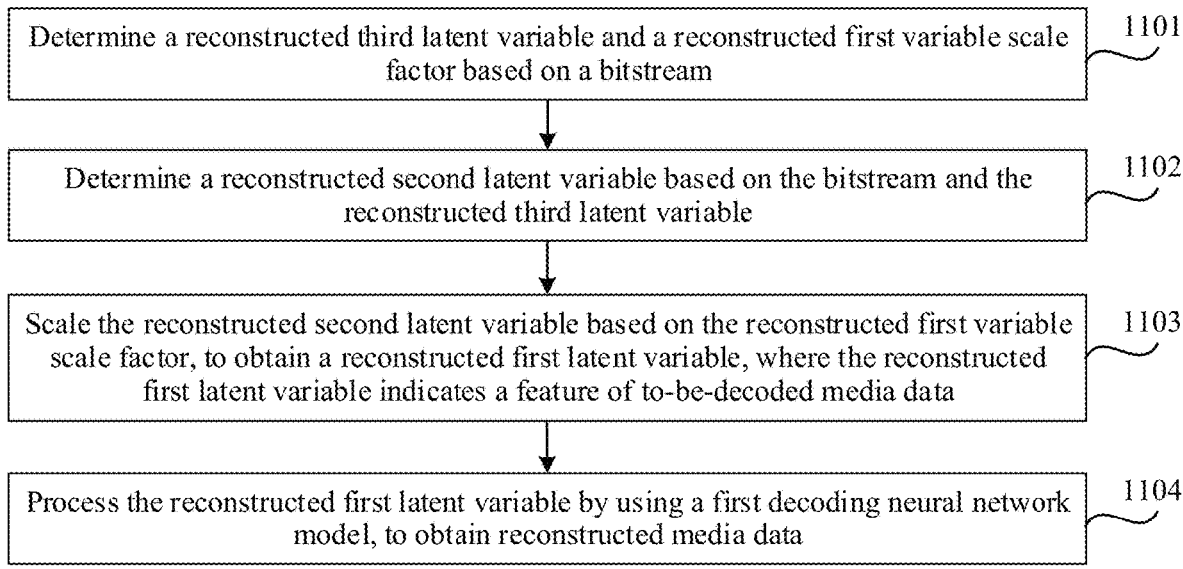
FIG. 11 is a flowchart of a second decoding method according to an embodiment of this application.

FIG. 11 is a flowchart of a second decoding method according to an embodiment of this application. The method is applied to a decoder side. The method corresponds to the encoding method shown in FIG. 10. The method includes the following operations.

Operation 1101: Determine a reconstructed third latent variable and a reconstructed first variable scale factor based on a bitstream.

In some embodiments, entropy decoding may be performed on an entropy coding result of a third latent variable in the bitstream, and an encoding result of a first variable scale factor in the bitstream may be decoded, to obtain a quantized third latent variable and a quantized first variable scale factor. Dequantization processing is performed on the quantized third latent variable and the quantized first variable scale factor, to obtain the reconstructed third latent variable and the reconstructed first variable scale factor.

The decoding method in this operation corresponds to the encoding method at an encoder side, and the dequantization processing in this operation corresponds to the quantization processing at the encoder side. In other words, the decoding method is an inverse process of the encoding method, and the dequantization processing is an inverse process of the quantization processing.

For example, the bitstream may be parsed, to obtain a first quantization index and a third quantization index. The first quantization index indicates a quantization operation of the first variable scale factor, and the third quantization index indicates a quantization operation of the third latent variable. Dequantization processing is performed on the quantized first variable scale factor based on the quantization operation indicated by the first quantization index, to obtain the reconstructed first variable scale factor. Dequantization processing is performed on the quantized third latent variable based on the quantization operation indicated by the third quantization index, to obtain the reconstructed third latent variable.

Operation 1102: Determine a reconstructed second latent variable based on the bitstream and the reconstructed third latent variable.

In some embodiments, the reconstructed third latent variable is processed by using a context decoding neural network model, to obtain a reconstructed first entropy coding model parameter, and the reconstructed second latent variable is determined based on the bitstream and the reconstructed first entropy coding model parameter.

In some embodiments, an entropy decoding model corresponding to the reconstructed first entropy coding model parameter may be determined. Entropy decoding is performed on an entropy coding result of a second latent variable in the bitstream based on the entropy decoding model corresponding to the reconstructed first entropy coding model parameter, to obtain a quantized second latent variable. Dequantization processing is performed on the quantized second latent variable, to obtain the reconstructed second latent variable.

The decoding method in this operation corresponds to the encoding method at an encoder side, and the dequantization processing in this operation corresponds to the quantization processing at the encoder side. In other words, the decoding method is an inverse process of the encoding method, and the dequantization processing is an inverse process of the quantization processing.

For example, the bitstream may be parsed, to obtain a second quantization index, and the second quantization index indicates a quantization operation of the second latent variable. Dequantization processing is performed on the quantized second latent variable based on the quantization operation indicated by the second quantization index, to obtain the reconstructed second latent variable.

Operation 1103: Scale the reconstructed second latent variable based on the reconstructed first variable scale factor, to obtain a reconstructed first latent variable, where the reconstructed first latent variable indicates a feature of to-be-decoded media data.

For an implementation process of the operation 1103, refer to the implementation process of the operation 902. Details are not described herein again.

Operation 1104: Process the reconstructed first latent variable by using a first decoding neural network model, to obtain reconstructed media data.

For an implementation process of the operation 1104, refer to the implementation process of the operation 903. Details are not described herein again.

In this embodiment of this application, a total quantity of coding bits of the entropy coding result of the second latent variable and coding bits of the entropy coding result of the third latent variable meets a preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

Figure 12:
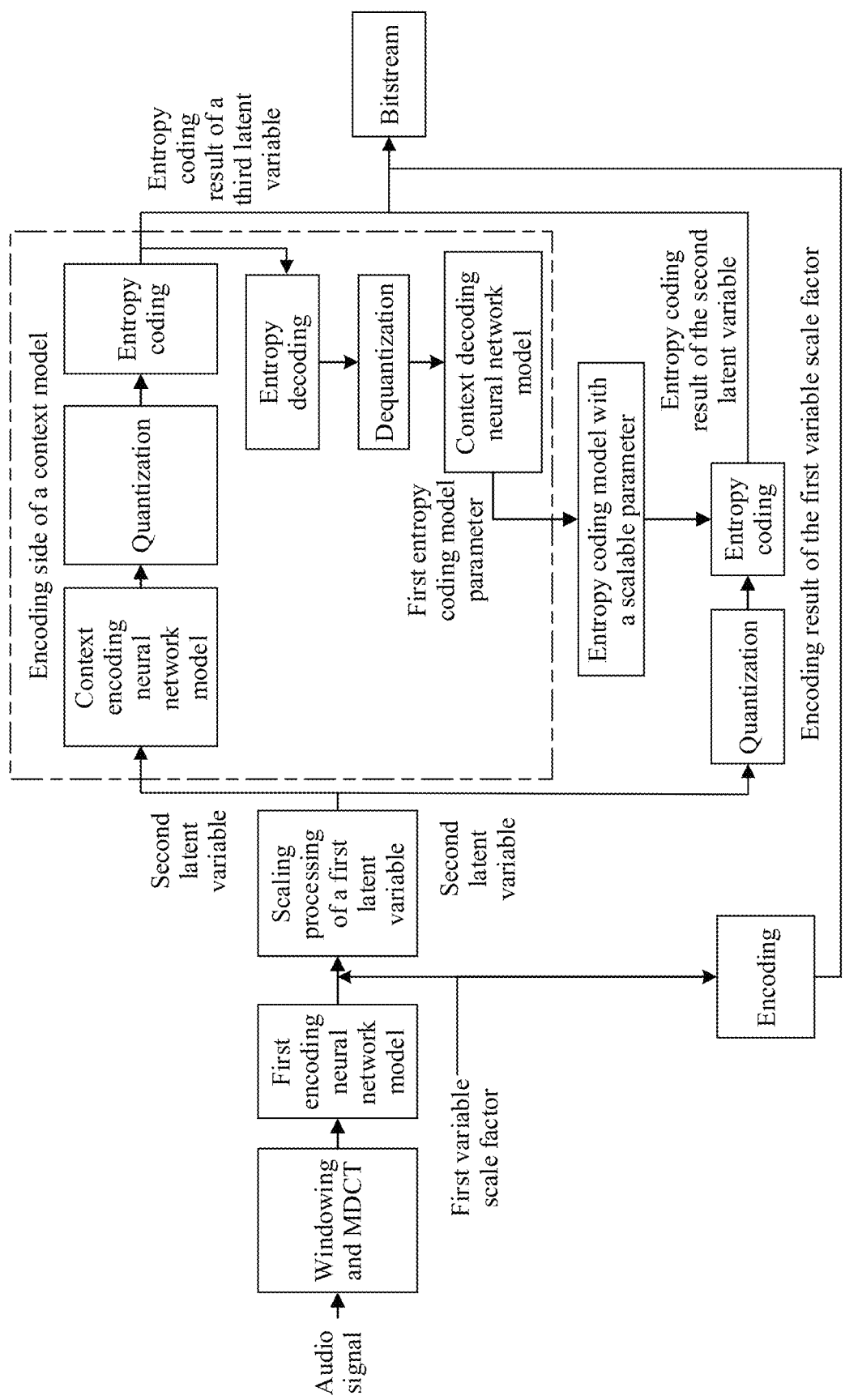
FIG. 12 is an example block diagram of an encoding method shown in FIG. 10 according to an embodiment of this application.

FIG. 12 is an example block diagram of an encoding method according to an embodiment of this application.

FIG. 12 mainly explains the encoding method shown in FIG. 10 as an example. In FIG. 12, an audio signal is used as an example. Windowing processing may be performed on the audio signal, to obtain an audio signal of a current frame. MDCT processing is performed on the audio signal of the current frame, to obtain a frequency-domain signal of the current frame. A first latent variable is output by performing processing by a first encoding neural network model based on the frequency-domain signal of the current frame. The first latent variable is scaled based on a first latent variable scale factor, to obtain a second latent variable. The second latent variable is processed by using a context encoding neural network model, to obtain a third latent variable. Quantization processing and entropy coding are performed on the third latent variable to obtain an entropy coding result of the third latent variable, and the entropy coding result of the third latent variable is written into a bitstream. In addition, entropy decoding is performed on the entropy coding result of the third latent variable, to obtain a quantized third latent variable. Dequantization processing is performed on the quantized third latent variable, to obtain a reconstructed third latent variable. The reconstructed third latent variable is processed by using a context decoding neural network model, to obtain a first entropy coding model parameter. An entropy coding model corresponding to the first entropy coding model parameter is selected from entropy coding models with scalable parameters. The second latent variable is quantized, entropy coding is performed on a quantized second latent variable based on the selected entropy coding model, to obtain an entropy coding result of the second latent variable, and the entropy coding result of the second latent variable is written into the bitstream. Then, an encoding result of the first variable scale factor is written into the bitstream.

Figure 13:
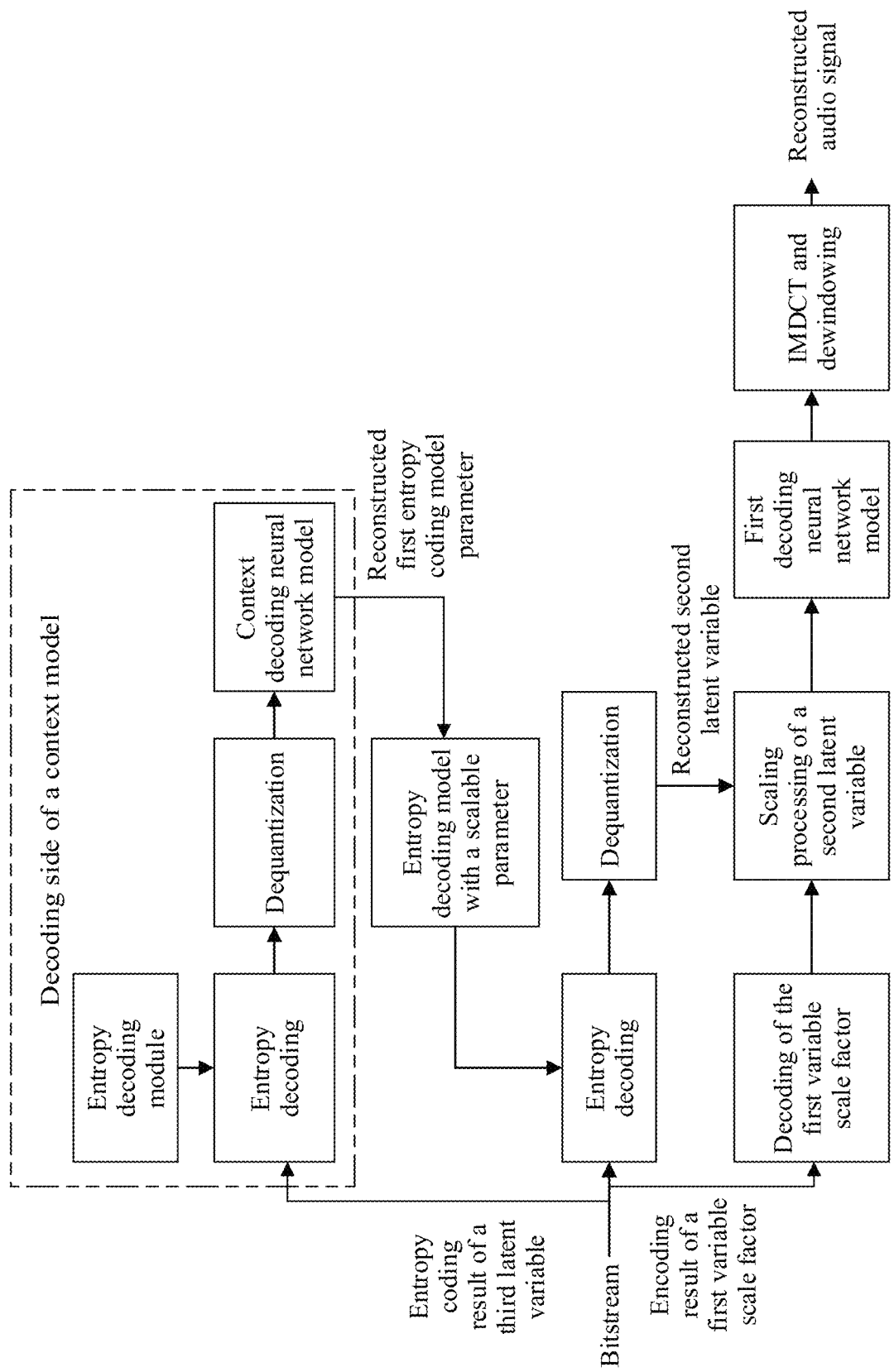
FIG. 13 is an example block diagram of a decoding method shown in FIG. 11 according to an embodiment of this application.

FIG. 13 is an example block diagram of a decoding method according to an embodiment of this application. FIG. 13 mainly explains the decoding method shown in FIG. 11 as an example. In FIG. 13, an audio signal is used as an example. Entropy decoding is performed on an entropy coding result of a third latent variable in a bitstream by using an entropy decoding model, to obtain a quantized third latent variable. Dequantization processing is performed on the quantized third latent variable, to obtain a reconstructed third latent variable. The reconstructed third variable is processed by using a context decoding neural network model, to obtain a reconstructed first entropy coding model parameter. A corresponding entropy decoding model is selected, based on the reconstructed first entropy coding model parameter, from entropy decoding models with scalable parameters. Entropy decoding is performed on an entropy coding result of a second latent variable in the bitstream based on the selected entropy decoding model, to obtain a quantized second latent variable. Dequantization processing is performed on the quantized second latent variable, to obtain a reconstructed second latent variable. An encoding result of a first variable scale factor in the bitstream is decoded, to obtain a reconstructed first variable scale factor. The reconstructed second latent variable is scaled based on the reconstructed first variable scale factor, to obtain a reconstructed first latent variable. The reconstructed first latent variable is processed by using a first decoding neural network model, to obtain a reconstructed frequency-domain signal of a current frame. IMDCT processing and dewindowing processing are performed on the reconstructed frequency-domain signal of the current frame, to obtain a reconstructed audio signal.

Figure 14:
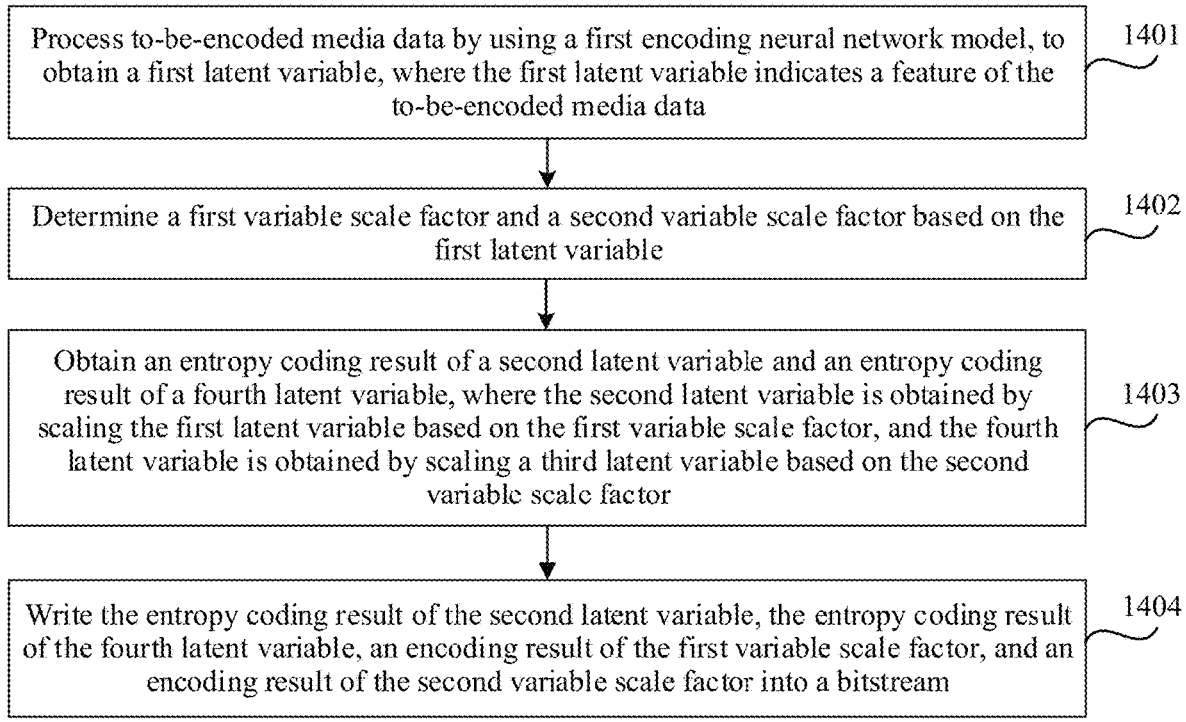
FIG. 14 is a flowchart of a third encoding method according to an embodiment of this application.

FIG. 14 is a flowchart of a third encoding method according to an embodiment of this application. The method includes a context model, and not only a latent variable generated by using to-be-encoded media data is scaled based on a scale factor, but also a latent variable determined by using the context model is scaled based on a scale factor. The encoding method is applied to an encoder side device, and includes the following operations.

Operation 1401: Process the to-be-encoded media data by using a first encoding neural network model, to obtain a first latent variable, where the first latent variable indicates a feature of the to-be-encoded media data.

For an implementation process of the operation 1401, refer to the implementation process of the operation 601. Details are not described herein again.

Operation 1402: Determine a first variable scale factor and a second variable scale factor based on the first latent variable.

In some embodiments, a corresponding initial quantity of context coding bits and an initial entropy coding model parameter may be determined based on the first latent variable by using the context model; a quantity of coding bits of an entropy coding result of the first latent variable is determined based on the initial entropy coding model parameter, to obtain a basic initial quantity of coding bits; and the first variable scale factor and the second variable scale factor are determined based on the initial quantity of context coding bits, the basic initial quantity of coding bits, and a target quantity of coding bits.

For an implementation process of determining, based on the first latent variable by using the context model, the corresponding initial quantity of context coding bits and the initial entropy coding model parameter, and an implementation process of determining the quantity of coding bits of the entropy coding result of the first latent variable based on the initial entropy coding model parameter, to obtain the basic initial quantity of coding bits, refer to the related descriptions in the operation 1002. Details are not described herein again.

In some other embodiments, a first preset scale factor may be used as a first initial scale factor, and a second preset scale factor may be used as a second initial scale factor. The first latent variable is scaled based on the first initial scale factor, a corresponding initial quantity of context coding bits and an initial entropy coding model parameter are determined based on a scaled first latent variable and the second initial scale factor by using the context model, and a quantity of coding bits of an entropy coding result of the first latent variable is determined based on the initial entropy coding model parameter, to obtain a basic initial quantity of coding bits. The first variable scale factor and the second variable scale factor are determined based on the initial quantity of context coding bits, the basic initial quantity of coding bits, and a target quantity of coding bits.

For an implementation process of scaling the first latent variable based on the first initial scale factor, refer to the related description in the operation 1002. Details are not described herein again.

The context model includes a context encoding neural network model and a context decoding neural network model. An implementation process of determining, based on the scaled first latent variable and the second initial scale factor by using the context model, the corresponding initial quantity of context coding bits and the initial entropy coding model parameter includes: processing the scaled first latent variable by using the context encoding neural network model, to obtain a sixth latent variable, where the sixth latent variable indicates a probability distribution of the scaled first latent variable; scaling the sixth latent variable based on the second initial scale factor, to obtain a seventh latent variable; determining an entropy coding result of the seventh latent variable, and using a quantity of coding bits of the entropy coding result of the seventh latent variable as the initial quantity of context coding bits; and reconstructing the seventh latent variable based on the entropy coding result of the seventh latent variable, and processing, by using the context decoding neural network model, the seventh latent variable obtained through reconstruction, to obtain the initial entropy coding model parameter.

In an example, the scaled first latent variable is processed by using the context encoding neural network model, to obtain a sixth latent variable. The sixth latent variable is scaled based on the second initial scale factor, to obtain a seventh latent variable. Quantization processing is performed on the seventh latent variable, to obtain a quantized seventh latent variable. Entropy coding is performed on the quantized seventh latent variable, and a quantity of coding bits of an entropy coding result is counted, to obtain the initial quantity of context coding bits. Then, entropy decoding is performed on the entropy coding result of the seventh latent variable to obtain the quantized seventh latent variable, and dequantization processing is performed on the quantized seventh latent variable to obtain a reconstructed seventh latent variable. The reconstructed seventh latent variable is input into the context decoding neural network model, to obtain the initial entropy coding model parameter output by the context decoding neural network model.

An implementation process of scaling the sixth latent variable based on the second initial scale factor is as follows: multiplying each element in the sixth latent variable by a corresponding element in the second initial scale factor, to obtain the seventh latent variable.

It should be noted that the foregoing implementation process is merely an example, and during actual application, another method may be used for scaling. For example, each element in the sixth latent variable may be divided by a corresponding element in the second initial scale factor, to obtain the seventh latent variable. A scaling method is not limited in this embodiment of this application.

For implementation processes of the remaining operations, refer to the foregoing descriptions of the corresponding operations. Details are not described herein again.

It should be noted that, in this embodiment of this application, an initial value of a scale factor is set for a third latent variable, and the initial value of the scale factor is usually equal to 1. The second preset scale factor may be greater than or equal to the initial value of the scale factor, or may be less than the initial value of the scale factor. For example, the second preset scale factor is a constant such as 1 or 2. When the first variable scale factor and the second variable scale factor are determined in the first implementation, the second initial scale factor is the initial value of the scale factor. When the first variable scale factor and the second variable scale factor are determined in the second implementation, the second initial scale factor is the second preset scale factor.

In addition, the second initial scale factor may be a scalar or a vector. For a description, refer to the related description of the first initial scale factor.

There may be two implementation processes of determining the first variable scale factor and the second variable scale factor based on the initial quantity of context coding bits, the basic initial quantity of coding bits, and the target quantity of coding bits. The following separately describes the implementation processes.

In a first implementation, the second variable scale factor is set to the second initial scale factor, and a basic target quantity of coding bits is determined based on the target quantity of coding bits and at least one of the basic initial quantity of coding bits and the initial quantity of context coding bits. The first variable scale factor and a basic actual quantity of coding bits are determined based on the second initial scale factor, the basic target quantity of coding bits, and the basic initial quantity of coding bits, where the basic actual quantity of coding bits is a quantity of coding bits of an entropy coding result of a first latent variable scaled based on the first variable scale factor. A target quantity of context coding bits is determined based on the target quantity of coding bits and the basic actual quantity of coding bits. The second variable scale factor is determined based on the target quantity of context coding bits and the initial quantity of context coding bits.

An implementation process of determining the basic target quantity of coding bits based on the target quantity of coding bits and at least one of the basic initial quantity of coding bits and the initial quantity of context coding bits includes: subtracting the initial quantity of context coding bits from the target quantity of coding bits, to obtain the basic target quantity of coding bits; determining a ratio of the basic initial quantity of coding bits to the initial quantity of context coding bits, and determining the basic target quantity of coding bits based on the ratio and the target quantity of coding bits; or determining the basic target quantity of coding bits based on a ratio of the target quantity of coding bits to the basic initial quantity of coding bits. Certainly, it may be further determined by using another implementation process.

For example, it is determined that the ratio of the basic initial quantity of coding bits to the initial quantity of context coding bits is 5:3. In this case, the target quantity of coding bits may be multiplied by $5/8$, to obtain the basic target quantity of coding bits.

For another example, the ratio of the target quantity of coding bits to the basic initial quantity of coding bits is determined. If the ratio of the target quantity of coding bits to the basic initial quantity of coding bits is greater than a first proportion threshold, a sum of the basic initial quantity of coding bits and a preset first proportion scaling operation is determined as the basic target quantity of coding bits. If the ratio of the target quantity of coding bits to the basic initial quantity of coding bits is less than a second proportion threshold, a difference between the basic initial quantity of coding bits and a preset second proportion scaling operation is determined as the basic target quantity of coding bits. The first proportion threshold is greater than the second proportion threshold. If the ratio of the target quantity of coding bits to the basic initial quantity of coding bits is greater than or equal to a second proportion threshold and less than or equal to a first proportion threshold, the basic initial quantity of coding bits is determined as the basic target quantity of coding bits.

It should be noted that the first proportion scaling operation may be greater than the second proportion scaling operation, or may be less than the second proportion scaling operation, or certainly, may be equal to the second proportion scaling operation. A value relationship between the first proportion scaling operation and the second proportion scaling operation is not limited in this embodiment of this application.

There are also three implementations of determining the first variable scale factor based on the second initial scale factor, the basic target quantity of coding bits, and the basic initial quantity of coding bits. The following separately describes the implementations.

Manner 11: When the basic initial quantity of coding bits is equal to the basic target quantity of coding bits, the first initial scale factor is determined as the first variable scale factor. When the basic initial quantity of coding bits is not equal to the basic target quantity of coding bits, the first variable scale factor is determined in a first cyclic manner based on the basic initial quantity of coding bits and the basic target quantity of coding bits.

$i^{th}$ cyclic processing of the first cyclic manner includes the following operations: determining a scale factor of the $i^{th}$ cyclic processing, where i is a positive integer; scaling the first latent variable based on the scale factor of the $i^{th}$ cyclic processing, to obtain an $i^{th}$-scaled first latent variable; determining, based on the $i^{th}$-scaled first latent variable and the second initial scale factor by using the context model, an $i^{th}$ quantity of context coding bits and an $i^{th}$ entropy coding model parameter, determining a quantity of coding bits of an entropy coding result of the $i^{th}$-scaled first latent variable based on the $i^{th}$ entropy coding model parameter, to obtain an $i^{th}$ basic quantity of coding bits, and determining an $i^{th}$ quantity of coding bits based on the $i^{th}$ quantity of context coding bits and the $i^{th}$ basic quantity of coding bits; and when the $i^{th}$ quantity of coding bits meets a continuing scaling condition, performing $(i+1)^{th}$ cyclic processing of the first cyclic manner; or when the $i^{th}$ quantity of coding bits does not meet a continuing scaling condition, terminating execution of the first cyclic manner, and determining the first variable scale factor based on the scale factor of the $i^{th}$ cyclic processing.

Content in the manner 11 of determining the first variable scale factor is similar to the content in the first implementation of determining the first variable scale factor in the operation 1002. A difference lies in that, in this operation, the $i^{th}$ quantity of context coding bits and the $i^{th}$ entropy coding model parameter are determined based on the $i^{th}$-scaled first latent variable and the second initial scale factor by using the context model. For an implementation process of determining, based on the $i^{th}$-scaled first latent variable and the second initial scale factor by using the context model, the $i^{th}$ quantity of context coding bits and the $i^{th}$ entropy coding model parameter, refer to the foregoing implementation process of determining, based on the scaled first latent variable and the second initial scale factor by using the context model, the corresponding initial quantity of context coding bits and the initial entropy coding model parameter. Details are not described herein again.

Manner 12: When the basic initial quantity of coding bits is equal to the basic target quantity of coding bits, the first initial scale factor is determined as the first variable scale factor. When the basic initial quantity of coding bits is not equal to the basic target quantity of coding bits, the first variable scale factor is determined in the foregoing manner 11. However, a difference from the foregoing manner 11 lies in that, when the basic initial quantity of coding bits is less than the basic target quantity of coding bits, a scale factor of $(i-1)^{th}$ cyclic processing of the first cyclic manner is scaled based on a first operation, to obtain the scale factor of the $i^{th}$ cyclic processing. In this case, the continuing scaling condition includes that the $i^{th}$ quantity of coding bits is less than the basic target quantity of coding bits. When the basic initial quantity of coding bits is greater than the basic target quantity of coding bits, a scale factor of $(i-1)^{th}$ cyclic processing of the first cyclic manner is scaled based on a second operation, to obtain the scale factor of the $i^{th}$ cyclic processing. In this case, the continuing scaling condition includes that the $i^{th}$ quantity of coding bits is greater than the basic target quantity of coding bits.

For related content in the manner 12, refer to the content in the second implementation in the operation 1002. Details are not described herein again.

Manner 13: When the basic initial quantity of coding bits is less than or equal to the basic target quantity of coding bits, the first initial scale factor is determined as the first variable scale factor. When the basic initial quantity of coding bits is greater than the basic target quantity of coding bits, the first variable scale factor may be determined in the foregoing manner 11. Alternatively, the first variable scale factor may be determined when the basic initial quantity of coding bits is greater than the basic target quantity of coding bits in the foregoing manner 12.

An implementation process of determining the target quantity of context coding bits based on the target quantity of coding bits and the basic actual quantity of coding bits includes: subtracting the basic actual quantity of coding bits from the target quantity of coding bits, to obtain the target quantity of context coding bits.

An implementation process of determining the second variable scale factor based on the target quantity of context coding bits and the initial quantity of context coding bits is similar to the implementation process of determining the first variable scale factor based on the basic initial quantity of coding bits and the basic target quantity of coding bits. The following separately describes three manners.

Manner 21: When the initial quantity of context coding bits is equal to the target quantity of context coding bits, the second initial scale factor is determined as the second variable scale factor. When the initial quantity of context coding bits is not equal to the target quantity of context coding bits, the first latent variable is scaled based on the first variable scale factor, to obtain the second latent variable. The second variable scale factor is determined in a first cyclic manner based on the initial quantity of context coding bits, the target quantity of context coding bits, and the second latent variable.

$i^{th}$ cyclic processing of the first cyclic manner includes the following operations: determining a scale factor of the $i^{th}$ cyclic processing, where i is a positive integer; determining, based on the second latent variable and the scale factor of the $i^{th}$ cyclic processing by using the context model, an $i^{th}$ quantity of context coding bits and an $i^{th}$ entropy coding model parameter; determining a quantity of coding bits of an entropy coding result of the second latent variable based on the $i^{th}$ entropy coding model parameter, to obtain an $i^{th}$ basic quantity of coding bits; and determining an $i^{th}$ quantity of coding bits based on the $i^{th}$ quantity of context coding bits and the $i^{th}$ basic quantity of coding bits; and when the $i^{th}$ quantity of coding bits meets a continuing scaling condition, performing $(i+1)^{th}$ cyclic processing of the first cyclic manner; or when the $i^{th}$ quantity of coding bits does not meet a continuing scaling condition, terminating execution of the first cyclic manner, and determining the second variable scale factor based on the scale factor of the $i^{th}$ cyclic processing.

An implementation process of determining, based on the second latent variable and the scale factor of the $i^{th}$ cyclic processing by using the context model, the $i^{th}$ quantity of context coding bits and the $i^{th}$ entropy coding model parameter includes: processing the second latent variable by using the context encoding neural network model, to obtain a third latent variable, where the third latent variable indicates a probability distribution of the second latent variable; scaling the third latent variable based on the scale factor of the $i^{th}$ cyclic processing, to obtain an $i^{th}$-scaled third latent variable; determining an entropy coding result of the $i^{th}$-scaled third latent variable, and using a quantity of coding bits of the entropy coding result of the $i^{th}$-scaled third latent variable as the $i^{th}$ quantity of context coding bits; reconstructing the $i^{th}$-scaled third latent variable based on the entropy coding result of the $i^{th}$-scaled third latent variable; scaling a reconstructed $i^{th}$-scaled third latent variable based on the scale factor of the $i^{th}$ cyclic processing, to obtain a reconstructed third latent variable; and processing the reconstructed third latent variable by using the context decoding neural network model, to obtain the $i^{th}$ entropy coding model parameter.

For other operations, refer to the foregoing descriptions of corresponding content. Details are not described herein again.

Manner 22: When the initial quantity of context coding bits is equal to the target quantity of context coding bits, the second initial scale factor is determined as the second variable scale factor. When the initial quantity of context coding bits is not equal to the target quantity of context coding bits, the second variable scale factor is determined in the foregoing manner 21. However, a difference from the foregoing manner 21 lies in that, when the initial quantity of context coding bits is less than the target quantity of context coding bits, a scale factor of $(i-1)^{th}$ cyclic processing of the first cyclic manner is scaled based on a first operation, to obtain the scale factor of the $i^{th}$ cyclic processing. In this case, the continuing scaling condition includes that the $i^{th}$ quantity of coding bits is less than the target quantity of context coding bits. When the initial quantity of context coding bits is greater than the target quantity of context coding bits, a scale factor of $(i-1)^{th}$ cyclic processing of the first cyclic manner is scaled based on a second operation, to obtain the scale factor of the $i^{th}$ cyclic processing. In this case, the continuing scaling condition includes that the $i^{th}$ quantity of coding bits is greater than the target quantity of context coding bits.

Manner 23: When the initial quantity of context coding bits is less than or equal to the target quantity of context coding bits, the second initial scale factor is determined as the second variable scale factor. When the initial quantity of context coding bits is greater than the target quantity of context coding bits, the second variable scale factor may be determined in the foregoing manner 21. Alternatively, the second variable scale factor may be determined when the initial quantity of context coding bits is greater than the target quantity of context coding bits in the foregoing manner 22.

In a second implementation, the target quantity of coding bits is divided into a basic target quantity of coding bits and a target quantity of context coding bits, and the first variable scale factor is determined based on the basic target quantity of coding bits and the basic initial quantity of coding bits. The second variable scale factor is determined based on the target quantity of context coding bits and the initial quantity of context coding bits.

When the first variable scale factor is determined based on the basic target quantity of coding bits and the basic initial quantity of coding bits, the second variable scale factor may be set as the second initial scale factor, and the first variable scale factor is determined based on the second initial scale factor, the basic target quantity of coding bits, and the basic initial quantity of coding bits. For an implementation process, refer to the foregoing description.

In addition, when the second variable scale factor is determined based on the target quantity of context coding bits and the initial quantity of context coding bits, the first variable scale factor is already determined. In this case, the second variable scale factor may be determined directly based on the first variable scale factor, the target quantity of context coding bits, and the initial quantity of context coding bits. For an implementation process, refer to the foregoing description.

Operation 1403: Obtain the entropy coding result of the second latent variable and an entropy coding result of a fourth latent variable, where the second latent variable is obtained by scaling the first latent variable based on the first variable scale factor, the fourth latent variable is obtained by scaling the third latent variable based on the second variable scale factor, the third latent variable is determined based on the second latent variable by using the context model, and the third latent variable indicates a probability distribution of the second latent variable, and a total quantity of coding bits of the entropy coding result of the second latent variable and coding bits of the entropy coding result of the fourth latent variable meets a preset encoding rate condition.

In the process of determining the first variable scale factor and the second variable scale factor in the operation 1402, an entropy coding result corresponding to a scale factor of each cyclic processing is determined in the foregoing cycle process. Therefore, the entropy coding result of the second latent variable and the entropy coding result of the fourth latent variable may be directly obtained from the entropy coding result determined in the foregoing cycle process.

Certainly, the processing may be performed again. In other words, the first latent variable is scaled directly based on the first variable scale factor, to obtain the second latent variable. The entropy coding result of the fourth latent encoding and a second entropy coding model parameter are determined based on the second latent variable by using the context model. Quantization processing is performed on the second latent variable, to obtain a quantized second latent variable. An entropy coding result of the quantized second latent variable, namely, the entropy coding result of the second latent variable is determined based on the second entropy coding model parameter.

The context model includes a context encoding neural network model and a context decoding neural network model. An implementation process of determining, based on the second latent variable by using the context model, the entropy coding result of the fourth latent encoding and the second entropy coding model parameter includes: processing the second latent variable by using the context encoding neural network model, to obtain the third latent variable; scaling the third latent variable based on the second variable scale factor, to obtain the fourth latent variable; performing quantization processing on the fourth latent variable, to obtain a quantized fourth latent variable; performing entropy coding on the quantized fourth latent variable, to obtain the entropy coding result of the fourth latent variable; performing entropy decoding on the entropy coding result of the fourth latent variable to obtain a quantized fourth latent variable, and performing dequantization processing on the quantized fourth latent variable to obtain a reconstructed fourth latent variable; scaling the reconstructed fourth latent variable based on the second variable scale factor, to obtain a reconstructed third latent variable; processing the reconstructed third latent variable by using the context decoding neural network model, to obtain the second entropy coding model parameter.

An implementation process of determining the entropy coding result of the quantized second latent variable based on the second entropy coding model parameter includes: determining, from entropy coding models with scalable encoding model parameters, an entropy coding model corresponding to the second entropy coding model parameter; and performing entropy coding on the quantized second latent variable based on the entropy coding model corresponding to the second entropy coding model parameter, to obtain an initial encoding result of the second latent variable.

Operation 1404: Write the entropy coding result of the second latent variable, the entropy coding result of the fourth latent variable, an encoding result of the first variable scale factor, and an encoding result of the second variable scale factor into a bitstream.

For related content of the encoding result of the first variable scale factor, refer to the description in the operation 604. Details are not described herein again.

Based on the foregoing description, the second variable scale factor may be an unquantized value, or may be a quantized value. If the second variable scale factor is the unquantized value, an implementation process of determining the encoding result of the second variable scale factor includes: performing quantization and encoding processing on the second variable scale factor, to obtain the encoding result of the second variable scale factor. If the second variable scale factor is the quantized value, an implementation process of determining the encoding result of the second variable scale factor includes: encoding the second variable scale factor, to obtain the encoding result of the second variable scale factor. The second variable scale factor may be encoded in any encoding manner. This is not limited in this embodiment of this application.

In addition, for some encoders, a quantization process and an encoding process are performed in one processing, that is, a quantization result and an encoding result can be obtained through one processing. Therefore, for the second variable scale factor, the encoding result of the second variable scale factor may also be obtained in the foregoing process of determining the second variable scale factor. Therefore, the encoding result of the second variable scale factor may be directly obtained. In other words, the encoding result of the second variable scale factor may also be directly obtained in the process of determining the second variable scale factor.

In some embodiments, if the first variable scale factor and the second variable scale factor are unquantized values, in this embodiment of this application, a quantization index corresponding to a quantization operation of the first variable scale factor may be further determined to obtain a first quantization index, and a quantization operation of the second variable scale factor may be determined to obtain a fifth quantization index. In some embodiments, in this embodiment of this application, a quantization index corresponding to a quantization operation of the second latent variable may be further determined to obtain a second quantization index, a quantization index corresponding to a quantization operation of the fourth latent variable may be determined to obtain a fourth quantization index, and the first quantization index, the second quantization index, the fourth quantization index, and the fifth quantization index are encoded into the bitstream. The quantization index indicates a corresponding quantization operation, that is, the first quantization index indicates the quantization operation of the first variable scale factor, the second quantization index indicates the quantization operation of the second latent variable, the fourth quantization index indicates the quantization operation of the fourth latent variable, and the fifth quantization index indicates the quantization operation of the second variable scale factor.

In this embodiment of this application, the first latent variable is scaled based on the first variable scale factor, to obtain the second latent variable, and the second latent variable is processed by using the context encoding neural network model, to obtain the third latent variable. The third latent variable is scaled based on the second variable scale factor, to obtain the fourth latent variable. In addition, the total quantity of coding bits of the entropy coding result of the second latent variable and coding bits of the entropy coding result of the fourth latent variable meets the preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

Figure 15:
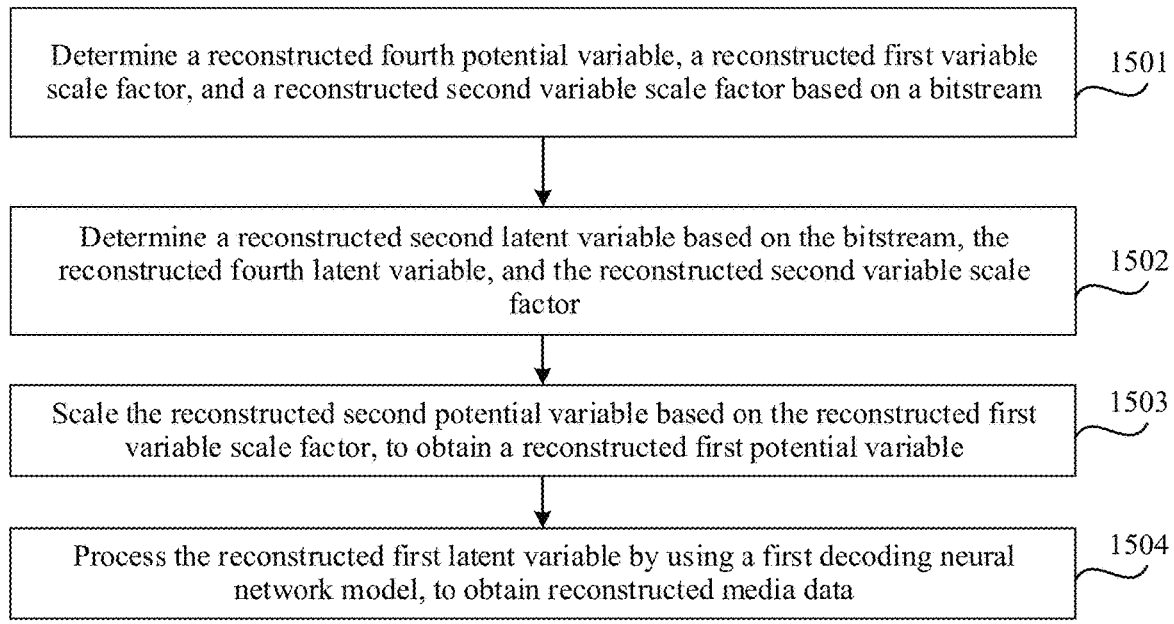
FIG. 15 is a flowchart of a third decoding method according to an embodiment of this application.

FIG. 15 is a flowchart of a third decoding method according to an embodiment of this application. The method is applied to a decoder side. The method corresponds to the encoding method shown in FIG. 14. The method includes the following operations.

Operation 1501: Determine a reconstructed fourth latent variable, a reconstructed first variable scale factor, and a reconstructed second variable scale factor based on a bitstream.

In some embodiments, entropy decoding may be performed on an entropy coding result of a fourth latent variable in a bitstream, and encoding results of a first variable scale factor and a second variable scale factor in the bitstream may be decoded, to obtain a quantized fourth latent variable, a quantized first variable scale factor, and a quantized second variable scale factor. Dequantization processing is performed on the quantized fourth latent variable, the quantized first variable scale factor, and the quantized second variable scale factor, to obtain the reconstructed fourth latent variable, the reconstructed first variable scale factor, and the reconstructed second variable scale factor.

The decoding method in this operation corresponds to the encoding method at an encoder side, and the dequantization processing in this operation corresponds to the quantization processing at the encoder side. In other words, the decoding method is an inverse process of the encoding method, and the dequantization processing is an inverse process of the quantization processing.

For example, the bitstream may be parsed, to obtain a first quantization index, a fourth quantization index, and a fifth quantization index, where the first quantization index indicates a quantization operation of the first variable scale factor, the fourth quantization index indicates a quantization operation of the fourth latent variable, and the fifth quantization index indicates a quantization operation of the second variable scale factor. Dequantization processing is performed on the quantized first variable scale factor based on the quantization operation indicated by the first quantization index, to obtain the reconstructed first variable scale factor. Dequantization processing is performed on the quantized fourth latent variable based on the quantization operation indicated by the fourth quantization index, to obtain the reconstructed fourth latent variable. Dequantization processing is performed on the quantized second variable scale factor based on the quantization operation indicated by the fifth quantization index, to obtain the reconstructed second variable scale factor.

Operation 1502: Determine a reconstructed second latent variable based on the bitstream, the reconstructed fourth latent variable, and the reconstructed second variable scale factor.

In some embodiments, the reconstructed fourth latent variable is scaled based on the reconstructed second variable scale factor, to obtain a reconstructed third latent variable. The reconstructed third latent variable is processed by using a context decoding neural network model, to obtain a reconstructed second entropy coding model parameter, and the reconstructed second latent variable is determined based on the bitstream and the reconstructed second entropy coding model parameter.

In some embodiments, an entropy decoding model corresponding to the reconstructed second entropy coding model parameter may be determined. Entropy decoding is performed on an entropy coding result of a second latent variable in the bitstream based on the entropy decoding model corresponding to the second entropy coding model parameter, to obtain a quantized second latent variable. Dequantization processing is performed on the quantized second latent variable, to obtain the reconstructed second latent variable.

The decoding method in this operation corresponds to the encoding method at an encoder side, and the dequantization processing in this operation corresponds to the quantization processing at the encoder side. In other words, the decoding method is an inverse process of the encoding method, and the dequantization processing is an inverse process of the quantization processing.

For example, the bitstream may be parsed, to obtain a second quantization index, and the second quantization index indicates a quantization operation of the second latent variable. Dequantization processing is performed on the quantized second latent variable based on the quantization operation indicated by the second quantization index, to obtain the reconstructed second latent variable.

Operation 1503: Scale the reconstructed second latent variable based on the reconstructed first variable scale factor, to obtain a reconstructed first latent variable.

For an implementation process of the operation 1503, refer to the implementation process of the operation 902. Details are not described herein again.

Operation 1504: Process the reconstructed first latent variable by using a first decoding neural network model, to obtain reconstructed media data.

For an implementation process of the operation 1504, refer to the implementation process of the operation 903. Details are not described herein again.

In this embodiment of this application, a total quantity of coding bits of the entropy coding result of the second latent variable and coding bits of the entropy coding result of the fourth latent variable meets a preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

Figure 16A:
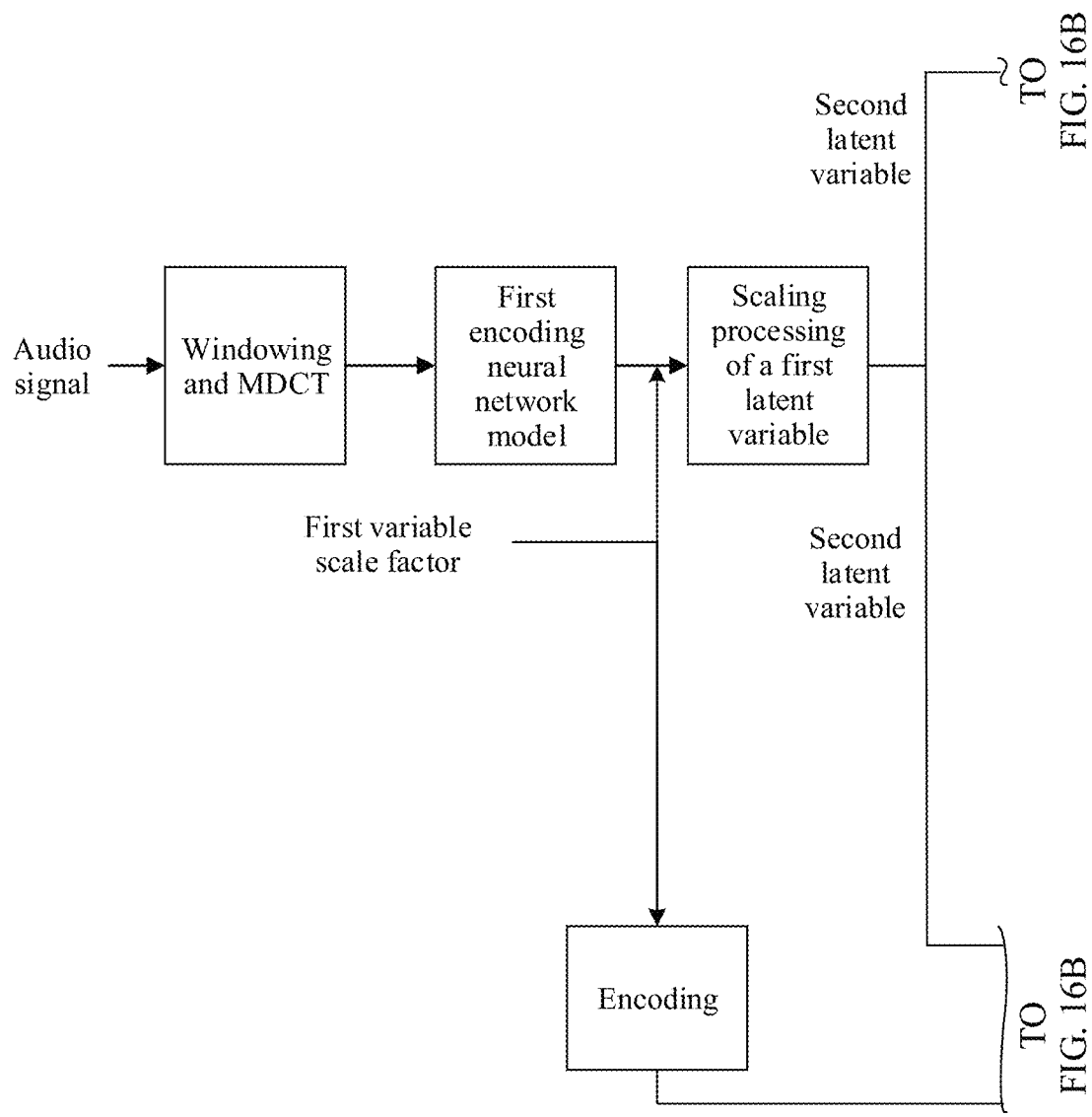
FIG. 16A and FIG. 16B are an example block diagram of an encoding method shown in FIG. 14 according to an embodiment of this application.
Figure 16B:
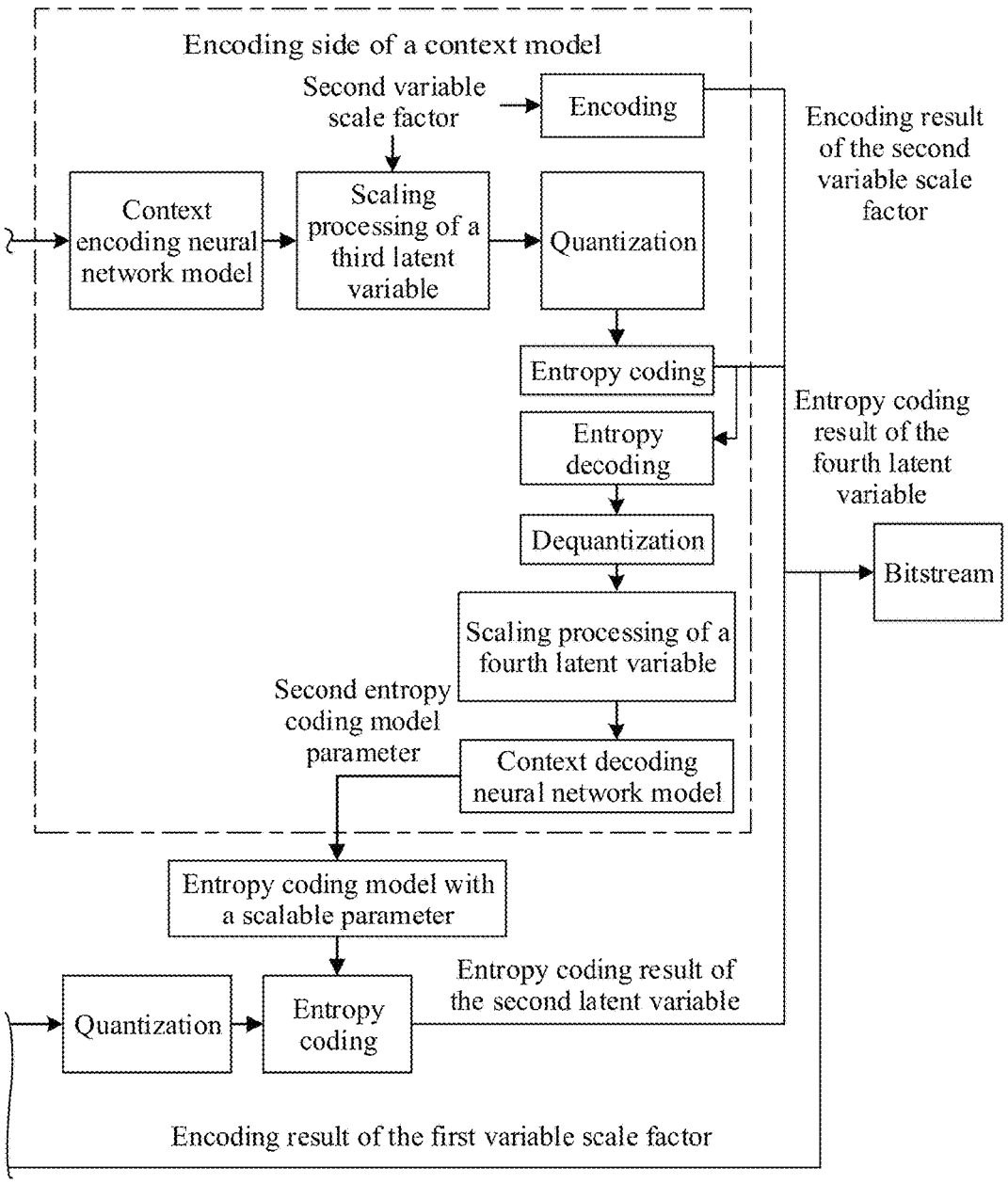

FIG. 16A and FIG. 16B are an example block diagram of an encoding method according to an embodiment of this application. FIG. 16A and FIG. 16B mainly explain the encoding method shown in FIG. 14 as an example. In FIG. 16A and FIG. 16B, an audio signal is used as an example. Windowing processing may be performed on the audio signal, to obtain an audio signal of a current frame. MDCT processing is performed on the audio signal of the current frame, to obtain a frequency-domain signal of the current frame. A first latent variable is output by performing processing by a first encoding neural network model based on the frequency-domain signal of the current frame. The first latent variable is scaled based on a first latent variable scale factor, to obtain a second latent variable. The second latent variable is processed by using a context encoding neural network model, to obtain a third latent variable. The third latent variable is scaled based on the second variable scale factor, to obtain a fourth latent variable. Quantization processing and entropy coding are performed on the fourth latent variable to obtain an entropy coding result of the fourth latent variable, and the entropy coding result of the fourth latent variable is written into a bitstream. In addition, entropy decoding is performed on the entropy coding result of the fourth latent variable, to obtain a quantized fourth latent variable. Dequantization processing is performed on the quantized fourth latent variable, to obtain a reconstructed fourth latent variable. The reconstructed fourth latent variable is scaled based on the second variable scale factor, to obtain a reconstructed third latent variable. The reconstructed third latent variable is processed by using a context decoding neural network model, to obtain a second entropy coding model parameter. An entropy coding model corresponding to the second entropy coding model parameter is selected from entropy coding models with scalable parameters. The second latent variable is quantized, entropy coding is performed on a quantized second latent variable based on the selected entropy coding model, to obtain an entropy coding result of the second latent variable, and the entropy coding result of the second latent variable is written into the bitstream. Then, an encoding result of the first variable scale factor is written into the bitstream.

Figure 17:
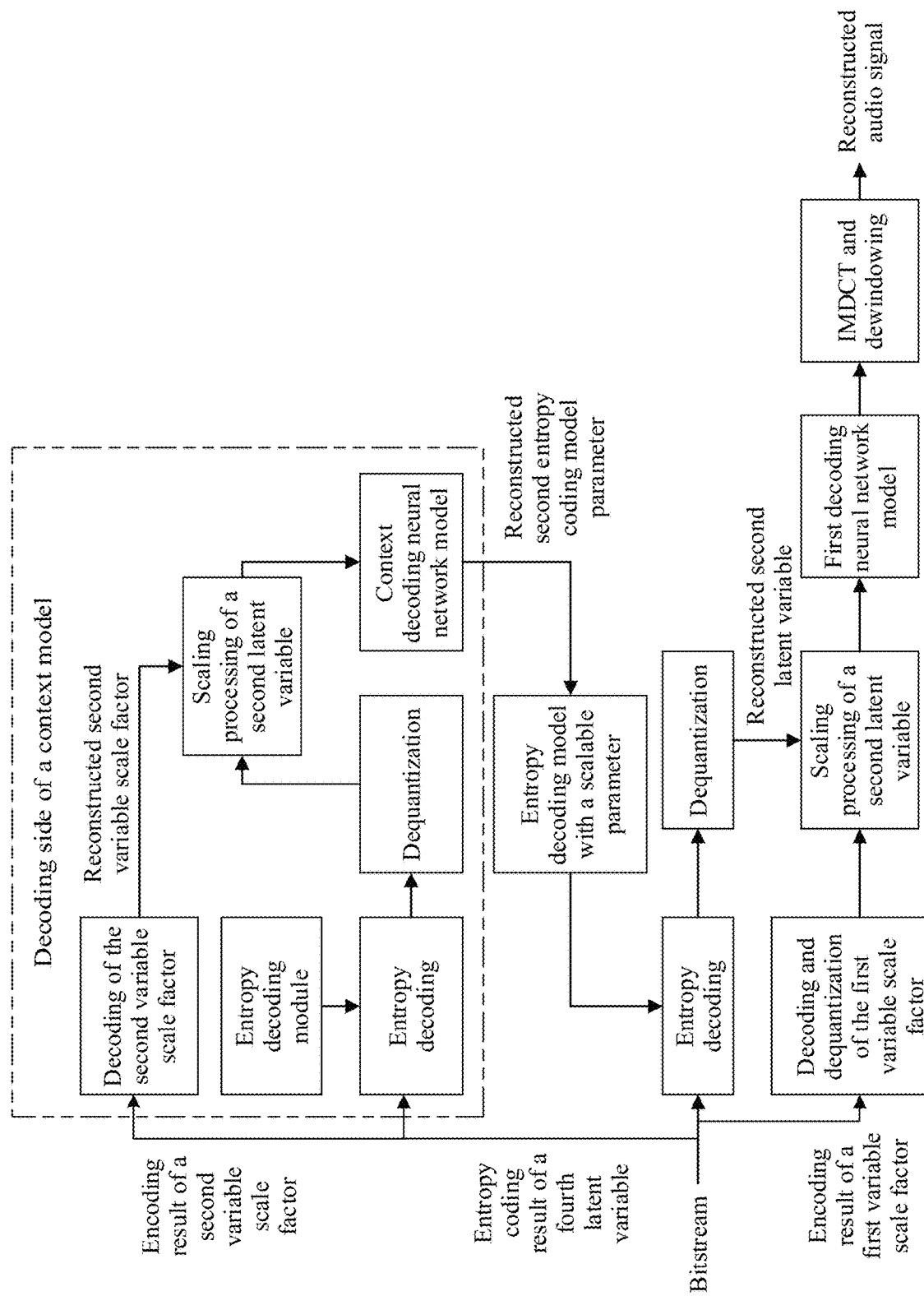
FIG. 17 is an example block diagram of a decoding method shown in FIG. 15 according to an embodiment of this application.

FIG. 17 is an example block diagram of a decoding method according to an embodiment of this application. FIG. 17 mainly explains the decoding method shown in FIG. 15 as an example. In FIG. 17, an audio signal is used as an example. Entropy decoding is performed on an entropy coding result of a fourth latent variable in a bitstream by using an entropy decoding model, to obtain a quantized fourth latent variable. Dequantization processing is performed on the quantized fourth latent variable, to obtain a reconstructed fourth latent variable. An encoding result of a second variable scale factor in the bitstream is decoded, to obtain a quantized second variable scale factor. Dequantization processing is performed on the quantized second variable scale factor, to obtain a reconstructed second variable scale factor. The reconstructed fourth latent variable is scaled based on the reconstructed second variable scale factor, to obtain a reconstructed third latent variable. The reconstructed third variable is processed by using a context decoding neural network model, to obtain a reconstructed second entropy coding model parameter. A corresponding entropy decoding model is selected, based on the reconstructed second entropy coding model parameter, from entropy decoding models with scalable parameters. Entropy decoding is performed on an entropy coding result of a second latent variable in the bitstream based on the selected entropy decoding model, to obtain a quantized second latent variable. Dequantization processing is performed on the quantized second latent variable, to obtain a reconstructed second latent variable. An encoding result of a first variable scale factor in the bitstream is decoded, to obtain a reconstructed first variable scale factor. The reconstructed second latent variable is scaled based on the reconstructed first variable scale factor, to obtain a reconstructed first latent variable. The reconstructed first latent variable is processed by using a first decoding neural network model, to obtain a reconstructed frequency-domain signal of a current frame. IMDCT processing and dewindowing processing are performed on the reconstructed frequency-domain signal of the current frame, to obtain a reconstructed audio signal.

Figure 18:
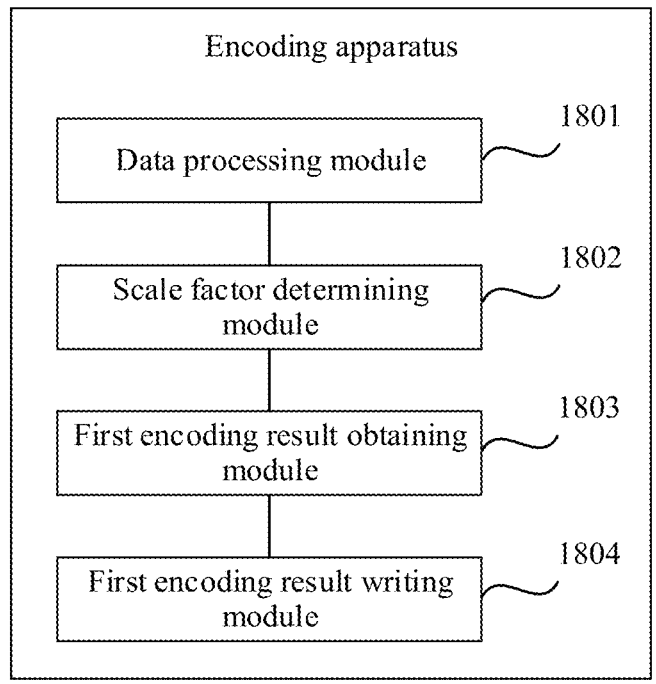
FIG. 18 is a schematic diagram of a structure of an encoding apparatus according to an embodiment of this application.

FIG. 18 is a schematic diagram of a structure of an encoding apparatus according to an embodiment of this application. The encoding apparatus may be implemented as a part or all of an encoder side device by using software, hardware, or a combination thereof. The encoder side device may be the source apparatus shown in FIG. 1. As shown in FIG. 18, the apparatus includes: a data processing module 1801, a scale factor determining module 1802, a first encoding result obtaining module 1803, and a first encoding result writing module 1804.

The data processing module 1801 is configured to process to-be-encoded media data by using a first encoding neural network model, to obtain a first latent variable, where the first latent variable indicates a feature of the to-be-encoded media data. For a detailed implementation process, refer to corresponding content in the foregoing embodiments. Details are not described herein again.

The scale factor determining module 1802 is configured to determine a first variable scale factor based on the first latent variable, where the first variable scale factor is used to enable a quantity of coding bits of an entropy coding result of a second latent variable to meet a preset encoding rate condition, and the second latent variable is obtained by scaling the first latent variable based on the first variable scale factor. For a detailed implementation process, refer to corresponding content in the foregoing embodiments. Details are not described herein again.

The first encoding result obtaining module 1803 is configured to obtain the entropy coding result of the second latent variable. For a detailed implementation process, refer to corresponding content in the foregoing embodiments. Details are not described herein again.

The first encoding result writing module 1804 is configured to write the entropy coding result of the second latent variable and an encoding result of the first variable scale factor into a bitstream. For a detailed implementation process, refer to corresponding content in the foregoing embodiments. Details are not described herein again.

In some embodiments, when the to-be-encoded media data is encoded at a constant bit rate, the meeting a preset encoding rate condition includes that the quantity of coding bits is less than or equal to a target quantity of coding bits; or the meeting a preset encoding rate condition includes that the quantity of coding bits is less than or equal to a target quantity of coding bits, and a difference between the quantity of coding bits and the target quantity of coding bits is less than a bit quantity threshold.

In some embodiments, when the to-be-encoded media data is encoded at a variable bit rate, the meeting a preset encoding rate condition includes that an absolute value of a difference between the quantity of coding bits and a target quantity of coding bits is less than a bit quantity threshold.

In some embodiments, the scale factor determining module 1802 includes:
  a bit quantity determining submodule, configured to determine an initial quantity of coding bits based on the first latent variable; and
  a first factor determining submodule, configured to determine the first variable scale factor based on the initial quantity of coding bits and a target quantity of coding bits.

In some embodiments, the initial quantity of coding bits is a quantity of coding bits of an entropy coding result of the first latent variable; or
  the initial quantity of coding bits is a quantity of coding bits of an entropy coding result of a first latent variable scaled based on a first initial scale factor.

In some embodiments, when the initial quantity of coding bits is not equal to the target quantity of coding bits, the first factor determining submodule is configured to:
  determine the first variable scale factor in a first cyclic manner based on the initial quantity of coding bits and the target quantity of coding bits; and
  $i^{th}$ cyclic processing of the first cyclic manner includes the following operations:
  determining a scale factor of the $i^{th}$ cyclic processing, where i is a positive integer;
  scaling the first latent variable based on the scale factor of the $i^{th}$ cyclic processing, to obtain an $i^{th}$-scaled first latent variable;
  determining a quantity of coding bits of an entropy coding result of the $i^{th}$-scaled first latent variable, to obtain an $i^{th}$ quantity of coding bits; and
  if the $i^{th}$ quantity of coding bits meets a continuing scaling condition, performing $(i+1)^{th}$ cyclic processing of the first cyclic manner; or
  if the $i^{th}$ quantity of coding bits does not meet a continuing scaling condition, terminating execution of the first cyclic manner, and determining the first variable scale factor based on the scale factor of the $i^{th}$ cyclic processing.

In some embodiments, the apparatus further includes:
  a second encoding result obtaining module, configured to obtain an entropy coding result of a third latent variable, where the third latent variable is determined based on the second latent variable by using a context model; and
  a second encoding result writing module, configured to write the entropy coding result of the third latent variable into the bitstream.

A total quantity of coding bits of the entropy coding result of the second latent variable and coding bits of the entropy coding result of the third latent variable meets the preset encoding rate condition.

In some embodiments, the scale factor determining module 1802 includes:
  a bit quantity determining submodule, configured to determine an initial quantity of coding bits based on the first latent variable; and
  a first factor determining submodule, configured to determine the first variable scale factor based on the initial quantity of coding bits and a target quantity of coding bits.

In some embodiments, the bit quantity determining submodule is configured to:
  determine, based on the first latent variable by using the context model, a corresponding initial quantity of context coding bits and an initial entropy coding model parameter;
  determine a quantity of coding bits of an entropy coding result of the first latent variable based on the initial entropy coding model parameter, to obtain a basic initial quantity of coding bits; and
  determine the initial quantity of coding bits based on the initial quantity of context coding bits and the basic initial quantity of coding bits.

In some embodiments, when the initial quantity of coding bits is not equal to the target quantity of coding bits, the first factor determining submodule is configured to:
  determine the first variable scale factor in a first cyclic manner based on the initial quantity of coding bits and the target quantity of coding bits; and
  $i^{th}$ cyclic processing of the first cyclic manner includes the following operations:
    determining a scale factor of the $i^{th}$ cyclic processing, where i is a positive integer;
    scaling the first latent variable based on the scale factor of the $i^{th}$ cyclic processing, to obtain an $i^{th}$-scaled first latent variable;
    determining, based on the $i^{th}$-scaled first latent variable by using the context model, an $i^{th}$ quantity of context coding bits and an $i^{th}$ entropy coding model parameter;
    determining a quantity of coding bits of an entropy coding result of the $i^{th}$-scaled first latent variable based on the $i^{th}$ entropy coding model parameter, to obtain an $i^{th}$ basic quantity of coding bits;
    determining an $i^{th}$ quantity of coding bits based on the $i^{th}$ quantity of context coding bits and the $i^{th}$ basic quantity of coding bits; and
    if the $i^{th}$ quantity of coding bits meets a continuing scaling condition, performing $(i+1)^{th}$ cyclic processing of the first cyclic manner; or
    if the $i^{th}$ quantity of coding bits does not meet a continuing scaling condition, terminating execution of the first cyclic manner, and determining the first variable scale factor based on the scale factor of the $i^{th}$ cyclic processing.

In some embodiments, the first factor determining submodule is configured to:
  determine the scale factor of the $i^{th}$ cyclic processing based on a scale factor of $(i-1)^{th}$ cyclic processing of the first cyclic manner, an $(i-1)^{th}$ quantity of coding bits, and the target quantity of coding bits.

When i=1, the scale factor of the $(i-1)^{th}$ cyclic processing is a first initial scale factor, and the $(i-1)^{th}$ quantity of coding bits is the initial quantity of coding bits.

The continuing scaling condition includes that both the $(i-1)^{th}$ quantity of coding bits and the $i^{th}$ quantity of coding bits are less than the target quantity of coding bits, or the continuing scaling condition includes that both the $(i-1)^{th}$ quantity of coding bits and the $i^{th}$ quantity of coding bits are greater than the target quantity of coding bits.

In some embodiments, when the initial quantity of coding bits is less than the target quantity of coding bits, the first factor determining submodule is configured to:
  scale a scale factor of $(i-1)^{th}$ cyclic processing of the first cyclic manner based on a first operation, to obtain the scale factor of the $i^{th}$ cyclic processing.

When i=1, the scale factor of the $(i-1)^{th}$ cyclic processing is a first initial scale factor.

The continuing scaling condition includes that the $i^{th}$ quantity of coding bits is less than the target quantity of coding bits.

In some embodiments, when the initial quantity of coding bits is greater than the target quantity of coding bits, the first factor determining submodule is configured to:
  scale a scale factor of $(i-1)^{th}$ cyclic processing of the first cyclic manner based on a second operation, to obtain the scale factor of the $i^{th}$ cyclic processing.

When i=1, the scale factor of the $(i-1)^{th}$ cyclic processing is a first initial scale factor.

The continuing scaling condition includes that the $i^{th}$ quantity of coding bits is greater than the target quantity of coding bits.

In some embodiments, the first factor determining submodule is configured to:
  when the initial quantity of coding bits is less than the target quantity of coding bits, determine a first initial scale factor as the first variable scale factor.

In some embodiments, the first factor determining submodule is configured to:
  when the $i^{th}$ quantity of coding bits is equal to the target quantity of coding bits, determine the scale factor of the $i^{th}$ cyclic processing as the first variable scale factor; or
  when the $i^{th}$ quantity of coding bits is not equal to the target quantity of coding bits, determine the first variable scale factor based on the scale factor of the $i^{th}$ cyclic processing and a scale factor of $(i-1)^{th}$ cyclic processing of the first cyclic manner.

In some embodiments, the first factor determining submodule is configured to:
  determine an average value of the scale factor of the $i^{th}$ cyclic processing and the scale factor of the $(i-1)^{th}$ cyclic processing; and
  determine the first variable scale factor based on the average value.

In some embodiments, the first factor determining submodule is configured to:
  determine the first variable scale factor in a second cyclic manner based on the scale factor of the $i^{th}$ cyclic processing and the scale factor of the $(i-1)^{th}$ cyclic processing.

$j^{th}$ cyclic processing of the second cyclic manner includes the following operations:
  determining a third scale factor of the $j^{th}$ cyclic processing based on a first scale factor of the $j^{th}$ cyclic processing and a second scale factor of the $j^{th}$ cyclic processing, where when j is equal to 1, the first scale factor of the $j^{th}$ cyclic processing is one of the scale factor of the $i^{th}$ cyclic processing and the scale factor of the $(i-1)^{th}$ cyclic processing, the second scale factor of the $j^{th}$ cyclic processing is the other one of the scale factor of the $i^{th}$ cyclic processing and the scale factor of the $(i-1)^{th}$ cyclic processing, the first scale factor of the $j^{th}$ cyclic processing corresponds to a $j^{th}$ first quantity of coding bits, the second scale factor of the $j^{th}$ cyclic processing corresponds to a $j^{th}$ second quantity of coding bits, the $j^{th}$ first quantity of coding bits is less than the $j^{th}$ second quantity of coding bits, and j is a positive integer;

obtaining a $j^{th}$ third quantity of coding bits, where the $j^{th}$ third quantity of coding bits is a quantity of coding bits of an entropy coding result of a first latent variable scaled based on the third scale factor of the $j^{th}$ cyclic processing; and if the $j^{th}$ third quantity of coding bits does not meet a continuing cycle condition, terminating execution of the second cyclic manner, and determining the third scale factor of the $j^{th}$ cyclic processing as the first variable scale factor;

if the $j^{th}$ third quantity of coding bits meets a continuing cycle condition, and is greater than the target quantity of coding bits and less than the $j^{th}$ second quantity of coding bits, performing $(j+1)^{th}$ cyclic processing of the second cyclic manner by using the third scale factor of the $j^{th}$ cyclic processing as a second scale factor of the $(j+1)^{th}$ cyclic processing and using the first scale factor of the $j^{th}$ cyclic processing as a first scale factor of the $(j+1)^{th}$ cyclic processing; or if the $j^{th}$ third quantity of coding bits meets a continuing cycle condition, and is less than the target quantity of coding bits and greater than the $j^{th}$ first quantity of coding bits, performing $(j+1)^{th}$ cyclic processing of the second cyclic manner by using the third scale factor of the $j^{th}$ cyclic processing as a first scale factor of the $(j+1)^{th}$ cyclic processing and using the second scale factor of the $j^{th}$ cyclic processing as a second scale factor of the $(j+1)^{th}$ cyclic processing.

In some embodiments, the first factor determining sub-module is configured to:

determine the first variable scale factor in a second cyclic manner based on the scale factor of the $i^{th}$ cyclic processing and the scale factor of the $(i-1)^{th}$ cyclic processing.

$j^{th}$ cyclic processing of the second cyclic manner includes the following operations:

determining a third scale factor of the $j^{th}$ cyclic processing based on a first scale factor of the $j^{th}$ cyclic processing and a second scale factor of the $j^{th}$ cyclic processing, where when j is equal to 1, the first scale factor of the $j^{th}$ cyclic processing is one of the scale factor of the $i^{th}$ cyclic processing and the scale factor of the $(i-1)^{th}$ cyclic processing, the second scale factor of the $j^{th}$ cyclic processing is the other one of the scale factor of the $i^{th}$ cyclic processing and the scale factor of the $(i-1)^{th}$ cyclic processing, the first scale factor of the $j^{th}$ cyclic processing corresponds to a $j^{th}$ first quantity of coding bits, the second scale factor of the $j^{th}$ cyclic processing corresponds to a $j^{th}$ second quantity of coding bits, the $j^{th}$ first quantity of coding bits is less than the $j^{th}$ second quantity of coding bits, and j is a positive integer;

obtaining a $j^{th}$ third quantity of coding bits, where the $j^{th}$ third quantity of coding bits is a quantity of coding bits of an entropy coding result of a first latent variable scaled based on the third scale factor of the $j^{th}$ cyclic processing; and if the $j^{th}$ third quantity of coding bits does not meet a continuing cycle condition, terminating execution of the second cyclic manner, and determining the third scale factor of the $j^{th}$ cyclic processing as the first variable scale factor;

if j reaches a maximum quantity of cycles and the $j^{th}$ third quantity of coding bits meets a continuing cycle condition, terminating execution of the second cyclic manner, and determining the first variable scale factor based on the first scale factor of the $j^{th}$ cyclic processing;

if j does not reach a maximum quantity of cycles, and the $j^{th}$ third quantity of coding bits meets a continuing cycle condition, and is greater than the target quantity of coding bits and less than the $j^{th}$ second quantity of coding bits, performing $(j+1)^{th}$ cyclic processing of the second cyclic manner by using the third scale factor of the $j^{th}$ cyclic processing as a second scale factor of the $(j+1)^{th}$ cyclic processing and using the first scale factor of the $j^{th}$ cyclic processing as a first scale factor of the $(j+1)^{th}$ cyclic processing; or if j does not reach a maximum quantity of cycles, and the $j^{th}$ third quantity of coding bits meets a continuing cycle condition, and is less than the target quantity of coding bits and greater than the $j^{th}$ first quantity of coding bits, performing $(j+1)^{th}$ cyclic processing of the second cyclic manner by using the third scale factor of the $j^{th}$ cyclic processing as a first scale factor of the $(j+1)^{th}$ cyclic processing and using the second scale factor of the $j^{th}$ cyclic processing as a second scale factor of the $(j+1)^{th}$ cyclic processing.

In some embodiments, the first factor determining sub-module is configured to:

when the to-be-encoded media data is encoded at a constant bit rate, determine the first scale factor of the $j^{th}$ cyclic processing as the first variable scale factor.

In some embodiments, the first factor determining sub-module is configured to:

when the to-be-encoded media data is encoded at a variable bit rate, determine a first difference between the target quantity of coding bits and the $j^{th}$ first quantity of coding bits, and determine a second difference between the $j^{th}$ second quantity of coding bits and the target quantity of coding bits; and if the first difference is less than the second difference, determine the first scale factor of the $j^{th}$ cyclic processing as the first variable scale factor;

if the second difference is less than the first difference, determine the second scale factor of the $j^{th}$ cyclic processing as the first variable scale factor; or if the first difference is equal to the second difference, determine the first scale factor of the $j^{th}$ cyclic processing as the first variable scale factor, or determine the second scale factor of the $j^{th}$ cyclic processing as the first variable scale factor.

In some embodiments, when the to-be-encoded media data is encoded at a constant bit rate, the continuing cycle condition includes that the $j^{th}$ third quantity of coding bits is greater than the target quantity of coding bits, or the continuing cycle condition includes that the $j^{th}$ third quantity of coding bits is less than the target quantity of coding bits, and a difference between the target quantity of coding bits and the $j^{th}$ third quantity of coding bits is greater than a bit quantity threshold.

In some embodiments, when the to-be-encoded media data is encoded at a variable bit rate, the continuing cycle condition includes that an absolute value of a difference between the target quantity of coding bits and the $j^{th}$ third quantity of coding bits is greater than a bit quantity threshold.

In some embodiments, the first factor determining sub-module is configured to:

when the initial quantity of coding bits is equal to the target quantity of coding bits, determine a first initial scale factor as the first variable scale factor.

In some embodiments, the apparatus further includes:
the scale factor determining module 1802, further configured to: determine a second variable scale factor based on the first latent variable;
a third encoding result obtaining module, configured to obtain an entropy coding result of a fourth latent variable, where the fourth latent variable is obtained by scaling a third latent variable based on the second variable scale factor, and the third latent variable is determined based on the second latent variable by using a context model; and
a third encoding result writing module, configured to write the entropy coding result of the fourth latent variable and an encoding result of the second variable scale factor into the bitstream.

A total quantity of coding bits of the entropy coding result of the second latent variable and coding bits of the entropy coding result of the fourth latent variable meets the preset encoding rate condition.

In some embodiments, the scale factor determining module 1802 includes:
a first determining submodule, configured to determine, based on the first latent variable by using the context model, a corresponding initial quantity of context coding bits and an initial entropy coding model parameter;
a second determining submodule, configured to determine a quantity of coding bits of an entropy coding result of the first latent variable based on the initial entropy coding model parameter, to obtain a basic initial quantity of coding bits; and
a second factor determining submodule, configured to determine the first variable scale factor and the second variable scale factor based on the initial quantity of context coding bits, the basic initial quantity of coding bits, and a target quantity of coding bits.

In some embodiments, the second factor determining submodule is configured to:
determine a basic target quantity of coding bits based on the target quantity of coding bits and at least one of the basic initial quantity of coding bits and the initial quantity of context coding bits;
determine the first variable scale factor and a basic actual quantity of coding bits based on a second initial scale factor, the basic target quantity of coding bits, and the basic initial quantity of coding bits, where the basic actual quantity of coding bits is a quantity of coding bits of an entropy coding result of a first latent variable scaled based on the first variable scale factor;
determine a target quantity of context coding bits based on the target quantity of coding bits and the basic actual quantity of coding bits; and
determine the second variable scale factor based on the target quantity of context coding bits and the initial quantity of context coding bits.

In some embodiments, the second factor determining submodule is configured to:
divide the target quantity of coding bits into a basic target quantity of coding bits and a target quantity of context coding bits;
determine the first variable scale factor based on the basic target quantity of coding bits and the basic initial quantity of coding bits; and
determine the second variable scale factor based on the target quantity of context coding bits and the initial quantity of context coding bits.

In some embodiments, the media data is an audio signal, a video signal, or an image.

The quantity of coding bits of the entropy coding result of the second latent variable meets the preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

It should be noted that, when the encoding apparatus provided in the foregoing embodiment performs encoding, division of the foregoing functional modules is merely used as an example for description. During actual application, the foregoing functions may be allocated to different functional modules for implementation based on a requirement, that is, an internal structure of the apparatus is divided into different functional modules, to implement all or some of the functions described above. In addition, the encoding apparatus provided in the foregoing embodiment pertains to a same concept as the encoding method embodiment. For an implementation process of the encoding apparatus, refer to the method embodiment. Details are not described herein again.

Figure 19:
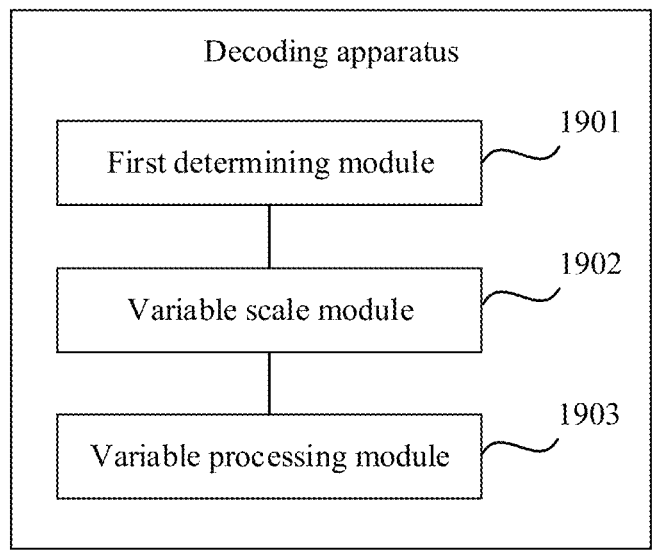
FIG. 19 is a schematic diagram of a structure of a decoding apparatus according to an embodiment of this application.

FIG. 19 is a schematic diagram of a structure of a decoding apparatus according to an embodiment of this application. The decoding apparatus may be implemented as a part or all of a decoder side device by using software, hardware, or a combination thereof. The decoder side device may be the destination apparatus shown in FIG. 1. As shown in FIG. 19, the apparatus includes: a first determining module 1901, a variable scale module 1902, and a variable processing module 1903.

The first determining module 1901 is configured to determine a reconstructed second latent variable and a reconstructed first variable scale factor based on a bitstream. For a detailed implementation process, refer to corresponding content in the foregoing embodiments. Details are not described herein again.

The variable scale module 1902 is configured to scale the reconstructed second latent variable based on the reconstructed first variable scale factor, to obtain a reconstructed first latent variable, where the reconstructed first latent variable indicates a feature of to-be-decoded media data. For a detailed implementation process, refer to corresponding content in the foregoing embodiments. Details are not described herein again.

The variable processing module 1903 is configured to process the reconstructed first latent variable by using a first decoding neural network model, to obtain reconstructed media data. For a detailed implementation process, refer to corresponding content in the foregoing embodiments. Details are not described herein again.

In some embodiments, the first determining module 1901 includes:
a first determining submodule, configured to determine a reconstructed third latent variable based on the bitstream; and a second determining submodule, configured to determine the reconstructed second latent variable based on the bitstream and the reconstructed third latent variable.

In some embodiments, the second determining submodule is configured to:

process the reconstructed third latent variable by using a context decoding neural network model, to obtain a reconstructed first entropy coding model parameter; and determine the reconstructed second latent variable based on the bitstream and the reconstructed first entropy coding model parameter.

In some embodiments, the first determining module 1901 includes:

a third determining submodule, configured to determine a reconstructed fourth latent variable and a reconstructed second variable scale factor based on the bitstream; and a fourth determining submodule, configured to determine the reconstructed second latent variable based on the bitstream, the reconstructed fourth latent variable, and the reconstructed second variable scale factor.

In some embodiments, the fourth determining submodule is configured to:

scale the reconstructed fourth latent variable based on the reconstructed second variable scale factor, to obtain a reconstructed third latent variable;

process the reconstructed third latent variable by using a context decoding neural network model, to obtain a reconstructed second entropy coding model parameter; and determine the reconstructed second latent variable based on the bitstream and the reconstructed second entropy coding model parameter.

In some embodiments, the media data is an audio signal, a video signal, or an image.

In this embodiment of this application, a quantity of coding bits of the entropy coding result of the second latent variable meets a preset encoding rate condition. This ensures that a quantity of coding bits of an entropy coding result of a latent variable corresponding to each frame of media data can meet the preset encoding rate condition, that is, the quantity of coding bits of the entropy coding result of the latent variable corresponding to each frame of media data can be basically consistent, instead of dynamically changing, thereby meeting a requirement of an encoder for a stable encoding rate. Further, when side information (for example, a window type, a temporal noise shaping (TNS) parameter, a frequency-domain noise shaping (FDNS) parameter, and/or a bandwidth extension (BWE) parameter) needs to be transmitted, it can be ensured that the quantity of coding bits of the entropy coding result of the latent variable corresponding to each frame of media data is basically consistent with a quantity of coding bits of the side information, thereby meeting the requirement of the encoder for the stable encoding rate.

It should be noted that, when the decoding apparatus provided in the foregoing embodiment performs decoding, division of the foregoing functional modules is merely used as an example for description. During actual application, the foregoing functions may be allocated to different functional modules for implementation based on a requirement, that is, an internal structure of the apparatus is divided into different functional modules, to implement all or some of the functions described above. In addition, the decoding apparatus provided in the foregoing embodiment pertains to a same concept as the decoding method embodiment. For an implementation process of the encoding apparatus, refer to the method embodiment. Details are not described herein again.

Figure 20:
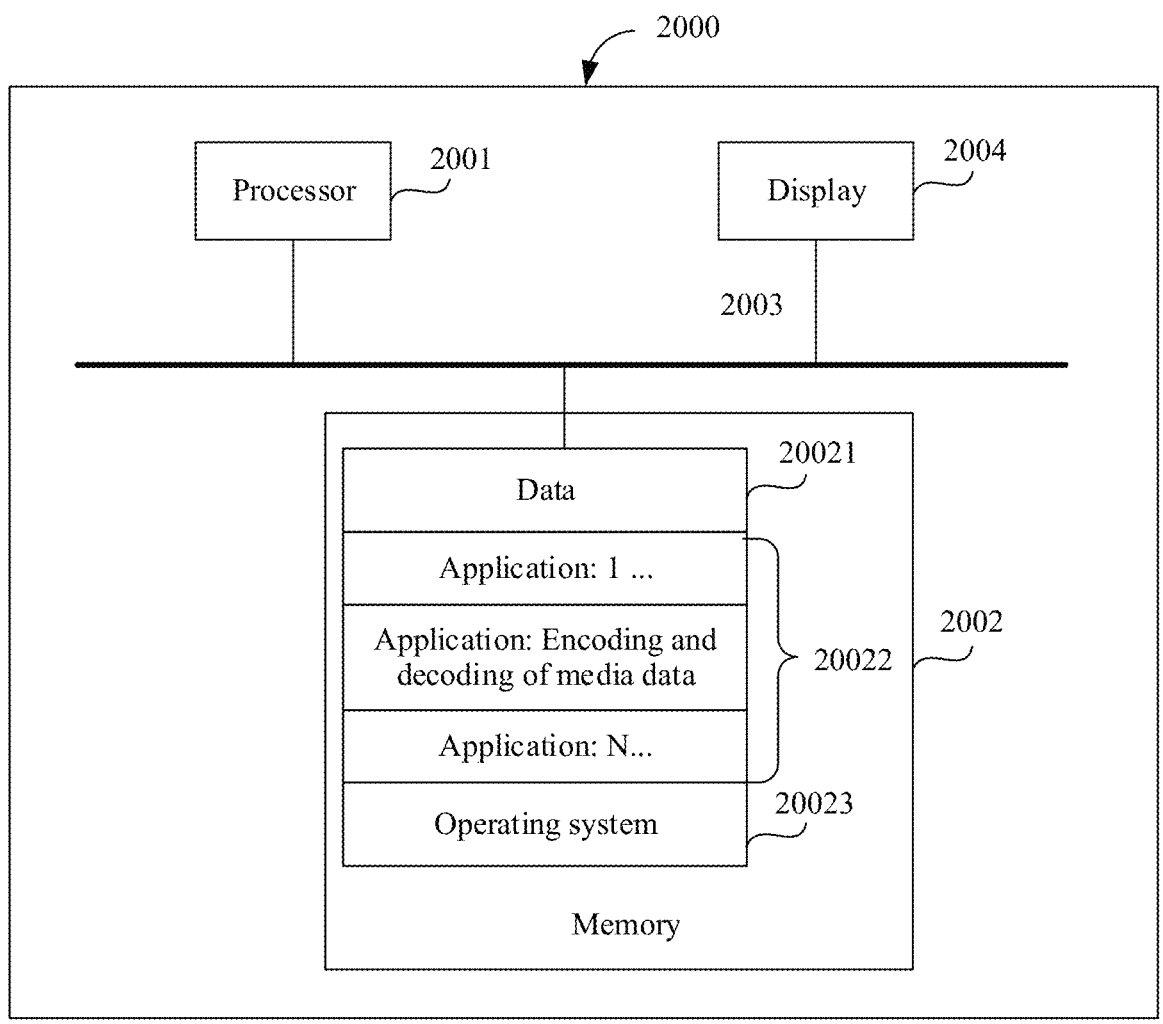
FIG. 20 is a schematic block diagram of an encoding and decoding apparatus according to an embodiment of this application.

FIG. 20 is a schematic block diagram of an encoding and decoding apparatus 2000 according to an embodiment of this application. The encoding and decoding apparatus 2000 may include a processor 2001, a memory 2002, and a bus system 2003. The processor 2001 and the memory 2002 are connected through the bus system 2003. The memory 2002 is configured to store instructions. The processor 2001 is configured to execute the instructions stored in the memory 2002, to perform various encoding or decoding methods described in embodiments of this application. To avoid repetition, details are not described herein again.

In this embodiment of this application, the processor 2001 may be a central processing unit (CPU), or the processor 2001 may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

The memory 2002 may include a ROM device or a RAM device. Any other proper type of storage device may also be used as the memory 2002. The memory 2002 may include code and data 20021 that are accessed by the processor 2001 through the bus 2003. The memory 2002 may further include an operating system 20023 and an application program 20022. The application program 20022 includes at least one program that allows the processor 2001 to perform the encoding or decoding method described in embodiments of this application. For example, the application program 20022 may include applications 1 to N, and further include an encoding or decoding application (referred to as an encoding and decoding application for short) that performs the encoding or decoding method described in embodiments of this application.

In addition to a data bus, the bus system 2003 may further include a power bus, a control bus, a status signal bus, and the like. However, for clear description, various types of buses in the figure are marked as the bus system 2003.

In some embodiments, the encoding and decoding apparatus 2000 may further include one or more output devices, for example, a display 2004. In an example, the display 2004 may be a touch display that combines a display and a touch unit that operably senses a touch input. The display 2004 may be connected to the processor 2001 through the bus 2003.

It should be noted that the encoding and decoding apparatus 2000 may perform the encoding method in embodiments of this application, and may also perform the decoding method in embodiments of this application.

A person skilled in the art can appreciate that functions described with reference to various illustrative logical blocks, modules, and algorithm operations disclosed and described herein may be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or any communication medium that facilitates transmission of a computer program from one place to another (for example, according to a communication protocol). In this manner, the computer-readable medium may generally correspond to (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. A disk and an optical disc used in this specification include a compact disc (CD), a laser disc, an optical disc, a DVD, and a Blu-ray disc, where the disk generally magnetically reproduces data, and the optical disc optically reproduces data by using a laser. Combinations of the above should also be included within the scope of the computer-readable medium.

Instructions may be executed by one or more processors such as one or more digital signal processors (DSPs), general microprocessors, application-specific integrated circuits (ASICs), field-programmable gate arrays (FPGAs), or other equivalent integrated or discrete logic circuits. Therefore, the term "processor" used in this specification may refer to the foregoing structure or any other structure that may be applied to implementation of the technologies described in this specification. In addition, in some embodiments, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements. In an example, various illustrative logic blocks, units, and modules in the encoder 100 and the decoder 200 may be understood as corresponding circuit devices or logic elements.

The technologies in embodiments of this application may be implemented in various apparatuses or devices, including a wireless handset, an integrated circuit (IC), or a set of ICs (for example, a chip set). Various components, modules, or units are described in embodiments of this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including the one or more processors described above).

In other words, all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like. It should be noted that, the computer-readable storage medium mentioned in embodiments of this application may be a non-volatile storage medium, or in other words, may be a non-transitory storage medium.

It should be understood that "a plurality of" in this specification means two or more. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference.

The foregoing descriptions are merely embodiments of this application, but are not intended to limit this application. Any modification, equivalent replacement, or improvement made without departing from the spirit and principle of this application should fall within the protection scope of this application.

What is claimed is:
1. An encoding method, wherein the method comprises:
processing to-be-encoded media data to obtain a first latent variable that indicates a feature of the to-be-encoded media data;
determining a first variable scale factor based on the first latent variable, wherein the first variable scale factor is used to enable a quantity of coding bits of a coding result of a second latent variable to meet a preset encoding rate condition, and wherein the second latent variable is obtained by scaling the first latent variable based on the first variable scale factor;

obtaining the coding result of the second latent variable; and writing the coding result of the second latent variable and an encoding result of the first variable scale factor into a bitstream.

2. The method according to claim 1, further comprising:
determining an initial quantity of coding bits based on the first latent variable; and
determining the first variable scale factor based on the initial quantity of coding bits and a target quantity of coding bits.

3. The method according to claim 2, wherein
the initial quantity of coding bits is a quantity of coding bits of an entropy coding result of the first latent variable; or
the initial quantity of coding bits is a quantity of coding bits of an entropy coding result of a first latent variable scaled based on a first initial scale factor.

4. The method according to claim 1, wherein the method further comprises:
obtaining an entropy coding result of a third latent variable, wherein the third latent variable is determined based on the second latent variable by using a context model; and
writing the entropy coding result of the third latent variable into the bitstream, wherein
a total quantity of coding bits of the coding result of the second latent variable and coding bits of the entropy coding result of the third latent variable meets the preset encoding rate condition.

5. The method according to claim 4, further comprising:
determining an initial quantity of coding bits based on the first latent variable; and
determining the first variable scale factor based on the initial quantity of coding bits and a target quantity of coding bits.

6. A decoding method, wherein the method comprises:
determining a reconstructed second latent variable and a reconstructed first variable scale factor based on a bitstream;
scaling the reconstructed second latent variable based on the reconstructed first variable scale factor, to obtain a reconstructed first latent variable, wherein the reconstructed first latent variable indicates a feature of to-be-decoded media data; and
processing the reconstructed first latent variable to obtain reconstructed media data.

7. The method according to claim 6, further comprising:
determining a reconstructed third latent variable based on the bitstream; and
determining the reconstructed second latent variable based on the bitstream and the reconstructed third latent variable.

8. The method according to claim 7, further comprising:
processing the reconstructed third latent variable by using a context decoding neural network model, to obtain a reconstructed first entropy coding model parameter; and
determining the reconstructed second latent variable based on the bitstream and the reconstructed first entropy coding model parameter.

9. The method according to claim 6, further comprising:
determining a reconstructed fourth latent variable and a reconstructed second variable scale factor based on the bitstream; and determining the reconstructed second latent variable based on the bitstream, the reconstructed fourth latent variable, and the reconstructed second variable scale factor.

10. The method according to claim 9, further comprising:
scaling the reconstructed fourth latent variable based on the reconstructed second variable scale factor, to obtain a reconstructed third latent variable;
processing the reconstructed third latent variable by using a context decoding neural network model, to obtain a reconstructed second entropy coding model parameter; and
determining the reconstructed second latent variable based on the bitstream and the reconstructed second entropy coding model parameter.

11. An encoder side device, comprising:
a processor; and
a memory configured to store a computer program that, when executed by the processor, cause the processor to:
process to-be-encoded media data to obtain a first latent variable, wherein the first latent variable indicates a feature of the to-be-encoded media data;
determine a first variable scale factor based on the first latent variable, wherein the first variable scale factor is used to enable a quantity of coding bits of a coding result of a second latent variable to meet a preset encoding rate condition, and the second latent variable is obtained by scaling the first latent variable based on the first variable scale factor;
obtain the coding result of the second latent variable; and
write the coding result of the second latent variable and an encoding result of the first variable scale factor into a bitstream.

12. The encoder side device according to claim 11, wherein the processor is further to:
determine an initial quantity of coding bits based on the first latent variable; and
determine the first variable scale factor based on the initial quantity of coding bits and a target quantity of coding bits.

13. The encoder side device according to claim 12, wherein
the initial quantity of coding bits is a quantity of coding bits of an entropy coding result of the first latent variable; or
the initial quantity of coding bits is a quantity of coding bits of an entropy coding result of a first latent variable scaled based on a first initial scale factor.

14. The encoder side device according to claim 11, wherein the processor is further to:
obtain an entropy coding result of a third latent variable, wherein the third latent variable is determined based on the second latent variable by using a context model; and
write the entropy coding result of the third latent variable into the bitstream, wherein
a total quantity of coding bits of the coding result of the second latent variable and coding bits of the entropy coding result of the third latent variable meets the preset encoding rate condition.

15. The encoder side device according to claim 14, wherein the processor is further to:
determine an initial quantity of coding bits based on the first latent variable; and
determine the first variable scale factor based on the initial quantity of coding bits and a target quantity of coding bits.

16. A decoder side device, comprising:
a processor; and
a memory configured to store a computer program that, when executed by the processor, cause the processor to:
determine a reconstructed second latent variable and a reconstructed first variable scale factor based on a bitstream;
scale the reconstructed second latent variable based on the reconstructed first variable scale factor, to obtain a reconstructed first latent variable, wherein the reconstructed first latent variable indicates a feature of to-be-decoded media data; and
process the reconstructed first latent variable to obtain reconstructed media data.

17. The decoder side device according to claim 16, wherein the processor is further to:
determine a reconstructed third latent variable based on the bitstream; and
determine the reconstructed second latent variable based on the bitstream and the reconstructed third latent variable.

18. The decoder side device according to claim 17, wherein the processor is further to:
process the reconstructed third latent variable by using a context decoding neural network model, to obtain a reconstructed first entropy coding model parameter; and
determine the reconstructed second latent variable based on the bitstream and the reconstructed first entropy coding model parameter.

19. The decoder side device according to claim 16, wherein the processor is further to:
determine a reconstructed fourth latent variable and a reconstructed second variable scale factor based on the bitstream; and
determine the reconstructed second latent variable based on the bitstream, the reconstructed fourth latent variable, and the reconstructed second variable scale factor.

20. The decoder side device according to claim 19, wherein the processor is further to:
scale the reconstructed fourth latent variable based on the reconstructed second variable scale factor, to obtain a reconstructed third latent variable;
process the reconstructed third latent variable by using a context decoding neural network model, to obtain a reconstructed second entropy coding model parameter; and
determine the reconstructed second latent variable based on the bitstream and the reconstructed second entropy coding model parameter.

* * * * *